(12) United States Patent
Dor et al.

(10) Patent No.: US 7,337,204 B2
(45) Date of Patent: Feb. 26, 2008

(54) METHOD AND APPARATUS FOR EFFECTIVELY PERFORMING LINEAR TRANSFORMATIONS

(75) Inventors: Avner Dor, Kiayat Ono (IL); Doron Rainish, Ramat-Gan (IL); Daniel Yellin, Raanana (IL)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 11/099,838

(22) Filed: Apr. 5, 2005

(65) Prior Publication Data

US 2005/0177607 A1 Aug. 11, 2005

Related U.S. Application Data

(62) Division of application No. 09/680,665, filed on Oct. 6, 2000, now Pat. No. 6,895,421.

(51) Int. Cl.
 *G06F 17/14* (2006.01)
(52) U.S. Cl. .......................................... 708/400
(58) Field of Classification Search ........ 708/400–409, 708/620, 607
 See application file for complete search history.

(56) References Cited

U.S. PATENT DOCUMENTS

| | | | |
|---|---|---|---|
| 3,920,978 A | 11/1975 | Schmitt et al. | |
| 4,055,756 A | 10/1977 | Jolivet et al. | |
| 4,138,730 A | 2/1979 | Ali | |
| 4,849,922 A | 7/1989 | Riolfo | |
| 4,914,615 A | 4/1990 | Karmarkar et al. | |
| 4,945,506 A | 7/1990 | Baji et al. | |
| 5,093,801 A | 3/1992 | White et al. | |
| 5,267,185 A | 11/1993 | Akabane et al. | |
| 5,301,136 A | 4/1994 | McMillan et al. | |
| 5,357,454 A | 10/1994 | Dent | |
| 5,481,487 A | 1/1996 | Jang et al. | |
| 5,528,528 A | 6/1996 | Bui | |
| 5,561,618 A | 10/1996 | Dehesh | |
| 5,574,675 A | 11/1996 | Lin | |
| 5,831,883 A * | 11/1998 | Suter et al. ................. | 708/404 |
| 5,841,395 A * | 11/1998 | Simone ..................... | 708/404 |
| 5,870,378 A | 2/1999 | Huang et al. | |
| 6,115,728 A | 9/2000 | Nakai et al. | |
| 6,185,595 B1 | 2/2001 | Hori et al. | |

(Continued)

FOREIGN PATENT DOCUMENTS

JP 60 250473 12/1985

(Continued)

OTHER PUBLICATIONS

Doron Rainish, Diversity Transform for Fading Channels, Dec. 1996, IEEE Transactions on Communications, vol. 44, No. 12, pp. 1653-1661.*

(Continued)

*Primary Examiner*—Chat C. Do
(74) *Attorney, Agent, or Firm*—Fish & Richardson P.C.

(57) ABSTRACT

Linear transformations are carried out on a matrix that represents information such as an image or a communication. In an aspect, the matrix is processed to remove duplicate information. The duplicate information can be duplicate rows, or zero rows. This matrix is then transformed into a modified matrix, indicating duplicate information is removed to produce a modified matrix.

13 Claims, 9 Drawing Sheets

U.S. PATENT DOCUMENTS 6,327,602 B1    12/2001    Kim
6,735,610 B1*    5/2004    Pelton ........................ 708/405

FOREIGN PATENT DOCUMENTS

JP            02-273867      11/1990
JP            10/308672      11/1998

OTHER PUBLICATIONS

Daniel Yellin et al., Blind Multi-Channel System Identification and Deconvolution: Performance Bounds, 1996, IEEE. pp. 582-585.*

Andrew Yagle, Fast Algorithms for Matrix Multiplication using Pseudo-number-Theoretic Transforms, 1995, IEEE, pp. 1145-1148.

Steven, Linear Algebra with Applications, 1998, Prentice Hall Inc. $5^{th}$ Edition, pp. 210-211; 250-253; 296-299; and 355-356.

Henning F. Harmuth "Transmission of Information by Orthogonal Functions", Springer-Verlag, Berlin, Heidelberg, New York, 1969, pp. 4-61.

V.V. Losev et al., "Determination of the Phase of a Pseudorandom Sequence form Its Segment Using Fast Transforms", Radio Engineering & Electronic Physics, vol. 26, Aug. 1981.

V.V. Losev, "The Upper Boundary of Complexity of Multiplication of a Vector by a Binary Matrix", Radio Engineering & Electronic Physics, vol. 25, Nov. 1980.

* cited by examiner

Modifying an initial rxn transformation matrix to produce a modified matrix having reduced dimensions
710

Identifying a group of equivalent rows if present, selecting a row from the equivalent rows group to retain, omitting one or more equivalent rows in the equivalent rows group, and storing in memory a ratio between each omitted row and the selected row
712

Omitting zero columns of said initial transformation matrix
714

Normalizing remaining columns of said initial transformation matrix by multiplying the remaining columns by inverses of their lead elements, respectively, to produce a normalized matrix
716

Identifying a group of equal columns in the normalized matrix, selecting a column from the equal columns group to retain, and omitting one or more equal columns in the equal columns group
718

*FIG. 7B*

METHOD AND APPARATUS FOR EFFECTIVELY PERFORMING LINEAR TRANSFORMATIONS

CROSS-REFERENCE TO RELATED APPLICATIONS

This application is a divisional application of U.S. patent application Ser. No. 09/680,665, filed Oct. 6, 2000. The disclosure of the prior application is considered part of (and in incorporated by reference in) the disclosure of this application.

TECHNICAL FIELD

The present invention relates to the fields of digital signal processing. It introduces an improved method and apparatus for performing linear transformations, with reduced number of arithmetic operations, simplified circuitry, and low power consumption.

BACKGROUND

Linear transformations are commonly used for signal or data processing. A linear transformation produce from an n-dimensional vector, considered as "input vector" an r-dimensional vector, considered as "output vector". In many applications the input vector consists of digital samples of a given signal that requires processing. However applications of linear transformations are not restricted to any specific domain, they are essential to every field of science and technology and their efficient performance is highly desirable.

A general linear transformation from the set of n-dimensional vectors (real, complex or from any field of scalars) to the set of r-dimensional vectors (over the same field of scalars), may be represented by a matrix of order r×n given by:

$$A = \begin{bmatrix} a_{11} & a_{12} & \ldots & a_{1n} \\ a_{21} & a_{22} & \ldots & a_{2n} \\ \vdots & & & \\ a_{r1} & & & a_{rn} \end{bmatrix}$$

A general input n-dimensional column vector is written in the following form:

$$x = \begin{bmatrix} x_1 \\ x_2 \\ \vdots \\ x_n \end{bmatrix}$$

The linear transformation produce from the input vector x an output column vector, y of dimension r, through the product of the matrix by the vector which is given by following formula:

$$y = \begin{bmatrix} y_1 \\ y_2 \\ \vdots \\ y_r \end{bmatrix} = \begin{bmatrix} a_{11} & a_{12} & \ldots & a_{1n} \\ a_{21} & a_{22} & \ldots & a_{2n} \\ \vdots & & & \\ a_{r1} & & & a_{rn} \end{bmatrix} \begin{bmatrix} x_1 \\ x_2 \\ \vdots \\ x_n \end{bmatrix}$$

$$= \begin{bmatrix} a_{11}x_1 + & a_{12}x_2 + & \ldots & +a_{1n}x_n \\ a_{21}x_1 + & a_{22}x_2 + & \ldots & +a_{2n}x_n \\ \vdots & \vdots & & \vdots \\ a_{r1}x_1 & a_{r2}x_2 + & \ldots & +a_{rn}x_n \end{bmatrix}$$

A straightforward performance of the linear transformation requires, r·n products and r·(n−1) additions.

Binary matrix are of special importance in the development and application of the present invention. Binary-bipolar matrix are those containing only ±1 values in their entries. Henceforth they would be called U-matrix. A linear transformation represented by a U-matrix will be called U-transformation. In the above presentation, if the given transformation is a U-transformation then r·(n−1) additions/subtractions would be required for its straightforward performance. Another type of binary matrix are those containing only 0,1 values in their entries. They would be called 0-1-matrix. A linear transformation represented by 0-1-matrix is called a 0-1-transformation. In the above presentation, r·(n−1)/2 additions would be required, on average, for a straightforward performance of a 0-1-transformation.

In the current text the term "binary transformation" would consist of the two types of transformations mentioned above: U-transformations and 0-1-transformations. To complete the terminology-introduction it would be mentioned that the term U-vector would refer to a vector having ±1 values in its components and likewise, a vector having 0,1 values in its components will be called a 0-1-vector.

The processing of binary transformations consist of adding and subtracting components of the input vector. They are implemented in hardware as an electronic Application Specific Integrated Circuit (ASIC), requiring elements such as adders and subtractors. The usage of these components is costly and energy consuming and their construction occupies a precious area. A hardware implementation of binary transformations with a low consumption of these resources is of increasing need in numerous fields of technology.

There is a widespread usage of U-transformations in various aspects of digital signal processing. It includes a variety of communication technologies such as image processing and wireless communication.

Currently there is a growing worldwide interest in direct-sequence (DS) code division multiple access (CDMA) spread spectrum communication systems. The IS-95 [TIA/EIA/IS-95-A, "Mobile Station Base Station Compatibility Standard for Dual-Mode Wideband Spread spectrum Cellular System", Feb. 27, 1996] is one example of the developing DS-CDMA systems.

In the CDMA transmission technique a multi-user data is send in a composite signal and then multiplied before transmission by a Pseudo-random Noise (PN) code, which is a U-sequence having random noise properties (such as low cross-correlation). The spreading properties makes transmission resistance to noise, including multi-path noise, jamming or detection. A scrambling code, longer than the channeling code, is also applied. This transmission fashion of the second generation (IS-95-B) and third generation (3G)

wide band (WB) CDMA standards require the receiver to perform multi-code detection. This is a task of despreading the combined channels simultaneously, each of which was previously spread according to a different channeling code. It is done by application of U-transformations where the spreading codes comprising the transformation matrix are often rows of a Hadamard matrix. This is one of the many examples where effective U-transformation techniques are desired for accomplishing the computational tasks with a low consumption of resources.

There are several known mechanisms that improve the performance of specific types of linear transformations. A few relevant examples chosen from a very wide range will be mentioned here. Toplitz transformations which perform convolutions and are used as filters in DSP can be done efficiently by the use of the classical Fast Fourier Transform (FFT) algorithm requiring $O(n \cdot \log_2(n))$ addition and multiplication operations, where n is the dimension of the domain space. In comparison the standard, straightforward methods, require $O(n^2)$ addition and multiplication. For details see: [James W. Cooley and John W. Tukey, "An algorithm for the machine calculation of complex Fourier series", *Mathematics of computation*, 19 (90): 297-301, April 1965.]

A specific type of U-transformation used in digital signal processing including CDMA technologies is the Walsh-Hadamard Transformation which is represented by a Hadamard matrix. A Hadamard matrix can be defined recursively as follows:

$$H_1 = [1], \quad H_2 = \begin{bmatrix} 1 & 1 \\ 1 & -1 \end{bmatrix},$$

and for every integer n, a power of 2:

$$H_{2n} = \begin{bmatrix} H_n & H_n \\ H_n & -H_n \end{bmatrix}$$

A low complexity and energy preserving algorithm for performing this transformation is the Fast Walsh-Hadamard Transform (FWT), which reduces the number of additions/subtractions for nxn Hadamard matrix to $n \cdot \log_2(n)$. This provides an optimal saving in these operations. The fundamental ideas underlying this method are similar to those of the FFT The U-transformation's aspect is modified by another feature of the invention to accommodate for an efficient method and apparatus for the performance of and toplitz U-transformations. These transformations represents full or partial convolution with a given U-sequence or a complex U-sequence. Wireless communication applications of toplitz U-transformations include initial time-synchronization and the searcher which use convolutions with a real or complex pseudo-random (PN) or gold, U-sequences. A gold sequence is composed by the $Z_2$ sum of two PN sequences.

The above binary aspects of the invention are generalized by another aspect of the invention to an efficient method and apparatus for the performance of a linear transformation, represented by an rxn matrix with a relatively small number of different entries. Applications of this advanced aspect of the invention include complex U-transformations and linear transformations represented by an matrix with {0,1,−1)}-entries. This broad preferred embodiment of the invention would be called the generalized-elimination-method (GEM).

Wide band CDMA and probably other branches of advanced DSP future technologies would benefit from the simultaneous analysis of an incoming signal in different spreading factors. This would give way to a multi-code channel that allows the simultaneous reception of different type of information such as fax, normal phone conversation and internet data without overburdening the network. Another aspect of the present invention is an efficient method and apparatus for these type of linear operations. It comprises modified versions of the U-binary aspect of the invention with an additional processor. This additional processor uses information about the number of additions required by the said U-binary method to discover a configuration that applies the U-binary method in various subsections in global low rate of additions.

Additional major applications of the invention include wireless multimedia systems personal satellite mobile systems, GPS satellite-based locating systems and more. In the context of mobile communication and other mobile, computational based, systems a reduction in current consumption used for linear processing is essential. Applications of the invention the in the mobile phone technologies can prolong the life of the battery, reduce circuitry and shorten response time.

DESCRIPTION OF DRAWINGS

These and other features and advantages of the invention will become more apparent upon reading the following detailed description and upon reference to the accompanying drawings.

FIG. 7B is a flowchart showing a detailed view of a machine implemented process for performing a linear transformation.

DETAILED DESCRIPTION

Figure 1:
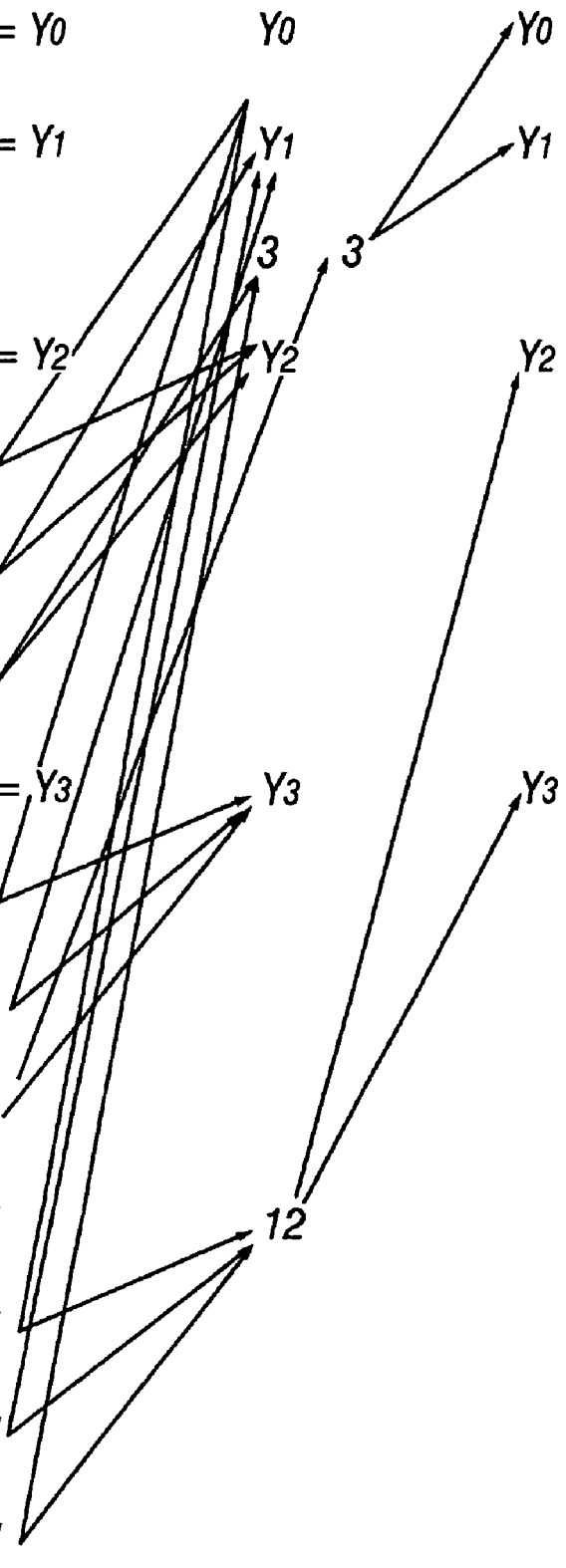
FIG. 1 schematically illustrates the operation of updating the contents of a memory employed by an apparatus which performs the transformation using the 0-1-binary transformation matrix, according to a preferred embodiment of the invention.

There are two new terms that are fundamental for the description of the method of the present invention. The first is that of equivalent vectors. Two non-zero vectors of the same dimension are called equivalent in the text that follows if each of them is a product of the other. This term may be applied to two rows or two columns of a given matrix. The second term is that of a lead element of a column in a given matrix. The definition used throughout the present invention is the non-zero component of highest index in each column of the said matrix. This definition depends on a predefined columns index-order which is used uniformly in the given matrix. A redefinition of new order results with a redefinition of new lead elements. For example the lead elements of a given matrix may be the bottommost non-zero elements or the uppermost non-zero elements of each column depending on whichever order it seemed convenient to choose as relevant for that purpose.

0-1-Matrix

The present preferred embodiment of the invention provides an efficient method of performing a 0-1-binary linear transformation. Henceforth it will be called also the "0-1-method". The following example is an introduction to the 0-1-method and an outline of its main ideas.

Example: Given a 0-1-binary 4×14 matrix A:

$$A = \begin{bmatrix} 0 & 1 & 1 & 0 & 1 & 1 & 0 & 0 & 1 & 0 & 0 & 0 & 1 & 1 \\ 1 & 0 & 0 & 1 & 0 & 1 & 1 & 0 & 0 & 0 & 1 & 1 & 1 & 0 \\ 0 & 0 & 1 & 1 & 1 & 1 & 0 & 0 & 0 & 0 & 1 & 0 & 1 & 1 \\ 1 & 1 & 1 & 1 & 0 & 1 & 1 & 0 & 1 & 0 & 1 & 1 & 1' & 1 \end{bmatrix},$$

and an 14-dimensional input vector, $$x = \begin{bmatrix} x_1 \\ x_2 \\ \vdots \\ x_{14} \end{bmatrix}$$

Suppose that it is desired to compute the 4-dimensional "output" vector:

$$y = \begin{bmatrix} y_1 \\ y_2 \\ y_3 \\ y_4 \end{bmatrix} = \begin{bmatrix} 0 & 1 & 1 & 0 & 1 & 1 & 0 & 0 & 1 & 0 & 0 & 0 & 1 & 1 \\ 1 & 0 & 0 & 1 & 0 & 1 & 1 & 0 & 0 & 0 & 1 & 1 & 1 & 0 \\ 0 & 0 & 1 & 1 & 1 & 1 & 0 & 0 & 0 & 0 & 1 & 0 & 1 & 1 \\ 1 & 1 & 1 & 1 & 0 & 1 & 1 & 0 & 1 & 0 & 1 & 1 & 1' & 1 \end{bmatrix} \begin{bmatrix} x_1 \\ x_2 \\ \vdots \\ x_{14} \end{bmatrix} = A \cdot x.$$

According to a preferred embodiment of the invention the matrix A is first checked for equal lines. Since there are no two lines that are equal, the procedure goes to the next step. Next, the output vector y is expressed as a sum of the columns with coefficients that are the respective input vector coordinates. Hence:

$$y = x_1 \begin{bmatrix} 0 \\ 1 \\ 0 \\ 1 \end{bmatrix} + x_2 \begin{bmatrix} 1 \\ 0 \\ 0 \\ 1 \end{bmatrix} + x_3 \begin{bmatrix} 1 \\ 0 \\ 1 \\ 1 \end{bmatrix} + x_4 \begin{bmatrix} 0 \\ 1 \\ 1 \\ 1 \end{bmatrix} + x_5 \begin{bmatrix} 1 \\ 0 \\ 1 \\ 0 \end{bmatrix} + x_6 \begin{bmatrix} 1 \\ 1 \\ 1 \\ 1 \end{bmatrix} + x_7 \begin{bmatrix} 0 \\ 1 \\ 0 \\ 1 \end{bmatrix} +$$

$$x_8 \begin{bmatrix} 0 \\ 0 \\ 0 \\ 0 \end{bmatrix} + x_9 \begin{bmatrix} 1 \\ 0 \\ 0 \\ 1 \end{bmatrix} + x_{10} \begin{bmatrix} 0 \\ 0 \\ 0 \\ 0 \end{bmatrix} + x_{11} \begin{bmatrix} 0 \\ 1 \\ 1 \\ 1 \end{bmatrix} + x_{12} \begin{bmatrix} 0 \\ 1 \\ 0 \\ 1 \end{bmatrix} + x_{13} \begin{bmatrix} 1 \\ 1 \\ 1 \\ 1 \end{bmatrix} + x_{14} \begin{bmatrix} 1 \\ 0 \\ 1 \\ 1 \end{bmatrix}.$$

At this stage, the zero columns, along with their coefficients would be deleted. The first step done by a preferred embodiment of the invention with respect to the input vector, is to collect and sum coefficients of any recurring non-zero column. Thus with the cost of 6 additions the following reduced vector equation is accomplished:

$$y = (x_1 + x_7 + x_{12}) \begin{bmatrix} 0 \\ 1 \\ 0 \\ 1 \end{bmatrix} + (x_2 + x_9) \begin{bmatrix} 1 \\ 0 \\ 0 \\ 1 \end{bmatrix} +$$

$$(x_3 + x_{14}) \begin{bmatrix} 1 \\ 0 \\ 1 \\ 1 \end{bmatrix} + (x_4 + x_{11}) \begin{bmatrix} 0 \\ 1 \\ 1 \\ 1 \end{bmatrix} + x_5 \begin{bmatrix} 1 \\ 0 \\ 1 \\ 0 \end{bmatrix} + (x_6 + x_{13}) \begin{bmatrix} 1 \\ 1 \\ 1 \\ 1 \end{bmatrix}$$

This expression may be simplified by the following definition:

$w_1 = x_1 + x_7 + x_{12}$, $w_2 = x_2 + x_9$, $w_3 = x_3 + x_{14}$, $w_4 = x_4 + x_{11}$,
$w_5 = x_5$, $w_6 = x_6 + x_{13}$, that implies:

$$y = \begin{bmatrix} y_1 \\ y_2 \\ y_3 \\ y_4 \end{bmatrix} = w_1 \begin{bmatrix} 0 \\ 1 \\ 0 \\ 1 \end{bmatrix} + w_2 \begin{bmatrix} 1 \\ 0 \\ 0 \\ 1 \end{bmatrix} + w_3 \begin{bmatrix} 1 \\ 0 \\ 1 \\ 1 \end{bmatrix} + w_4 \begin{bmatrix} 0 \\ 1 \\ 1 \\ 1 \end{bmatrix} + w_5 \begin{bmatrix} 1 \\ 0 \\ 1 \\ 0 \end{bmatrix} + w_6 \begin{bmatrix} 1 \\ 1 \\ 1 \\ 1 \end{bmatrix}$$

This is equivalent to original problem but with a reduced number of columns. However by now this type of reductions is exhausted. To get further gains the vector equation will be split to the following equivalent set of two vector equations:

$$\begin{bmatrix} y_1 \\ y_2 \end{bmatrix} = w_1 \begin{bmatrix} 0 \\ 1 \end{bmatrix} + w_2 \begin{bmatrix} 1 \\ 0 \end{bmatrix} + w_3 \begin{bmatrix} 1 \\ 0 \end{bmatrix} + w_4 \begin{bmatrix} 0 \\ 1 \end{bmatrix} + w_5 \begin{bmatrix} 1 \\ 0 \end{bmatrix} + w_6 \begin{bmatrix} 1 \\ 1 \end{bmatrix}$$

$$\begin{bmatrix} y_3 \\ y_4 \end{bmatrix} = w_1 \begin{bmatrix} 0 \\ 1 \end{bmatrix} + w_2 \begin{bmatrix} 0 \\ 1 \end{bmatrix} + w_3 \begin{bmatrix} 1 \\ 1 \end{bmatrix} + w_4 \begin{bmatrix} 1 \\ 1 \end{bmatrix} + w_5 \begin{bmatrix} 1 \\ 0 \end{bmatrix} + w_6 \begin{bmatrix} 1 \\ 1 \end{bmatrix}$$

Each of these two equations will be treated separately as in the first step of this preferred embodiment. Thus coefficients of the same nonzero column will be collected and summed. Hence the method arrives at this stage the following set of two vector equations with additional cost of 6 additions:

$$\begin{bmatrix} y_1 \\ y_2 \end{bmatrix} = (w_1 + w_4)\begin{bmatrix} 0 \\ 1 \end{bmatrix} + (w_2 + w_3 + w_5)\begin{bmatrix} 1 \\ 0 \end{bmatrix} + w_6\begin{bmatrix} 1 \\ 1 \end{bmatrix}$$

$$\begin{bmatrix} y_3 \\ y_4 \end{bmatrix} = (w_1 + w_2)\begin{bmatrix} 0 \\ 1 \end{bmatrix} + (w_3 + w_4 + w_6)\begin{bmatrix} 1 \\ 1 \end{bmatrix} + w_5\begin{bmatrix} 1 \\ 0 \end{bmatrix}.$$

Now it is apparent that only 4 additional additions are required to complete the computation of the output vector y. Hence the desired result was accomplished with the total of 16 additions. It can be readily checked that the conventional prior art method of doing this computational process would require 28 additions. The processing description of this preferred embodiment of the invention would reveal a growing relative efficiency of the method as the dimensions of the matrix grows.

In general the 0-1-binary aspect of the invention is an efficient method and apparatus for the product of a binary 0-1-matrix A of dimensions rxn by an n-dimensional vector x. The matrix is given by:

$$A = \begin{bmatrix} a_{11} & a_{12} & \cdots & a_{1n} \\ a_{21} & a_{22} & \cdots & a_{2n} \\ \vdots & & & \\ a_{r1} & & & a_{rn} \end{bmatrix} \text{ where}$$

$$a_{ij} = 0, 1 \text{ for all } 1 \le i \le r, 1 \le j \le n.$$

and the input vector is given by:

$$x = \begin{bmatrix} x_1 \\ x_2 \\ \vdots \\ x_n \end{bmatrix}$$

The entries of the input vector may be real or complex or belong to any field of scalars (such as $Z_2$ for example). The goal is to compute the result of the product of the matrix A by the vector x. This result will be denoted by:

$$y = \begin{bmatrix} y_1 \\ y_2 \\ \vdots \\ y_r \end{bmatrix} = \begin{bmatrix} a_{11} & a_{12} & \cdots & a_{1n} \\ a_{21} & a_{22} & \cdots & a_{2n} \\ \vdots & & & \\ a_{r1} & & & a_{rn} \end{bmatrix} \begin{bmatrix} x_1 \\ x_2 \\ \vdots \\ x_n \end{bmatrix}$$

The procedure that will be described is recursive and the following sequence of steps or part of them will be repeated at each iteration. According to a preferred embodiment of the invention, the first step is a check for equal rows. When possible this step should be done before any processing of input vectors begins, as a preliminary preparation. If it is found that the i-line is equal to the j-line then it can be deducted that $y_i$ is equal to $y_j$. Therefore one of the two equal lines would be omitted. For the sake of clarity the line having larger index would always be the omitted one. Thus, if j>i then the j-line would be omitted. This initial operation is amended at the final step of the execution of the invention where $y_j$ which is known at this stage (since it is equal to $y_i$) is inserted back to its appropriate place in the vector y.

Omitting of equal lines continues until there are no two line in the matrix A that are equal. In practice this stage is skipped in many occasions. It is performed whenever there is a reasonable likelihood for equal lines. It is always performed when $\log_2(r)>n$ since this condition ensures the existence of equal lines.

To avoid cumbersome notation, the modified matrix resulting from this screening process will have the same name, A, as the original matrix, and the names of the dimensions rxn will also be preserved. In the next stage a summation process is introduced to eliminate equal columns. This procedure will reduce the number of columns in the modified matrix with a minimal cost in additions. First, the matrix by vector produce y=A•x is decomposed to the sum of the A-columns multiplied by the respective x-components. Hence:

$$y = A \cdot x = x_1 \begin{bmatrix} a_{11} \\ a_{21} \\ \vdots \\ a_{r1} \end{bmatrix} + x_2 \begin{bmatrix} a_{12} \\ a_{22} \\ \vdots \\ a_{r2} \end{bmatrix} + \ldots + x_n \begin{bmatrix} a_{1n} \\ a_{2n} \\ \vdots \\ a_{rn} \end{bmatrix}$$

Each element of this sum consists of a column vector of the matrix A, multiplied by the corresponding scalar coefficient of the vector x. This sum may be written more compactly as:

$$y = A \bullet x = x_1 v_1 + x_2 v_2 + \ldots + x_n v_n$$

where $v_j$ (for every j) is the j column of A:

$$v_j = \begin{bmatrix} a_{1j} \\ a_{2j} \\ \vdots \\ a_{rj} \end{bmatrix}$$

According to a preferred embodiment of the invention, zero columns, along with their coefficients are omitted at this stage. Next, identical nonzero columns are grouped together and rearranged where each distinct column becomes a common factor, multiplied by the sum of its corresponding scalar coefficients. Hence, the resulting summation comprises the subsequence of all distinct nonzero columns $w_1, \ldots, w_m$ extracted from the original sequence of nonzero column by the omission of repeating columns. Each column $w_j$ is multiplied by a coefficient $t_j$ which is a sum of the corresponding original coefficients of all columns that are equal to this column. It is clear that $m \le n$, and the gap, n−m, is the number of repetitions in the original sequence $v_1, v_2, \ldots, v_n$. The process described above can be formulated by the following mathematical description:

$$y = A \cdot x = \sum_{1 \le j \le n} x_j v_j = \sum_{1 \le k \le m} \sum_{j \text{ such that: } v_j = w_k} x_j v_j = \sum_{1 \le k \le m} \left( \sum_{j \text{ such that: } v_j = w_k} x_j \right) w_k$$

Now for all $1 \le k \le m$ define:

$$t_k = \Sigma_j \text{ such that: } v_j = w_k \, x_j$$

The computational task, so far, is this calculation of the new coefficients $t_1, \ldots, t_m$ as sums of the original ones $x_1, \ldots, x_n$. The cost is n−m additions. The product $y=A \cdot x$ is thus given by:

$$y = A \cdot x = \Sigma_{1 \leq k \leq m} t_k w_k$$

The management aspect of this computation, of determining the participants in the required sums, may be done once-per-matrix as a preliminary preparation before the arrival of input vectors. To summarize, let B be the rxm matrix whose columns are respectively $w_1, \ldots, w_m$, and let:

$$t = \begin{bmatrix} t_1 \\ t_2 \\ \vdots \\ t_m \end{bmatrix}$$

then $y = A \cdot x = B \cdot t$. Thus the above process reduced the original problem of multiplying the rxn matrix A by the n-vector x to the problem of multiplying the rxm matrix B by the m-vector t. The gain enabled by this is larger when m is smaller.

The next step is a horizontal split of the matrix B of the former stage to two or more sub-matrix, where lines are kept unbroken. Each sub-matrix will have a reduced number of rows and that will increase the gain of the above column-collection procedure in the next iteration. The lines of the matrix B would be denoted by: $u_1, u_2, \ldots, u_r$. The product under consideration may be then expressed by:

$$y = B \cdot t = \begin{bmatrix} u_1 \cdot t \\ u_2 \cdot t \\ \vdots \\ u_r \cdot t \end{bmatrix} u_1 \cdot t$$

where each line is multiplied in scalar product by the vector t. In view of this expression the task of computing $y = B \cdot t$ is equivalent to the combined task of computing the r scalar products: $u_1 \cdot t, u_2 \cdot t, \ldots, u_r \cdot t$ According to a preferred embodiment of the invention this would be done by computing the matrix by vector products: $B_1 \cdot t$ and $B_2 \cdot t$ where each of the matrix $B_1$ and $B_2$ contains a subset of the lines of the matrix B and these two subsets are mutually disjoint and their union comprise of the set of all lines in B. Usually, except for the first iteration, the two sub-matrix would have the same or almost the same number of lines. However depending on the properties of the matrix A in some special cases the split might be into more than two matrix. Such is the case when the matrix A has no special inner order, and its entries may be considered as arbitrarily chosen. Then a preferred embodiment of the invention would usually imply that the first line split that will bring all the split sub matrix to the state where $\log_2$(number of columns)>number of rows. The proceeding iterations would then split the lines to two almost equal halves. The case where the matrix is considered arbitrary is essentially a worst case scenario.

Another step that might be inserted instead, or before, the above mentioned horizontal split is a vertical split. According to a preferred embodiment of the invention the above mentioned sum:

$$y = \Sigma_{1 \leq k \leq m} t_k w_k$$

is split in two:

$$y = \Sigma_{1 \leq k \leq p} t_k w_k + \Sigma_{p+1 \leq k \leq m} t_k w_k$$

where p is chosen between 1 and m−1. Thus for $B_1$, the matrix whose set of columns is, $w_1, \ldots, w_p$, and for $B_2$, the matrix whose set of columns is $w_{p+1}, \ldots, w_m$ it holds that:

$$y = B_1 \cdot t' + B_2 \cdot t''$$

where the corresponding vectors are: $t' = (t_1, \ldots, t_p)$ and $t'' = (t_{p+1}, \ldots, t_m)$. Hence by this preferred embodiment of the invention the two lower dimensional products, $B_1 \cdot t'$ and $B_2 \cdot t''$ would be computed separately and in the end the results, which are two r-vectors, are summed together. A preliminary rearrangement of the indexes of the B-columns, $w_1, \ldots, w_m$, may enhance the effectiveness of this step.

The vertical split would be used less frequently then the others procedures. Its main use is in the case that the number of rows substantially exceeds the number of columns, situation less common in DSP applications. The fundamental drawback of this step is in the need to sum up the results of the two products $B_1 \cdot t'$ and $B_2 \cdot t''$ which consists of an additional set of r scalar additions which has no parallel in the above horizontal split. Like in the above horizontal split, depending on the properties of the matrix A the vertical split might be into more than two matrix.

Finally each of the above steps is applied in repeated iterations, forming thus a recursive mechanism.

Next, a bound is presented to the saving enabled by the above method. For an rxn 0-1-matrix A such that $r < \log_2(n)$ the number of additions in the worst case, denoted by $s^*(n, r)$, is given by the expression:

$$s^*(n, r) = n + s^*(r).$$

The following table gives the bound to the number of additions for matrix with a small number of rows.

| | |
|---|---|
| $s^*(2) = -1$ | $s^*(n, 2) = n - 1$ |
| $s^*(3) = 2$ | $s^*(n, 3) = n + 2$ |
| $s^*(4) = 7$ | $s^*(n, 4) = n + 13$ |
| $s^*(5) = 22$ | $s^*(n, 5) = n + 49$ |

There is the following bound to the worst case:

$$s^*(r) < 2^r + 2^{r/2+2} - r.$$

The standard (prior art) method requires u(A)−r additions, where u(A) is the number 1'ns in the matrix A. On average (by expectation, when A is arbitrary) $u(A) = (n-2) \cdot r/2$. Since $s^*(n, r)/n$ approaches 1 as n goes to infinity and r is constant (or $r \leq c \cdot \log_2(n)$ where $1 > c > 0$) this method is asymptotically (for bounded r and unbounded n) optimal.

When A is an rxn 0-1-matrix and there are no assumptions on the dimensions rxn of the matrix A then the number of additions required by the invention to compute the product $A \cdot x$ is bounded by $(1+\delta)n \cdot r/\log_2(n)$, where $1 > \delta > 0$, and □ goes to zero when both, r and n, go to infinity. In the case that r>n a tighter bound (with respect to this case) exist, which results from the application of the vertical split:

$$(1+\delta)n \cdot r/\log_2(r), \text{ where } 1 > \delta > 0,$$

and δ goes to zero when both, r and n, go to infinity.

To assess the efficiency of this process it should be observed that the present invention increases management operations and reduces additions. However additions are a major part of the complexity and their reduction by the use of the invention has a dominant effect. Moreover, most of the management operations are done once per matrix before the processing of data vectors begins. Thus the suggested method substantially saves power consumption and circuitry. The above 0-1-binary aspect may be particularly efficient when the given matrix has some degree of sparsity. This is often encountered when the application of this embodiment is combined with distributed arithmetic's in the computation of the product of a general real matrix by a vector as described in the real-matrix aspect of the invention.

In addition this aspect of the invention is applicable in algebraic codes (see: [Shu Lin, Daniel J. Costello, Jr "Error Control Coding Fundamentals and Applications" Prentice-Hall, Inc., Englewood Cliffs, N.J., 1983]) where in the process of coding and decoding a $Z_2$-matrix is multiplied by a $Z_2$-vector (or $Z_{2^n}$-vector). This is true in any situation where a $Z_2$-matrix is multiplied by a $Z_{2^n}$-vector. Finally, the above 0-1-binary embodiment and the next U-binary embodiment are easily interchangeable in every field of scalars except for fields of characteristic 2. In each particular case the more efficient embodiment would be chosen.

U-Matrix

A preliminary concept required for the description of the U-binary preferred embodiment of the invention (henceforth called also the "U-method") is the concept of equivalence of vectors. Two non-zero vectors of the same dimension would be called equivalent if one is a product of the other. In the context of this embodiment, note that two U-vectors are equivalent if they are equal or if one of them is (−1) product of the other. The following preferred embodiment is rather similar in most details to the above one. The main difference is that in the following text elimination is done to equivalent (rows or columns) vectors rather than to equal vector. This speeds the elimination rate and thus enhances the efficiency. This embodiment is introduced through an example, demonstrating the essence of its ideas: Example: Consider the product of the following 5×13 U-matrix A by a 13-dimensional input vector x.

The matrix is given by:

$$A = \begin{bmatrix} -1 & 1 & -1 & -1 & 1 & 1 & -1 & 1 & 1 & -1 & 1 & -1 & 1 \\ 1 & -1 & -1 & 1 & 1 & -1 & 1 & -1 & -1 & 1 & -1 & -1 & 1 \\ 1 & 1 & -1 & 1 & -1 & -1 & -1 & 1 & -1 & -1 & 1 & 1 & 1 \\ -1 & 1 & 1 & -1 & -1 & 1 & -1 & 1 & -1 & 1 & 1 & 1 & -1 \\ -1 & 1 & -1 & -1 & 1 & 1 & -1 & 1 & 1 & -1 & 1 & 1 & 1 \end{bmatrix}$$

and the input vector is given by:

$$x = \begin{bmatrix} x_1 \\ x_2 \\ \vdots \\ x_{13} \end{bmatrix}$$

The result of the product is written by:

$$y = \begin{bmatrix} y_1 \\ y_2 \\ y_3 \\ y_4 \\ y_5 \end{bmatrix} = A \cdot x$$

The first step in the process is to check for equivalent lines. In practice it is a one time operation done before that arrival of input vectors. A scan discovers one occurrence of equivalent lines in the given matrix, line 2 is equivalent to line 4, in fact line 4 equals to (−1) product line 2. It follows that $y_4 = -y_2$ Therefore it not necessary to compute both $y_4$ and $y_2$, hence the computation of $y_4$ will be omitted. Thus line 4 is deleted from the matrix A. The resulting matrix A' is given by:

$$A' = \begin{bmatrix} -1 & 1 & -1 & -1 & 1 & 1 & -1 & 1 & 1 & -1 & 1 & -1 & 1 \\ 1 & -1 & -1 & 1 & 1 & -1 & 1 & -1 & -1 & 1 & -1 & -1 & 1 \\ 1 & 1 & -1 & 1 & -1 & -1 & -1 & 1 & -1 & -1 & 1 & 1 & 1 \\ -1 & 1 & -1 & -1 & 1 & 1 & -1 & 1 & 1 & -1 & 1 & 1 & 1 \end{bmatrix}$$

The corresponding output vector is given by:

$$y' = \begin{bmatrix} y_1 \\ y_2 \\ y_3 \\ y_5 \end{bmatrix}$$

and it holds that: $y' = A' \cdot x$.

This is the first reduction. In the next step the product $A' \cdot x$ is decomposed to a sum of the A'-columns multiplied by the respective x-components. Therefore:

$$\begin{bmatrix} y_1 \\ y_2 \\ y_3 \\ y_5 \end{bmatrix} = x_1 \begin{bmatrix} -1 \\ 1 \\ 1 \\ -1 \end{bmatrix} + x_2 \begin{bmatrix} 1 \\ -1 \\ 1 \\ 1 \end{bmatrix} + x_3 \begin{bmatrix} -1 \\ -1 \\ -1 \\ -1 \end{bmatrix} +$$

$$x_4 \begin{bmatrix} -1 \\ 1 \\ 1 \\ -1 \end{bmatrix} + x_5 \begin{bmatrix} 1 \\ 1 \\ -1 \\ 1 \end{bmatrix} + x_6 \begin{bmatrix} 1 \\ -1 \\ -1 \\ 1 \end{bmatrix} + x_7 \begin{bmatrix} -1 \\ 1 \\ -1 \\ -1 \end{bmatrix} + x_8 \begin{bmatrix} 1 \\ -1 \\ 1 \\ 1 \end{bmatrix} +$$

$$x_9 \begin{bmatrix} 1 \\ -1 \\ -1 \\ 1 \end{bmatrix} + x_{10} \begin{bmatrix} -1 \\ 1 \\ -1 \\ -1 \end{bmatrix} + x_{11} \begin{bmatrix} 1 \\ -1 \\ 1 \\ 1 \end{bmatrix} + x_{12} \begin{bmatrix} -1 \\ -1 \\ 1 \\ 1 \end{bmatrix} + x_{13} \begin{bmatrix} 1 \\ 1 \\ 1 \\ 1 \end{bmatrix}$$

Next, a normalization of each of the column vectors in the above sum is carried out, such that the upper component of each modified vector is 1. Thus the vector and its coefficient are both multiplied by (−1) if the upper component of the vector is (−1). However no modification is done if the upper component of the vector is 1. The following normalized form of the above sum is derived:

$$\begin{bmatrix} y_1 \\ y_2 \\ y_3 \\ y_5 \end{bmatrix} = (-x_1)\begin{bmatrix} 1 \\ -1 \\ -1 \\ 1 \end{bmatrix} + x_2\begin{bmatrix} 1 \\ -1 \\ 1 \\ 1 \end{bmatrix} + (-x_3)\begin{bmatrix} 1 \\ 1 \\ 1 \\ 1 \end{bmatrix} +$$

$$(-x_4)\begin{bmatrix} 1 \\ -1 \\ -1 \\ 1 \end{bmatrix} + x_5\begin{bmatrix} 1 \\ 1 \\ -1 \\ 1 \end{bmatrix} + x_6\begin{bmatrix} 1 \\ -1 \\ -1 \\ 1 \end{bmatrix} + (-x_7)\begin{bmatrix} 1 \\ -1 \\ 1 \\ 1 \end{bmatrix} + x_8\begin{bmatrix} 1 \\ -1 \\ 1 \\ 1 \end{bmatrix} +$$

$$x_9\begin{bmatrix} 1 \\ -1 \\ -1 \\ 1 \end{bmatrix} + (-x_{10})\begin{bmatrix} 1 \\ -1 \\ 1 \\ 1 \end{bmatrix} + x_{11}\begin{bmatrix} 1 \\ -1 \\ 1 \\ 1 \end{bmatrix} + (-x_{12})\begin{bmatrix} 1 \\ 1 \\ -1 \\ 1 \end{bmatrix} + x_{13}\begin{bmatrix} 1 \\ 1 \\ 1 \\ 1 \end{bmatrix}$$

In this normalized sum the upper component of each vector is 1 and the number of different vectors is reduced. The next step is to collect and sum coefficients of the same column. Thus with the cost of 8 additions the following equation is obtained.

$$\begin{bmatrix} y_1 \\ y_2 \\ y_3 \\ y_5 \end{bmatrix} =$$

$$((-x_1) + (-x_4) + x_6 + x_9)\begin{bmatrix} 1 \\ -1 \\ -1 \\ 1 \end{bmatrix} + (x_2 + (-x_7) + x_8 + (-x_{10}) + x_{11})\begin{bmatrix} 1 \\ -1 \\ 1 \\ 1 \end{bmatrix} +$$

$$((-x_3) + x_{13})\begin{bmatrix} 1 \\ 1 \\ 1 \\ 1 \end{bmatrix} + +x_5\begin{bmatrix} 1 \\ 1 \\ -1 \\ 1 \end{bmatrix} + (-x_{12})\begin{bmatrix} 1 \\ 1 \\ -1 \\ 1 \end{bmatrix}$$

New coefficient would now be defined:

$$w_1 = (-x_1) + (-x_4) + x_6 + x_9, \quad w_2 = x_2 + (-x_7) + x_8 + (-x_{10}) + x_{11},$$

$$w_3 = -x_3 + x_{13}, \quad w_4 = x_5, \quad w_5 = -x_{12}$$

Hence the above equation may be written in the following form:

$$\begin{bmatrix} y_1 \\ y_2 \\ y_3 \\ y_5 \end{bmatrix} = w_1\begin{bmatrix} 1 \\ -1 \\ -1 \\ 1 \end{bmatrix} + w_2\begin{bmatrix} 1 \\ -1 \\ 1 \\ 1 \end{bmatrix} + w_3\begin{bmatrix} 1 \\ 1 \\ 1 \\ 1 \end{bmatrix} + w_4\begin{bmatrix} 1 \\ 1 \\ -1 \\ 1 \end{bmatrix} + w_5\begin{bmatrix} 1 \\ 1 \\ -1 \\ -1 \end{bmatrix}$$

The coefficients: $w_1, w_2, w_3, w_4, w_5$ are known to the processor at this stage. In the next stage this vector equation will be split horizontally to the following set of two equation:

$$\begin{bmatrix} y_1 \\ y_2 \end{bmatrix} = w_1\begin{bmatrix} 1 \\ -1 \end{bmatrix} + w_2\begin{bmatrix} 1 \\ -1 \end{bmatrix} + w_3\begin{bmatrix} 1 \\ 1 \end{bmatrix} + w_4\begin{bmatrix} 1 \\ 1 \end{bmatrix} + w_5\begin{bmatrix} 1 \\ 1 \end{bmatrix}$$

-continued $$\begin{bmatrix} y_3 \\ y_5 \end{bmatrix} = w_1\begin{bmatrix} -1 \\ 1 \end{bmatrix} + w_2\begin{bmatrix} 1 \\ 1 \end{bmatrix} + w_3\begin{bmatrix} 1 \\ 1 \end{bmatrix} + w_4\begin{bmatrix} -1 \\ 1 \end{bmatrix} + w_5\begin{bmatrix} -1 \\ -1 \end{bmatrix}$$

Now each of these equation will be processed separately in the same manner of the first iteration. The upper equation requires no normalization since it inherited the normal state of the previous equation, and thus normalization is required only for the second equation. Hence the resulting set is:

$$\begin{bmatrix} y_1 \\ y_2 \end{bmatrix} = w_1\begin{bmatrix} 1 \\ -1 \end{bmatrix} + w_2\begin{bmatrix} 1 \\ -1 \end{bmatrix} + w_3\begin{bmatrix} 1 \\ 1 \end{bmatrix} + w_4\begin{bmatrix} 1 \\ 1 \end{bmatrix} + w_5\begin{bmatrix} 1 \\ 1 \end{bmatrix}$$

$$\begin{bmatrix} y_3 \\ y_5 \end{bmatrix} = (-w_1)\begin{bmatrix} 1 \\ -1 \end{bmatrix} + w_2\begin{bmatrix} 1 \\ 1 \end{bmatrix} + w_3\begin{bmatrix} 1 \\ 1 \end{bmatrix} + (-w_4)\begin{bmatrix} 1 \\ -1 \end{bmatrix} + (-w_5)\begin{bmatrix} 1 \\ 1 \end{bmatrix}$$

In the next step the coefficients of the same vector are collected and summed. Thus with additional 6 additions the outcome is:

$$\begin{bmatrix} y_1 \\ y_2 \end{bmatrix} = (w_1 + w_2)\begin{bmatrix} 1 \\ -1 \end{bmatrix} + (w_3 + w_4 + w_5)\begin{bmatrix} 1 \\ 1 \end{bmatrix}$$

$$\begin{bmatrix} y_3 \\ y_5 \end{bmatrix} = (-w_1 - w_4)\begin{bmatrix} 1 \\ -1 \end{bmatrix} + (w_2 + w_3 + -w_5)\begin{bmatrix} 1 \\ 1 \end{bmatrix}$$

Clearly, the vector y' is found with 4 more additions. To obtain the original output vector y it is only necessary to recall now that $y_4 = -y_2$. Thus the total of 18 additions was required for this process. Observe that conventional prior art methods would require the total of 60 additions to compute the output vector.

The U-binary preferred embodiment of the invention is an efficient method for the product of a rxm U-matrix A by an n-dimensional input vector x. It usually provides more gain than the 0-1-preferred embodiment and has more applications.

The matrix A is given by:

$$A = \begin{bmatrix} a_{11} & a_{12} & \cdots & a_{1n} \\ a_{21} & a_{22} & \cdots & a_{2n} \\ \vdots & & & \\ a_{r1} & & & a_{rn} \end{bmatrix} \text{ where } a_{ij} = \pm 1 \text{ for all } 1 \le i \le r, 1 \le j \le n.$$

and the input vector is written by:

$$x = \begin{bmatrix} x_1 \\ x_2 \\ \vdots \\ x_n \end{bmatrix}$$

The entries of the input vector may be real or complex or belong to any field of scalars with characteristic larger then 2. The goal is to compute the result of the product:

$$y = A \cdot x.$$

The first step is a modification of the given matrix by the elimination of equivalent lines, a step which may be part of preliminary preparations. If it is found that the i-line is equivalent to the j-line then it can be deducted that $y_i$ is equal to $\pm yj$. Therefore a preferred embodiment of the first step of the invention determines that one of two equivalent lines would be omitted. For the sake of clarity the policy would be that the line having larger index would always be the omitted one. Thus, if it is supported that j>i then the j-line would be omitted. This initial operation is reversed at the final step of the process where yj which is known at this stage is put back to its place in the vector y. This elimination process continues until there are no two line in the modified matrix that are equivalent.

This stage is performed whenever there is a practical probability of equivalent lines. This is often the case in multi-product (another aspect of the present invention) applications of the U-method. This stage is always performed when $\log_2(r) \geq n$ since this condition ensures the existence of equivalent lines. However there are other conditions that ensures the existence of equivalent lines and should be taken into consideration. This for example, may be the case in sub-matrix of the Hadamard matrix. To avoid clumsy notation, the resulting modified matrix will have the same name, A, as the original matrix, and the names of the dimensions rxn will also be preserved.

The next step is the elimination of equivalent columns. This will reduce the horizontal dimension (i.e the number of columns) of the modified matrix with minimal cost in additions. All the management related to this step is made, as in the 0-1-aspect, one time per each matrix usually as preliminary preparation prior to the arrival of data vectors. First, the product $y = A \cdot x$ is expressed as a sum of the A-columns multiplied by the corresponding x-component.

Let $v_j$ (for every j) be the j column of A:

$$v_j = \begin{bmatrix} a_{1j} \\ a_{2j} \\ \vdots \\ a_{rj} \end{bmatrix}$$

Then:

$$A \cdot x = x_1 v_1 + x_2 v_2 + \ldots + x_n v_n$$

Next, the upper element of each column vector of the matrix A is examined and normalized to +1 value, if it is not already +1. Hence, when $a_{1j} = +1$ then no normalization is required whereas if $a_{1j} = -1$ then normalization is takes place and the corresponding j-column vector is multiplied by -1, as well as its corresponding coefficient $x_j$. A new representation of the above sum in is thus obtained, where the upper entry of each vector being equal to +1. In this representation equivalent columns are always equal.

Identical columns are then grouped together, as in the above 0-1-embodiment, and rearranged by taking each column as a common factor, multiplied by the sum of its corresponding scalar coefficients. Hence, the resulting summation comprises the subsequence of all distinct normalized column vectors $w_1, \ldots, w_m$ (having no repetitions) extracted from the sequence of normalized column vectors by screening out repeating normalized columns. Each distinct normalized column $w_j$ is multiplied by a coefficient $t_j$ which is a sum of the corresponding normalized coefficients of all normalized columns that are equal to this column. It is clear that $m \leq n$, and the difference, n−m, is the number of repetitions in the original sequence of normalized columns: $a_{11}v_1, a_{12}v_2, \ldots, a_{1n}v_n$.

Mathematically the process is:

$$A \cdot x = \sum_{1 \leq j \leq n} x_j v_j = \sum_{1 \leq k \leq m} \sum_{j \text{ such that } a_{1j}v_j = w_k} (x_j a_{1j}) a_{1j} v_j = \sum_{1 \leq k \leq m} \sum_{j \text{ such that } a_{1j}v_j = w_k} a_{1j} x_j) w_k$$

For all $1 \leq k \leq m$ define:

$$t_k = \Sigma_j \text{ such that: } v_j = w_k a_{1j} x_j$$

The main computational task involved in this part of the invention is this calculation of the new coefficients $t_1, \ldots, t_m$ as sums of the normalized original ones. The cost in additions is n−m. The product $A \cdot x$ is thus given by:

$$A \cdot x = \Sigma_{1 \leq k \leq m} t_k w_k$$

The gain by the columns elimination process depends on the structure of the original matrix A. It is significant in some of the matrix that are commonly used in coding and decoding signal vectors in wireless communication, such as certain types of submatrix of the Hadamard or the cyclic PN matrix. It is substantial also when r, the number of lines in the matrix A, is small relative to the number of rows n. In particular when $r \leq \log(n)$, in such case $m-n \geq n-2^{r-1} > 0$. These observations are largely true also for 0-1-matrix.

The remaining part of this preferred embodiment of the invention, horizontal and vertical splitting, iterations, is equivalent to its 0-1-counterpart.

To view the saving enabled by the use of the invention note first that additions are the main part of the complexity. For a rxn U-matrix A such that $r \leq \log_2(n)$ the number of additions in the worst case, denoted by s(n, r), is given by:

$$s(n, r) = n + s(r)$$

where:

| | |
|---|---|
| s(1) = −1 | s(n,1) = n − 1 |
| s(2) = 0 | s(n,2) = n |
| s(3) = 3 | s(n,3) = n + 3 |
| s(4) = 8 | s(n,4) = n + 8 |
| s(5) = 19 | s(n,5) = n + 19 |
| s(6) = 38 | s(n,6) = n + 38 |
| s(7) = 75 | s(n,7) = n + 75 |
| s(8) = 144. | s(n,8) = n + 144 |
| s(9) = 283 | s(n,9) = n + 283 |

The following bound is always valid:

$$s(r) < 2^{r-1} + 2^{r/2+1} - r$$

The prior art conventional method requires (n−1)·r additions. Since s(n, r)/n approaches 1 as n goes to infinity and r is constant this method is asymptotically optimal. The more complex multi-product embodiment of the invention that will be described later requires a precise bound to the worst case number of additions. This will be enabled by the following regression formula.

For even r: $s(r) = 2^{r-1} 2s(r/2)$

For odd r: $s(r) = 2^{r-1} + s((r+1)/2) + s((r-1)/2)$

When A is an rxn U-matrix and there are no restrictions on the dimensions rxn of the matrix A then the number of additions required by the invention to compute the product A·x in the worst case is always bounded by: $(1+\delta)n \cdot r/\log_2(n)$, where $1>\delta>0$, and $\delta$ goes to zero when both, r and n, go to infinity. In the case that r>n a tighter bound (with respect to this case) exist, which results from the application of the vertical split:

$(1+\delta)n \cdot r/\log_2(r)$, where $1>\delta>0$, and $\delta$ goes to zero when both, r and n, go to infinity.

However, if there is a specific type of structure in the matrix A then the number of additions required by the preferred embodiment of the present invention to compute the product A·x may drop drastically. The most general conditions for it are beyond the scope of the current text but some examples would be mentioned. However in the cases where A is nxn Hadamard or cyclic pseudo-random (PN) matrix then only $n \cdot \log_2(n)$, additions, and a memory of n scalars, would be required, which is optimal in this respect. This remark holds also for the 0-1-matrix.

Examples of Industrial Applications

There are several technologies that will benefit from implementation of the preferred embodiment of the invention, described above. One such technology is image processing which encompass several procedures which include the product of a U-matrix by a vector. In wireless communication CDMA, IS-95 and in the more advanced third generation wide band CDMA, there are several processes which employ the product of a U-matrix by a vector. These processes will be done with less energy consumption, circuitry and sometimes also running time by the use of the invention.

In the context of multi-code in the IS-95-B, 8 lines of from the Hadamard-64 comprise a U-matrix which is multiplied by a vector whose entries are samples of a signal. Another application is in neighbor detection which done by a despreader. Here too there is a product of a matrix composed of few Hadamard lines by a data vector. Another application is the searcher. It searches for high correlation of sequences by the computation of their mutual scalar product. The correlator sequences are extracted from pseudo random (PN) sequences, which are U-sequences, and their scalar products by a data vector is the required computation. Initial inquisition is one instance of a searcher.

Generalized-Elimination-Method

The above binary aspects of the invention are characterized by iterations of the following processes: zero lines and equivalent lines (meaning that one is a scalar product of the other) are omitted; zero columns are omitted along with the scalar components of the input vector associated with them; equivalent columns are grouped and summed together and the matrix is split horizontally or vertically after these two features are exhausted. According to a preferred embodiment of the invention this iterative sequence of steps may be applied to any product of matrix by vector, in any field of scalars. This broader preferred embodiment of the invention would be called the generalized-elimination-method (GEM).

The summation of equivalent columns is fundamentally a repetition of the following process. Let $v_1, v_2, \ldots, v_n$ be the columns of the transformation matrix A and $x=(x_1, x_2, \ldots, x_n)$ be the input vector and the goal is to compute: A·x. Suppose that it holds after an appropriate rearrangement of the indexes that each of the columns $v_{k+1}, \ldots, v_n$ (for some $2 \leq k<n$) is a scalar product of the k-column, that is for $k<j\leq n$: $v_j=z_j v_k$. Then the n-dimensional vector x is replaced by the reduced k-dimensional vector:

$x'=(x_1, x_2, \ldots, x_{k-1}, x'_k)$ where $x'_k = x_k+x_{k+1} \cdot z_{k+1}+ \ldots +x_n \cdot z_n$ and the rxn matrix is replaced by the reduced rxk matrix A' whose columns are $v_1, v_2, \ldots, v_k$. It then holds that that: A'·x'=A·x. According to a preferred embodiment of the invention this process, including, if necessary a change of indexes, is repeated until no two columns are equivalent. Indeed this is process is simply a generalization of the process of normalization taken place in the U-matrix embodiment of the invention. In practice all the above equivalent-columns reductions may be done simultaneously. When this stage is done it would be considered a first iteration of the whole process. Then the matrix is split horizontally and in each split the above column elimination repeats in a recursive manner as was done in the above embodiments.

As is demonstrated by the U-embodiment and by next example an efficient method to eliminate equivalent columns is by first dividing each column by the upper most component and accordingly multiplying the corresponding coefficient by the same uppermost component. It results with having 1 in the uppermost component of the each modified column. However, sometimes in applications of the GEM the uppermost component of a column in the transformation matrix is zero making this division impossible. In such cases the simple solution is to divide each nonzero column by its uppermost non zero component and accordingly multiply the corresponding coefficient by the same uppermost non zero component. The results is that there is 1 in the uppermost non zero component of the each modified column. This have the desirable consequence that two columns are equivalent in the modified matrix if and only if they are equal.

To allude to cases where this preferred embodiment of the invention enhances the efficiency, consider a matrix having its entries in a relatively small finite set S. In practice this set S maybe a finite field a finite subgroup of the multiplication group of a field or a finite subset of a field closed under multiplication, and in greater generality any finite subset of a field. It includes the binary cases discussed above where $S=\{0,1\}$, or $S=\{1,-1\}$ and other very common situations where $S=\{0,1,-1\}$ or $S=\{1,-1,j,-j\}$ or $S=\{0,1,-1,j,-j\}$. The gain decreases with the size of S and the general rule holds that the GEM reduces the number of additions by a factor of $\log_{|S|}(n)$, where n is the number of columns in the given transformation matrix. When applicable, the GEM should also be compared for efficiency with the complex and general embodiments that will later be described.

To illustrate the way this method works it would be demonstrated for a matrix whose entries are from the set: $U_1=def=\{1, -1, j, -j\}$ called $U_1$-matrix. Such type of matrix appear often in practice. However, it must be emphasized again that the GEM is not limited to any specific type of matrix. The number of additions is bounded by $C=n+4^{r-1}+o(4^{r-1})$ for the product of rxn $U_1$-matrix by a vector.

Example: Consider the produce of the following 3x15 $U_1$-matrix A by a 15-dimensional complex input vector x.

The matrix is given by:

$$A = \begin{bmatrix} 1 & -j & j & -1 & 1 & -j & -1 & j & -1 & j & -1 & 1 & -j & 1 & j \\ -1 & j & -1 & j & 1 & j & 1 & 1 & j & -j & -j & -j & -1 & -j \\ j & 1 & -1 & j & j & j & 1 & -1 & 1 & -1 & -1 & -j & 1 & j & -1 \end{bmatrix}$$

and the input vector is given by:

$$x = \begin{bmatrix} x_1 \\ x_2 \\ \vdots \\ x_{15} \end{bmatrix}$$

The result of the product is written by:

$$y = \begin{bmatrix} y_1 \\ y_2 \\ y_3 \end{bmatrix} = A \cdot x$$

All the additions that are done in this example are complex additions. The first step is a check for equivalent lines. No equivalent lines are found. In the next step the product A·x is decomposed to a sum of the A-columns multiplied by the respective x-components.

$$\begin{bmatrix} y_1 \\ y_2 \\ y_3 \end{bmatrix} = x_1 \begin{bmatrix} 1 \\ -1 \\ j \end{bmatrix} + x_2 \begin{bmatrix} -j \\ j \\ 1 \end{bmatrix} + x_3 \begin{bmatrix} j \\ -1 \\ -1 \end{bmatrix} + x_4 \begin{bmatrix} -1 \\ j \\ j \end{bmatrix} + x_5 \begin{bmatrix} 1 \\ 1 \\ j \end{bmatrix} +$$

$$x_6 \begin{bmatrix} -j \\ j \\ j \end{bmatrix} + x_7 \begin{bmatrix} -1 \\ 1 \\ 1 \end{bmatrix} + x_8 \begin{bmatrix} j \\ 1 \\ 1 \end{bmatrix} + x_9 \begin{bmatrix} -1 \\ j \\ 1 \end{bmatrix} + x_{10} \begin{bmatrix} j \\ -j \\ -1 \end{bmatrix} +$$

$$x_{11} \begin{bmatrix} -1 \\ -j \\ -1 \end{bmatrix} + x_{12} \begin{bmatrix} 1 \\ -j \\ -j \end{bmatrix} + x_{13} \begin{bmatrix} -j \\ -j \\ 1 \end{bmatrix} + x_{14} \begin{bmatrix} 1 \\ -1 \\ j \end{bmatrix} + x_{15} \begin{bmatrix} j \\ -j \\ -1 \end{bmatrix}$$

Next, a normalization of each of the column vectors in the above sum takes place. It is done by multiplying each vector by the inverse of its upper component and accordingly multiplying each coefficient by the (same) upper component of the corresponding vector. Hence the upper component of each modified vector is 1. No modification is needed if the upper component of the vector is already 1. The following normalized form of the above sum is derived.

$$\begin{bmatrix} y_1 \\ y_2 \\ y_3 \end{bmatrix} = x_1 \begin{bmatrix} 1 \\ -1 \\ j \end{bmatrix} + (-j) \cdot x_2 \begin{bmatrix} 1 \\ -1 \\ j \end{bmatrix} +$$

$$j \cdot x_3 \begin{bmatrix} 1 \\ j \\ j \end{bmatrix} + (-1)x_4 \begin{bmatrix} 1 \\ -j \\ -j \end{bmatrix} + x_5 \begin{bmatrix} 1 \\ 1 \\ j \end{bmatrix} + (-j)x_6 \begin{bmatrix} 1 \\ -1 \\ -1 \end{bmatrix} +$$

$$(-1)x_7 \begin{bmatrix} 1 \\ -1 \\ -1 \end{bmatrix} + + j \cdot x_8 \begin{bmatrix} 1 \\ -j \\ j \end{bmatrix} + (-1)x_9 \begin{bmatrix} 1 \\ -j \\ -1 \end{bmatrix} + j \cdot x_{10} \begin{bmatrix} 1 \\ -1 \\ j \end{bmatrix} +$$

$$(-1)x_{11} \begin{bmatrix} 1 \\ j \\ 1 \end{bmatrix} + x_{12} \begin{bmatrix} 1 \\ -j \\ -j \end{bmatrix} + (-j)x_{13} \begin{bmatrix} 1 \\ 1 \\ j \end{bmatrix} + x_{14} \begin{bmatrix} 1 \\ -1 \\ j \end{bmatrix} + j \cdot x_{15} \begin{bmatrix} 1 \\ -1 \\ j \end{bmatrix}$$

In this normalized sum the upper component of each vector is 1 and the number of different vectors is thus reduced substantially when (in the general setting) the number of columns n is sufficiently large relative to the number of rows r (the requirement is: $n > 4^{r-1}$). The next step is to collect and sum coefficients of the same column. Thus with the cost of 7 additions the following reduction is obtained:

$$\begin{bmatrix} y_1 \\ y_2 \\ y_3 \end{bmatrix} = (x_1 + (-j) \cdot x_2 + j \cdot x_{10} + x_{14} + j \cdot x_{15}) \begin{bmatrix} 1 \\ -1 \\ j \end{bmatrix} +$$

$$j \cdot x_3 \begin{bmatrix} 1 \\ j \\ j \end{bmatrix} + ((-1)x_4 + x_{12}) \begin{bmatrix} 1 \\ -j \\ -j \end{bmatrix} + (x_5 + (-j)x_{13}) \begin{bmatrix} 1 \\ 1 \\ j \end{bmatrix} +$$

$$\left((-j)x_6 + (-1)x_7\right) \begin{bmatrix} 1 \\ -1 \\ -1 \end{bmatrix} + j \cdot x_8 \begin{bmatrix} 1 \\ -j \\ j \end{bmatrix} + (-1)x_9 \begin{bmatrix} 1 \\ -j \\ -1 \end{bmatrix} + (-1)x_{11} \begin{bmatrix} 1 \\ j \\ 1 \end{bmatrix}$$

New coefficient would now be defined:

$w_1 = x_1 + (-j) \cdot x_2 + j \cdot x_{10} + x_{14} + j \cdot x_{15}$, $w_2 = j \cdot x_3$ $w_3 = (-1)x_4 + x_{12}$, $w_4 = x_5 + (-j)x_{13}$, $w_5 = (-j)x_6 + (-1)x_7$, $w_6 = j \cdot x_8$, $w_7 = (-1)x_9$, $w_8 = (-1)x_{11}$ Hence the above equation may be written in the following form:

$$\begin{bmatrix} y_1 \\ y_2 \\ y_3 \end{bmatrix} = w_1 \begin{bmatrix} 1 \\ -1 \\ j \end{bmatrix} + w_2 \begin{bmatrix} 1 \\ j \\ j \end{bmatrix} + w_3 \begin{bmatrix} 1 \\ -j \\ -j \end{bmatrix} +$$

$$w_4 \begin{bmatrix} 1 \\ 1 \\ j \end{bmatrix} + w_5 \begin{bmatrix} 1 \\ -1 \\ -1 \end{bmatrix} + w_6 \begin{bmatrix} 1 \\ -j \\ j \end{bmatrix} + w_7 \begin{bmatrix} 1 \\ -j \\ -1 \end{bmatrix} + w_8 \begin{bmatrix} 1 \\ j \\ 1 \end{bmatrix}$$

The coefficients: $w_1, \ldots, w_8$ are known to the processor at this stage. Next, this vector equation will be split horizontally to the following equivalent set of two equation:

$$\begin{bmatrix} y_1 \\ y_2 \end{bmatrix} = w_1 \begin{bmatrix} 1 \\ -1 \end{bmatrix} + w_2 \begin{bmatrix} 1 \\ j \end{bmatrix} + w_3 \begin{bmatrix} 1 \\ -j \end{bmatrix} +$$

$$w_4 \begin{bmatrix} 1 \\ 1 \end{bmatrix} + w_5 \begin{bmatrix} 1 \\ -1 \end{bmatrix} + w_6 \begin{bmatrix} 1 \\ -j \end{bmatrix} + w_7 \begin{bmatrix} 1 \\ -j \end{bmatrix} + w_8 \begin{bmatrix} 1 \\ j \end{bmatrix}$$

$[y_3] = w_1[j] + w_2[j] + w_3[-j] + w_4[j] + w_5[-1] + w_6[j] + w_7[-1] + w_8[1]$

In general both are vectorial equations. However in the present miniature example the second equation is degenerate to a scalar equation. The rule now is that each of these equation will be processed separately in the same manner as the first iteration. The upper equation requires no normalization since it inherited the normal state of the previous equation, and thus in any non degenerate application normalization is required only for the second vectorial equation. Consequently the resulting reduction for the upper vectorial equation is:

$$\begin{bmatrix} y_1 \\ y_2 \end{bmatrix} = (w_1 + w_5)\begin{bmatrix} 1 \\ -1 \end{bmatrix} + (w_2 + w_8)\begin{bmatrix} 1 \\ j \end{bmatrix} + (w_3 + w_6 + w_7)\begin{bmatrix} 1 \\ -j \end{bmatrix} + w_4\begin{bmatrix} 1 \\ 1 \end{bmatrix}$$

The amount of 4 more additions where required for this step. The computation is completed now in a straight forward manner, consuming additional 13 additions for both equations. Thus total of 24 additions where used by the preferred embodiment of the invention in this example. Brute force computation would have required 42 additions. In a larger scale the saving is far more substantial.

Toplitz Matrix

To demonstrate this preferred embodiment of the invention an example would be presented.

Example: Suppose that a sequence of length 8 is given: u=(1,1,−1,−1,1,−1,1,−1) and it is desired to check 3 consecutive hypothesis of the data vector: x=($x_1,x_2, \ldots, x_{10}$). The purpose might be a search for maximal correlation. The following three sums are needed to be calculated.

$y_1 = 1 \cdot x_1 + 1 \cdot x_2 + (-1) \cdot x_3 + (-1) \cdot x_4 + 1 \cdot x_5 + (-1) \cdot x_6 + 1 \cdot x_7 + (-1) \cdot x_8$ $y_2 = 1 \cdot x_2 + 1 \cdot x_3 + (-1) \cdot x_4 + (-1) \cdot x_5 + 1 \cdot x_6 + (-1) \cdot x_7 + 1 \cdot x_8 + (-1) \cdot x_9$ $y_3 = 1 \cdot x_3 + 1 \cdot x_4 + (-1) \cdot x_5 + (-1) \cdot x_6 + 1 \cdot x_7 + (-1) \cdot x_8 + 1 \cdot x_9 + (-1) \cdot x_{10}$ This can be represented by the following toplitz matrix product:

$$\begin{bmatrix} y_1 \\ y_2 \\ y_3 \end{bmatrix} = \begin{bmatrix} 1 & 1 & -1 & -1 & 1 & -1 & 1 & -1 & 0 & 0 \\ 0 & 1 & 1 & -1 & -1 & 1 & -1 & 1 & -1 & 0 \\ 0 & 0 & 1 & 1 & -1 & -1 & 1 & -1 & 1 & -1 \end{bmatrix} \begin{bmatrix} x_1 \\ x_2 \\ \vdots \\ x_{10} \end{bmatrix} =$$

$$x_1\begin{bmatrix} 1 \\ 0 \\ 0 \end{bmatrix} + x_2\begin{bmatrix} 1 \\ 1 \\ 0 \end{bmatrix} + x_3\begin{bmatrix} -1 \\ 1 \\ 1 \end{bmatrix} + x_4\begin{bmatrix} -1 \\ -1 \\ 1 \end{bmatrix} + x_5\begin{bmatrix} 1 \\ -1 \\ -1 \end{bmatrix} +$$

$$x_6\begin{bmatrix} -1 \\ 1 \\ -1 \end{bmatrix} + x_7\begin{bmatrix} 1 \\ -1 \\ 1 \end{bmatrix} + x_8\begin{bmatrix} -1 \\ 1 \\ -1 \end{bmatrix} + x_9\begin{bmatrix} 0 \\ -1 \\ 1 \end{bmatrix} + x_{10}\begin{bmatrix} 0 \\ 0 \\ -1 \end{bmatrix}$$

The next step is to gather complementing vectors, thus:

$$\begin{bmatrix} y_1 \\ y_2 \\ y_3 \end{bmatrix} = \left(x_1\begin{bmatrix} 1 \\ 0 \\ 0 \end{bmatrix} + x_9\begin{bmatrix} 0 \\ -1 \\ 1 \end{bmatrix}\right) + \left(x_2\begin{bmatrix} 1 \\ 1 \\ 0 \end{bmatrix} + x_{10}\begin{bmatrix} 0 \\ 0 \\ -1 \end{bmatrix}\right) +$$

$$x_3\begin{bmatrix} -1 \\ 1 \\ 1 \end{bmatrix} + x_4\begin{bmatrix} -1 \\ -1 \\ 1 \end{bmatrix} + x_5\begin{bmatrix} 1 \\ -1 \\ -1 \end{bmatrix} + x_6\begin{bmatrix} -1 \\ 1 \\ -1 \end{bmatrix} + x_7\begin{bmatrix} 1 \\ -1 \\ 1 \end{bmatrix} + x_8\begin{bmatrix} -1 \\ 1 \\ -1 \end{bmatrix}$$

at this point consider the term inside each of the brackets and make use of the lemma that if x, y are scalars and v, u are vectors then:

$$xv + yu = \frac{1}{2}(x+y)(v+u) + \frac{1}{2}(x-y)(v-u) \text{ hence:}$$

$$x_1\begin{bmatrix} 1 \\ 0 \\ 0 \end{bmatrix} + x_9\begin{bmatrix} 0 \\ -1 \\ 1 \end{bmatrix}$$

$$= \frac{1}{2}(x_1 + x_9)\left(\begin{bmatrix} 1 \\ 0 \\ 0 \end{bmatrix} + \begin{bmatrix} 0 \\ -1 \\ 1 \end{bmatrix}\right) + \frac{1}{2}(x_1 - x_9)\left(\begin{bmatrix} 1 \\ 0 \\ 0 \end{bmatrix} - \begin{bmatrix} 0 \\ -1 \\ 1 \end{bmatrix}\right)$$

$$= \frac{1}{2}(x_1 + x_9)\begin{bmatrix} 1 \\ -1 \\ 1 \end{bmatrix} + \frac{1}{2}(x_1 - x_9)\begin{bmatrix} 1 \\ 1 \\ -1 \end{bmatrix}$$

similarly:

$$x_2\begin{bmatrix} 1 \\ 1 \\ 0 \end{bmatrix} + x_{10}\begin{bmatrix} 0 \\ 0 \\ -1 \end{bmatrix} = \frac{1}{2}(x_2 + x_{10})\begin{bmatrix} 1 \\ 1 \\ -1 \end{bmatrix} + \frac{1}{2}(x_2 - x_{10})\begin{bmatrix} 1 \\ 1 \\ 1 \end{bmatrix}$$

hence with the cost of 4 additions the outcome is:

$$\begin{bmatrix} y_1 \\ y_2 \\ y_3 \end{bmatrix} = \frac{1}{2}(x_1 + x_9)\begin{bmatrix} 1 \\ -1 \\ 1 \end{bmatrix} + \frac{1}{2}(x_1 - x_9)\begin{bmatrix} 1 \\ 1 \\ -1 \end{bmatrix} +$$

$$\frac{1}{2}(x_2 - x_{10})\begin{bmatrix} 1 \\ 1 \\ -1 \end{bmatrix} + \frac{1}{2}(x_2 - x_{10})\begin{bmatrix} 1 \\ 1 \\ 1 \end{bmatrix} + x_3\begin{bmatrix} -1 \\ 1 \\ 1 \end{bmatrix} +$$

$$x_4\begin{bmatrix} -1 \\ -1 \\ 1 \end{bmatrix} + x_5\begin{bmatrix} 1 \\ -1 \\ -1 \end{bmatrix} + x_6\begin{bmatrix} -1 \\ 1 \\ -1 \end{bmatrix} + x_7\begin{bmatrix} 1 \\ -1 \\ 1 \end{bmatrix} + x_8\begin{bmatrix} -1 \\ 1 \\ -1 \end{bmatrix} =$$

but now the above U-binary method can be applied. Thus the next step is a normalization that will make the upper component of each column to be equal to 1.

$$\begin{bmatrix} y_1 \\ y_2 \\ y_3 \end{bmatrix} = \frac{1}{2}(x_1 + x_9)\begin{bmatrix} 1 \\ -1 \\ 1 \end{bmatrix} + \frac{1}{2}(x_1 - x_9)\begin{bmatrix} 1 \\ 1 \\ -1 \end{bmatrix} +$$

-continued $$\frac{1}{2}(x_2+x_{10})\begin{bmatrix}1\\1\\-1\end{bmatrix}+\frac{1}{2}(x_2-x_{10})\begin{bmatrix}1\\1\\1\end{bmatrix}+(-x_3)\begin{bmatrix}1\\-1\\-1\end{bmatrix}+$$

$$(-x_4)\begin{bmatrix}1\\1\\-1\end{bmatrix}+x_5\begin{bmatrix}1\\-1\\-1\end{bmatrix}+(-x_6)\begin{bmatrix}1\\-1\\1\end{bmatrix}+x_7\begin{bmatrix}1\\-1\\1\end{bmatrix}+(-x_8)\begin{bmatrix}1\\-1\\1\end{bmatrix}$$

The next step is to collect and sum coefficients of common columns. Thus with the cost of 6 additional additions we arrive to the equality:

$$\begin{bmatrix}y_1\\y_2\\y_3\end{bmatrix}=\left(\frac{1}{2}(x_1+x_9)+(-x_6)+x_7+(-x_8)\right)\begin{bmatrix}1\\-1\\1\end{bmatrix}+$$

$$\left(\frac{1}{2}(x_1-x_9)+\frac{1}{2}(x_2+x_{10})+(-x_4)\right)\begin{bmatrix}1\\1\\-1\end{bmatrix}+$$

$$\frac{1}{2}(x_2-x_{10})\begin{bmatrix}1\\1\\1\end{bmatrix}+((-x_3)+x_5)\begin{bmatrix}1\\-1\\-1\end{bmatrix}$$

Thus if we define for convenience:

$$w_1=\frac{1}{2}(x_1+x_9)+(-x_6)+x_7+(-x_8),$$

$$w_2=\frac{1}{2}(x_1-x_9)+\frac{1}{2}(x_2+x_{10})+(-x_4)$$

$$w_3=\frac{1}{2}(x_2-x_{10}),\quad w_4=(-x_3)+x_5$$

then the equality is written by:

$$\begin{bmatrix}y_1\\y_2\\y_3\end{bmatrix}=w_1\begin{bmatrix}1\\-1\\1\end{bmatrix}+w_2\begin{bmatrix}1\\1\\-1\end{bmatrix}+w_3\begin{bmatrix}1\\1\\1\end{bmatrix}+w_4\begin{bmatrix}1\\-1\\-1\end{bmatrix}$$

In the next stage this vector equation will be split horizontally to the following set of two equation:

$$\begin{bmatrix}y_1\\y_2\end{bmatrix}=w_1\begin{bmatrix}1\\-1\end{bmatrix}+w_2\begin{bmatrix}1\\1\end{bmatrix}+w_3\begin{bmatrix}1\\1\end{bmatrix}+w_4\begin{bmatrix}1\\-1\end{bmatrix}$$

$$y_3=w_1+(-w_2)+w_3+(-w_4)$$

Collecting identical columns in the first equation we obtain with two more additions:

$$\begin{bmatrix}y_1\\y_2\end{bmatrix}=(w_1+w_4)\begin{bmatrix}1\\-1\end{bmatrix}+(w_2+w_3)\begin{bmatrix}1\\1\end{bmatrix}$$

The desired output vector y can now be found with 5 additional additions. Thus the method embodying the invention required 17 additions to do this computation. A brute force method would require 21 additions. Clearly the gain obtained by this miniature example is not grand but as we shall see the gain in large scale applications is comparable to the gain of the above "square" (non-toplitz) U-method.

Next is a description of the general setup of this aspect of the invention. Suppose a U-sequence is given:

$$u_1, u_2, \ldots, u_n$$

and sequence of data of real or complex scalars:

$$x_1, x_2, \ldots, x_{n+m-1}$$

The elements of the data sequence may be real or complex or belong to any field of scalars of characteristic larger than 2. Suppose that it is desired to calculate the following sums:

$$y_1 = u_1 \cdot x_1 + u_2 \cdot x_2 + \ldots + u_n \cdot x_n$$

$$y_2 = u_1 \cdot x_2 + u_2 \cdot x_3 + \ldots + u_n \cdot x_{n+1}$$

$$y_m = u_1 \cdot x_m + u_2 \cdot x_{m+1} + \ldots + u_m \cdot x_{n+m-1}$$

If $m < \log_2(n)$ then let $r=m$, otherwise, if $m \geq \log_2(n)$, then a preferred embodiment of the invention would start by dividing the set of m sums to blocks of r consecutive sums where $r < \log_2(n)$. All the blocks are treated in an identical way so the method may be demonstrated on the first block. The first r sums can be represented by a product of toplitz matrix by a vector. Consider then the $r \times (n+r-1)$ toplitz matrix:

$$A=\begin{bmatrix}u_1 & u_2 & u_3 & u_4 & \ldots & & \ldots & u_n & 0 & \ldots & 0 & 0\\0 & u_1 & u_2 & u_3 & \ldots & & \ldots & & u_n & 0 & \ldots & \\0 & 0 & u_1 & u_2 & \ldots & & \ldots & & & u_n & 0 & \ldots\\0 & 0 & 0 & u_1 & \ldots & & & & & & & \\. & & & & . & & & & & & . & 0 & 0\\. & & & & & . & & & & & & & 0\\. & & & & & & . & & & & & & \\0 & 0 & \ldots & \ldots & 0 & u_1 & u_2 & \ldots & & & & u_n\end{bmatrix}$$

and the (n+r−1)-dimensional vector:

$$x=\begin{bmatrix}x_1\\x_2\\\vdots\\x_{n+r-1}\end{bmatrix}$$

Then the first r sums are given by the vector:

$$y=\begin{bmatrix}y_1\\y_2\\\vdots\\y_r\end{bmatrix}$$

where:

$$y = A \cdot x.$$

The underlining idea of this preferred embodiment of the invention is to reorganize the given problem such that the above U-method will be applicable. Let $v_1, v_2, \ldots, v_{n+r-1}$ be the columns of the matrix A according to their order. Observe that all the following "middle" column vectors are U-vectors:

$$v_r = \begin{bmatrix} u_r \\ u_{r-1} \\ \vdots \\ u_1 \end{bmatrix}, v_{r+1} = \begin{bmatrix} u_{r+1} \\ u_r \\ \vdots \\ u_2 \end{bmatrix}, \ldots, v_n = \begin{bmatrix} u_n \\ u_{n-1} \\ \vdots \\ u_{n-r+1} \end{bmatrix}$$

Note also the following sums and subtractions of "matching" pairs of "side" column vectors are also U-vectors:

$$v_1 + v_{n+1} = \begin{bmatrix} u_1 \\ 0 \\ \vdots \\ 0 \end{bmatrix} + \begin{bmatrix} 0 \\ u_n \\ \vdots \\ u_{n-r+2} \end{bmatrix} = \begin{bmatrix} u_1 \\ u_n \\ u_{n-1} \\ \vdots \\ u_{n-r+2} \end{bmatrix},$$

$$v_1 - v_{n+1} = \begin{bmatrix} u_1 \\ 0 \\ \vdots \\ 0 \end{bmatrix} - \begin{bmatrix} 0 \\ u_n \\ \vdots \\ u_{n-r+2} \end{bmatrix} = \begin{bmatrix} u_1 \\ -u_n \\ -u_{n-1} \\ \vdots \\ -u_{n-r+2} \end{bmatrix}$$

$$v_2 + v_{n+2} = \begin{bmatrix} u_1 \\ u_2 \\ \vdots \\ 0 \end{bmatrix} + \begin{bmatrix} 0 \\ 0 \\ u_n \\ \vdots \\ u_{n-r+3} \end{bmatrix} = \begin{bmatrix} u_1 \\ u_2 \\ u_n \\ \vdots \\ u_{n-r+3} \end{bmatrix},$$

$$v_2 - v_{n+2} = \begin{bmatrix} u_1 \\ u_2 \\ \vdots \\ 0 \end{bmatrix} + \begin{bmatrix} 0 \\ 0 \\ u_n \\ \vdots \\ u_{n-r+3} \end{bmatrix} = \begin{bmatrix} u_1 \\ u_2 \\ -u_n \\ \vdots \\ -u_{n-r+3} \end{bmatrix}$$

...

...

$$v_{r-1} + v_{n+r-1} = \begin{bmatrix} u_{r-1} \\ u_{r-2} \\ \vdots \\ u_1 \\ 0 \end{bmatrix} + \begin{bmatrix} 0 \\ 0 \\ \vdots \\ 0 \\ u_n \end{bmatrix} = \begin{bmatrix} u_{r-1} \\ u_{r-2} \\ \vdots \\ u_1 \\ u_n \end{bmatrix},$$

$$v_{r-1} - v_{n+r-1} = \begin{bmatrix} u_{r-1} \\ u_{r-2} \\ \vdots \\ u_1 \\ 0 \end{bmatrix} - \begin{bmatrix} 0 \\ 0 \\ \vdots \\ 0 \\ u_n \end{bmatrix} = \begin{bmatrix} u_{r-1} \\ u_{r-2} \\ \vdots \\ u_1 \\ -u_n \end{bmatrix}$$

After working the necessary preliminary preparations the method may be introduced. Rearranging with accordance to the above:

$$A \cdot x = \sum_{1 \le j \le n+r-1} x_j v_j$$
$$= \sum_{1 \le j \le r-1} x_j v_j + x_{n+j} v_{n+j} + \sum_{r \le j \le n} x_j v_j$$

Next the invention uses the rule that if x, y are scalars and v, u are vectors then:

$$xv + yu = \frac{1}{2}(x+y)(v+u) + \frac{1}{2}(x-y)(v-u). \text{ Thus:}$$

$$A \cdot x = \sum_{1 \le j \le r-1} \frac{1}{2}(x_j + x_{n+j})(v_j + v_{n+j}) + \frac{1}{2}(x_j - x_{n+j})(v_j - v_{n+j}) + \sum_{r \le j \le n} x_j v_j$$

This process cost 2r−2 additions and the form that was accomplished is in fact a product of an rx(n+r−1) U-matrix by a n+r−1-vector. This is so since by the above all the vectors:

$$v_r, v_{r+1}, \ldots, v_n, v_1+v_{n-1}, \ldots, v_{r-1}+v_{n+r-1}, v_1-v_{n+1}, \ldots, v_{r+1}-v_{n+r-1}$$

are U-vectors. Thus the rest of the computation may be done by the U-method. All the aspects of this modification to U-form, except for the actual summations/subtractions: $x_j \pm x_{n+j}$, are done as a "one time job" prior to the arrival of the input vectors.

The number of additions in the worst case is given by the expression:

$$s_t(n, r) = s(n+r-1, r) + 2r - 2 = n + 3r - 3 + s(r)$$

In the general setting, where sums m are computed and $m > \log_2(n)$ the number of additions in the worst case is bounded by $(1+\delta)(n+3\log_2(n)) \cdot m/\log_2(n)$, where $1 > \delta > 0$, and $\delta$ goes to zero when both, m and n, go to infinity.

According to another preferred embodiment of the invention into the above method components of the GEM may be integrated. In such case some of the "side" columns remain unprocessed by the first stage of coupling side columns.

(0,1,−1)-Matrix

Toplitz matrix is part of a more general class of matrix: those matrix whose entries are 0, 1 or −1. Such matrix would be called in here (0,1,−1)-matrix. A broader version of the ideas related to the above toplits—method would now be developed. Suppose that A is (0,1,−1)-matrix of dimensions rxn and x is an n-dimensional input vector and it is desired to compute the product: A•x. This product may be expressed as a sum of the A-columns multiplied by the corresponding x-component. Thus, denote by $v_j$ (for every j) be the j column of A, then:

$$A \cdot x = x_1 v_1 + x_2 v_2 + \ldots + x_n v_n$$

Some or maybe all the columns of A contain 0-entries. For the sake of notational simplicity it might be assumed that indexes are so arranged (methodically of course, without tasking the processor) that each of the first k-columns $v_1$, $v_2, \ldots, v_k$ contains a zero entry and all the remaining n–k columns (if there are any), $v_{k+1}, v_{k+2}, \ldots, v_n$ are U-vectors (that is, with 0 entries). It is clear that each of the "mixed" vectors: $v_1, v_2, \ldots, v_k$, is an average of 2 U-vectors. Hence for each $1 \leq j \leq k$ there exists two U-vectors $u_j$, $w_j$, such that:

$$v_{j_*} = \frac{1}{2}(u_j + w_j).$$

A preferred embodiment of the invention finds the vectors $u_1, w_1, \ldots, u_k, w_k$, as a preliminary once-per-matrix preparation. Therefore by the above:

$$A \cdot x = \frac{1}{2}x_1(u_1 + w_1) + \frac{1}{2}x_2(u_2 + w_2) + \ldots + \frac{1}{2}x_k(u_k + w_k) + x_{k+1}v_{k+1} + \ldots + x_n v_n$$

However with the opening of the brackets we find a representation of a product of an rx(n+k) U-matrix by a (n+k)-vector. According to a preferred embodiment of the invention this task would be done by the above U-aspect of the invention. The above toplitz aspect of the invention is a special case of this broader aspect.

EXAMPLES OF INDUSTRIAL APPLICATIONS

The searcher is usually represented by the product of a Toplitz matrix by a data vector. This is so both in CDMA and wideband CDMA.

Real Matrix

According to another preferred embodiment of the invention, the number of computational operations may be reduced for any real linear transformation by the use of distributed arithmetic's. In the proceeding text it will be called the "real-matrix-method". The linear transformation is represented by a matrix whose entries are real numbers, not necessarily integers, having a fixed number of binary digits. The matrix will be decomposed to a sum of binary matrix with binary coefficients. In the next stage the binary embodiments of the invention will be applied. To introduce this method consider the following example.

Example: Consider the following 3×8 U-matrix, A, having (for the simplicity sake of this example) integer entries and written in the decimal basis:

$$A = \begin{bmatrix} 2 & 1 & 5 & 4 & 3 & 0 & 4 & 5 \\ 5 & 0 & 4 & 1 & 4 & 7 & 1 & 2 \\ 2 & 7 & 3 & 1 & 4 & 5 & 0 & 3 \end{bmatrix}$$

The input, 8-dimensional vector, is given by:

$$x = \begin{bmatrix} x_1 \\ x_2 \\ x_3 \\ x_4 \\ x_5 \\ x_6 \\ x_7 \\ x_8 \end{bmatrix}$$

It is desired to compute the 3-dimensional output vector:

$$y = \begin{bmatrix} y_1 \\ y_2 \\ y_3 \end{bmatrix} = A \cdot x.$$

Since processors normally work on binary basis the matrix A will be represented in this basis and thus it is given by:

$$A = \begin{bmatrix} 010 & 001 & 101 & 100 & 011 & 000 & 100 & 101 \\ 101 & 000 & 100 & 001 & 100 & 111 & 001 & 010 \\ 010 & 111 & 011 & 001 & 100 & 101 & 000 & 011 \end{bmatrix}$$

This representation suggests the possibility of using distributed arithmetic's to express the matrix as a sum of three binary matrix:

$$A = 2^0 \cdot A[0] + 2^1 \cdot A[1] + 2^2 \cdot A[2].$$

Where:

$$A[0] = \begin{bmatrix} 0 & 1 & 1 & 0 & 1 & 0 & 0 & 1 \\ 1 & 0 & 0 & 1 & 0 & 1 & 1 & 0 \\ 0 & 1 & 1 & 1 & 0 & 1 & 0 & 1 \end{bmatrix}$$

$$A[1] = \begin{bmatrix} 1 & 0 & 0 & 0 & 1 & 0 & 0 & 0 \\ 0 & 0 & 0 & 0 & 0 & 1 & 0 & 1 \\ 1 & 1 & 1 & 0 & 0 & 0 & 0 & 1 \end{bmatrix}$$

$$A[2] = \begin{bmatrix} 0 & 0 & 1 & 1 & 0 & 0 & 1 & 1 \\ 1 & 0 & 1 & 0 & 1 & 1 & 0 & 0 \\ 0 & 1 & 0 & 0 & 1 & 1 & 0 & 0 \end{bmatrix}$$

Thus the first step taken by this embodiment of the invention is the construction of the binary matrix A[0], A[1], A[2] comprising the bits of the entries of A according to their significance. The preferred embodiment under consideration will be a consequence of the equality:

$$A \cdot x = 2^0 \cdot A[0] \cdot x + 2^1 \cdot A[1] \cdot x + 2^2 \cdot A[2] \cdot x.$$

The next step is to compose the 24×3 binary matrix A* formed by horizontal chaining of A[0], A[1], A[2]

$$A^* = \begin{bmatrix} 0 & 1 & 1 & 0 & 1 & 0 & 0 & 1 \\ 1 & 0 & 0 & 1 & 0 & 1 & 1 & 0 \\ 0 & 1 & 1 & 1 & 0 & 1 & 0 & 1 \end{bmatrix} \begin{bmatrix} 1 & 0 & 0 & 0 & 1 & 0 & 0 & 0 \\ 0 & 0 & 0 & 0 & 0 & 1 & 0 & 1 \\ 1 & 1 & 1 & 0 & 0 & 0 & 0 & 1 \end{bmatrix}$$

-continued $$\begin{bmatrix} 0 & 0 & 1 & 1 & 0 & 0 & 1 & 1 \\ 1 & 0 & 1 & 0 & 1 & 1 & 0 & 0 \\ 0 & 1 & 0 & 0 & 1 & 1 & 0 & 0 \end{bmatrix}$$

and also to form the 24-dimensional column vector x* comprised from 3 replicas of the vector x each with the corresponding binary weight deduced from the above sum. This is done before the arrival of input vectors begins.

$$x^* = \begin{bmatrix} 2^0 x_1 \\ \vdots \\ 2^0 x_8 \\ 2^1 x_1 \\ \vdots \\ 2^1 x_8 \\ 2^2 x_1 \\ \vdots \\ 2^2 x_8 \end{bmatrix}$$

Note that multiplying by $2^1$ requires only index shifting operation. The key to this embodiment is the assertion that:

$$y = A \cdot x = A^* \cdot x^*$$

Thus in what follows a computation of $A^* \cdot x^*$ through the 0-1-method would take place. Hence the next job is to collect and sum coefficients of common nonzero columns, creating new coefficients and thereby reducing the size of the matrix.

Hence it holds that:

$$y = w_1 \begin{bmatrix} 1 \\ 0 \\ 0 \end{bmatrix} + w_2 \begin{bmatrix} 0 \\ 1 \\ 0 \end{bmatrix} + w_3 \begin{bmatrix} 1 \\ 1 \\ 0 \end{bmatrix} + w_4 \begin{bmatrix} 0 \\ 0 \\ 1 \end{bmatrix} + w_5 \begin{bmatrix} 1 \\ 0 \\ 1 \end{bmatrix} + w_6 \begin{bmatrix} 0 \\ 1 \\ 1 \end{bmatrix}$$

where:

$w_1 = 2^2 \cdot X_7 + 2^2 \cdot X_8 + 2^1 \cdot X_4 + 2^1 \cdot X_5 + 2^0 \cdot X_5$ $w_2 = 2^2 \cdot X_1 + 2^1 \cdot X_6 + 2^0 \cdot X_1 + 2^0 \cdot X_7$ $w_3 = 2^2 \cdot X_3$ $w_4 = 2^2 \cdot X_2 + 2^1 \cdot X_2 + 2^1 \cdot X_3$ $w_5 = 2^1 \cdot X_5 + 2^0 \cdot X_2 + 2^0 \cdot X_1 + 2^0 \cdot X_3 + 2^0 \cdot X_8$ $w_6 = 2^2 \cdot X_1 + 2^1 \cdot X_6 + 2^0 \cdot X_1 + 2^0 \cdot X_7$ This was done with a cost of 16 additions. Next, a row splitting of the resulting matrix takes place. Hence:

$$\begin{bmatrix} y_1 \\ y_2 \end{bmatrix} = w_1 \begin{bmatrix} 1 \\ 0 \end{bmatrix} + w_2 \begin{bmatrix} 0 \\ 1 \end{bmatrix} + w_3 \begin{bmatrix} 1 \\ 1 \end{bmatrix} + w_5 \begin{bmatrix} 1 \\ 0 \end{bmatrix} + w_6 \begin{bmatrix} 0 \\ 1 \end{bmatrix}$$

and:

$y_3 = w_1 + w_3 + w_5$

Now, summing the coefficients of common columns in the first equation yields:

$$\begin{bmatrix} y_1 \\ y_2 \end{bmatrix} = (w_2 + w_5) \begin{bmatrix} 1 \\ 0 \end{bmatrix} + (w_2 + w_6) \begin{bmatrix} 0 \\ 1 \end{bmatrix} + w_3 \begin{bmatrix} 1 \\ 1 \end{bmatrix}$$

This step cost 2 additions. The rest is done with 2 more additions. Total 20 addition operations where required to compute the transformation in this example. The use of conventional methods would have required the equivalent of 29 addition operations, where by "equivalent" we mean that additions comprising product operations are also taken into account.

Obviously this is not an example of outstanding saving. It is rather an easy introduction to the idea of this embodiment of the invention. However substantial saving is accomplished by the invention when the parameters of the matrix (dimensions and number of digits for each entry) are large.

In general, the preferred embodiment of the invention under consideration relates to an efficient computation of a real, unrestricted, linear transformation. The rxm matrix A representing the transformation is written by:

$$A = \begin{bmatrix} a_{11} & a_{12} & \cdots & a_{1n} \\ a_{21} & a_{22} & \cdots & a_{2n} \\ \vdots & & & \\ a_{r1} & & & a_{rn} \end{bmatrix}$$

where the entries of the matrix are real numbers. It is desired to compute $A \cdot x$ where x is an n-dimensional vector of real or complex scalar entries written by:

$$x = \begin{bmatrix} x_1 \\ x_2 \\ \vdots \\ x_n \end{bmatrix}$$

It is assumed that the entries of the matrix A are written in binary basis with fixed numbers of digits before and after the point. Two preferred embodiments of the invention will be presented as optional solutions and the choice between then depends on the structure of the transformation matrix. The first is called the 0-1-decomposition, the second is called the U-decomposition.

It is presumed that the entries of the matrix A are bounded by $2^{m_1}$ and have accuracy of $m_2$ digits beyond the point for appropriate positive integers $m_1$ and $m_2$. This assumption does not restrict the scope of the invention, since every scalar encountered by a processor has a finite number of digits before and after the point. Put $m = m_1 + m_2 + 1$. Distributed arithmetic's would be applied to break the product $A \cdot x$ into a sum of m binary products of the type treated by the example above.

First the invention is described in the case that the entries of the matrix are nonnegative and the decomposition is 0-1-based. A real number t bounded by $2^{m_1}$ and having $m_2$ digits beyond the point may be represented in the following way:

$$t = \sum_{-m_2 \leq k \leq m_1} t_k \cdot 2^k$$

where each $t_k$ is 0 or 1. This is the standard binary representation. By a typical distributed arithmetic's argument A can be decomposed to a sum of m rxn 0-1-binary-matrix in the following way:

$$A = \sum_{-m_2 \leq k \leq m_1} 2^k \cdot A[k]$$

In this sum $A[m_1]$ is the 0-1-matrix of the most significant bits (MSB), $A[-m_2]$ is the 0-1-matrix of the least significant bits (LSB). In general, each of the matrix A[k] is a 0-1-matrix whose entries are comprised of the k's-significant-bits of the entries of A, where each bit is placed in its corresponding entry. By the distributive rule it follows that:

$$A \cdot x = \sum_{-m_2 \leq k \leq m_1} 2^k \cdot A[k] \cdot x.$$

This is the basis for the current embodiment of the invention. Next let A* be the rx(m•n) 0-1-matrix composed by the horizontal lining of the binary matrix of the above sum in the order they appear in the sum. Then, $$A^* = [A[-m_2], \ldots, A[0], \ldots, A[m_1]]$$

This would be done, one time for any given matrix, before the arrival of input vectors begins. In addition let the m•n-dimensional column vector x* be given by:

$$x^* = \begin{bmatrix} 2^{-m_2} x \\ 2^{-m_2+1} x \\ \vdots \\ 2^0 x \\ \vdots \\ 2^{m_1} x \end{bmatrix}$$

The key observation underlining the embodiment under consideration is that:

$$A \cdot x = A^* \cdot x^*$$

The latter is a product of a rx(m•n) 0-1-matrix by a (m+1)•n-dimensional vector which is composed of shifted m replicas of the original vector.

The computation of the product A*•x* is done with the 0-1-binary-embodiment of invention. Since each multiplication by an integer power of 2 may be implemented by shifting the bits, very little additional complexity is added.

This embodiment of the invention may reduce significantly the complexity of the product.

Let:

$$l = \log_2(m \cdot n) = \log_2(m) + \log_2(n)$$

and let C(A) be the number of additions required by the invention to compute A*•x*. If $1 \geq r$ then:

$$C(A) < m \cdot n + 2^r + 2^{r/2+1} - r.$$

Particularly we see that in this case the cruder bound:

$$C(A) < 2m \cdot n.$$

When we drop the assumption that $1 \geq r$, it holds that:

$$C(A) < (1+\delta) \cdot m \cdot r \cdot n / l$$

where $1 > \delta > 0$ and $\delta$ goes to zero as m•n and r goes to infinity. The conventional (brute force) prior art method of computing the product A•x requires, on average, the equivalent of n•r•m/2 additions, where additions comprising the product operations are taken into account.

In some cases, particularly when r=1, or when r is rather small another variation of the above mentioned embodiment might be preferred, to enable further saving. Note that in the case r=1 the problem is reduced to that of a scalar product between two vectors. This itself is a rather common computation in science and technology and its efficient performance is of much use. According to this variation a matrix A** is formed by the chaining the matrix, $A[-m_2]$, $A[-m_2], \ldots, A[0], \ldots, A[m_1]$ is a vertical sequence. Thus it is the r•(m+1)xn 0-1-matrix given by:

$$A^{**} = \begin{bmatrix} A[-m_2] \\ \vdots \\ A[0] \\ \vdots \\ A[m_1] \end{bmatrix}$$

Next, the computation of A•x is done by the preferred embodiment of the invention for 0-1-matrix. The product A•x contains all the products: $A[-m_2] \cdot x, \ldots, A[0] \cdot x, \ldots, A[m_1] \cdot x$. Hence, using shifts for the binary multiplication's the desired result is achieved by performing the sum:

$$y = \sum_{-m_2 \leq k \leq m_1} 2^k \cdot A[k] \cdot x$$

This concludes the part of matrix with nonnegative entries.

When the matrix A is real, having entries of both signs then the matrix A can be expressed as a subtraction of two matrix with nonnegative entries: $A = A_1 - A_2$. Following this representation, the aspect of the invention under discussion carries out the calculation of y=A•x by computing first each of the products $y_1 = A_1 \cdot x$ and $y_2 = A_2 \cdot x$, separately or in a combined form by the above method. Then the final step is the carrying out of the subtraction: $y = y_1 - y_2$. The above 0-1-binary option of a preferred embodiment of the invention with respect to a real matrix is particularly efficient when the decomposing binary matrix: $A[-m_2]$, $A[-m_2+1], \ldots, A[0], \ldots, A[m_1]$ are rather sparse. This may a consequence of the A-entries being of various sizes and having non-uniform number of binary digits beyond the point. In such cases the zero padding necessary for the above mentioned uniform digital format causes a higher level of sparsity.

Another form of the preferred embodiment of the invention, based on U-binary distributed arithmetic's, will be described by the next text. This form of the invention has the advantage of being more adaptive to matrix having entries of both signs and of being based on the faster U-method. In practice it is more efficient then the above 0-1-version when there is some uniformity in size and accuracy of the entries of the matrix. The main features of the following method are similar to the 0-1-method.

The following observation is required for the proceeding description of the invention. A real number t bounded by $2^m 1$ and having $m_2$ digits beyond the point can be represented as a U-binary sum in the following way:

$$t = \sum_{-m_2-1 \leq k \leq m_1-1} s_k \cdot 2^k + s_{m_1} \cdot (2^{m_1} - 2^{-m_2-1}).$$

where all $s_k$, for $-m_2-1 \leq k \leq m_1-1$ are $\pm 1$ and $s_{m_1} = 1$ when t is non negative and $s_{m_1} = -1$ when t is negative.

Therefore an rxn real matrix A with entries of both signs can be decomposed to a sum of U-matrix in the following way:

$$A = \sum_{-m_2-1 \leq k \leq m_1-1} 2^k \cdot A[k] + (2^{m_1} - 2^{-m_2-1}) \cdot A[m_1].$$

Where each of the matrix A[k] is a rxn U-matrix.

Let A* be the rx((m+1)•n) U-matrix:

$$A^* = [A[-m_2-1], A[-m_2], \ldots, A[0], \ldots, A[m_1-1], A[m_1]]$$

This matrix is composed as a one time task per each matrix before the arrival of incoming data vectors.

In addition the (m+1)•n-dimensional column vector x* is defined by:

$$x^* = \begin{bmatrix} 2^{-m_2-1}x \\ 2^{-m_2}x \\ \vdots \\ 2^0 x \\ \vdots \\ 2^{m_1-1}x \\ (2^{m_1} - 2^{-m_2-1}) \cdot x \end{bmatrix}$$

It holds that:

$$A \cdot x = A^* \cdot x^*$$

This is a product of a rx((m+1)•n) U-matrix by a (m+1)•n-dimensional vector. The computation of this product is done by application of the U-matrix embodiment of the invention.

As in the above method pertaining to 0-1-binary decomposition, also here there is vertical version for r=1 or small r. It is completely analog to the one described above and there is no reason to repeat the details.

Let 1=log((m+1)•n)=log(m+1)+log(n). It holds for 1≧r, that the number of additions required to perform the above method is bounded by $$C(A) < (m+1) \cdot n + 2^{r-1} + 2^{r/2+1} - r.$$

As in the above text, C(A) is defined to be the number of additions required by the above U-embodiment to compute A•x. In greater generality, it holds that:

$$C(A) < (1+\delta) \cdot (m+1) \cdot r \cdot n / 1$$

where 1>δ>0 and δ goes to zero as (m+1)•n and r goes to infinity.

Examples of Industrial Applications

Linear transformations are commonly used in every fields of technology and science. Applications of the real matrix aspect of the invention in communication technology include products of multi-user detector (MUD) matrix (such as decorrelators or minimum mean square error (MMSE) matrix) by a output vector of a despreader. It is also applicable in the calculations of least squares. Finite Impulse Response (FIR) filters where Discrete Fourier Transform (DFT) are fully or partially computed. Especially FIR filters of partial DFT and those of small and medium size where FFT is not efficient are instances where this feature of the invention is applicable. Discrete cosine transform DCT is another type of linear transformation whose computation may be improved by the invention. This is so especially when it is only partially calculated or when its size is not too large so that higher dimension fast algorithms are not very efficient.

In some digital signal processing applications, such as processing circuitry which employs FIR's, correlation of two relatively long vectors is required. One of the vectors may represent taps of a FIR filter which operates on a second vector, representing an input that should be filtered. Filtering operation consisting of partial convolution is represented by the product of a Toplits matrix by a vector. This is done efficiently by the real matrix aspect of the invention.

Complex Matrix

Example: Suppose that it is desired to compute the following sums:

$$y_1 = (1+j) \cdot x_1 + (1-j) \cdot x_2 + (-1-j) \cdot x_3 + (-1+j) \cdot x_4 + (1-j) \cdot x_5 + (-1+j) \cdot x_6$$

$$y_2 = (-1+j) \cdot x_1 + (1+j) \cdot x_2 + (1+j) \cdot x_3 + (-1-j) \cdot x_4 + (-1-j) \cdot x_5 + (1-j) \cdot x_5$$

$$y_3 = (1-j) \cdot x_1 + (-1-j) \cdot x_2 + (-1-j) \cdot x_3 + (1+j) \cdot x_4 + (-1+j) \cdot x_5 + (1+j) \cdot x_6$$

where the input scalars $x_1, x_2, \ldots, x_6$ are complex numbers.

The conventional prior art approach would require 66 real additions. This is seen when we take into account that a product of a factor of the sort (±1±j) by a complex number requires 2 real additions and one addition of two complex numbers requires two real additions. Two main options of preferred embodiments of the invention for doing this computation will be presented. The first preferred embodiments of the invention that would be called phase rotation plus GEM, it uses the fact that:

$$\frac{1}{2}(1+j) \cdot (1+j) = j$$

$$\frac{1}{2}(1+j) \cdot (1-j) = 1$$

$$\frac{1}{2}(1+j) \cdot (-1+j) = -1$$

$$\frac{1}{2}(1+j) \cdot (-1-j) = -j$$

Hence by multiplying all the above sums by $$\frac{1}{2}(1+j),$$

act which is called phase rotation here, we get coefficients from the set $$\{1, -1, j, -j\}:$$

$$\frac{1}{2}(1+j) \cdot y_1 = j \cdot x_1 + 1 \cdot x_2 + (-j) \cdot x_3 + (-1) \cdot x_4 + 1 \cdot x_5 + (-1) \cdot x_6$$

$$\frac{1}{2}(1+j) \cdot y_2 = (-1) \cdot x_1 + j \cdot x_2 + j \cdot x_3 + (-j) \cdot x_4 + (-j) \cdot x_5 + 1 \cdot x_6$$

$$\frac{1}{2}(1+j) \cdot y_3 = 1 \cdot x_1 + (-j) \cdot x_2 + (-j) \cdot x_3 + j \cdot x_4 + (-1) \cdot x_5 + j \cdot x_6$$

According to a preferred embodiment of the invention these sums are computed in by the GEM. Due to the small sizes of this example the gain is marginal in this case compared to the conventional way, but it is substantial in larger dimensions. When the dimensions are small, as in this example, other more conventional methods of computation may also be applied after the phase rotation step. Finally the result of each sum is multiplied by (1−j) to obtain the desired result. Note that multiplication by j or (−1) are "organizational" operations requiring modest amount of time and energy.

The second option of preferred embodiment is called the complex-U-method. It breaks the sum by opening the brackets of each coefficient in the following way:

$$y_1 = x_1 + (jx_1) + x_2 - (jx_2) - x_3 - (jx_3) - x_4 + (jx_4) + x_3 - (jx_5) - x_6 + (jx_6)$$

$$y_2 = -x_1 + (jx_1) + x_2 + (jx_2) + x_3 + (jx_3) - x_4 - (jx_4) - x_5 - (jx_5) + x_6 - (jx_6)y_2$$

$$y_3 = x_1 - (jx_1) - x_2 - (jx_2) - x_3 - (jx_3) + x_4 + (jx_4) - x_5 + (jx_5) + x_6 + (jx_6)$$

The rest is done by applying the U-method. This requires at most 30 real additions by the above table of s(n,r), since s(12, 3)=12+3=15, where this is the number of complex additions.

After demonstrating the basic principles by the above example it would now be appropriate to give detailed description of the general case. To describe the preferred embodiments of the invention with respect to complex matrix consider the sets that will be used as coefficients: $U_1 = \{1, -1, j, -j\}$ and $U_2 = \{1+j, 1-j, -1+j, -1-j\}$. A $U_1$-vector or $U_1$-matrix have their entries in $U_1$. Likewise $U_2$-vector or $U_2$-matrix have their entries in $U_2$. Such matrix and vectors are common in wireless applications. In what follows it should be taken into account that the product of a $U_2$ number by a complex number requires 2 real additions while the product of a $U_1$ number by a complex number involves a relatively small amount of complexity.

The first computational problem to be solved is the following: suppose that an rxn $U_2$-matrix A is given and an n-dimensional complex-column input vector x and it is desired to compute the product y=A•x. The case r=1, which is indeed a scalar product, is included. Two main approaches to this computation will be presented. Each would be preferred when suitable. The same processes, with slight modifications, are applicable when the data vector is real First the phase rotation plus GEM preferred embodiment of the invention is introduced. Let $$B = \frac{1}{2}(1+j) \cdot A \text{ and } z = \frac{1}{2}(1+j)y$$

then B is an rxn $U_1$-matrix and z=B•x. Next, the product z=B•x is computed of by the GEM. Once z is computed, the output vector y is found by the product: y=(1−j)•z. The gain over conventional methods resulting from the initial phase rotation step is the saving of 2r•(n−1) additions. This gain exists even in the case that r=1, that is, the case of scalar product. Further gain results from the application of the GEM.

The second preferred embodiment of the invention is called the U-complex-method. The first thing is to represent A as a sum: $A=A_1+jA_2$ where $A_1$ and $A_2$ are U-matrix. Then consider the equality: $A•x=A_1•x+jA_2•x$. This equality implies that A•x can be computed through the product of the rx2n U-matrix $A*=[A_1, A_2]$ with the 2n-complex-dimensional column vector:

$$x^* = \begin{bmatrix} x \\ jx \end{bmatrix}.$$

This is expressed in the following equality: A•x=A*•x*. Now the product A*•x* would be computed by the U-method.

There is another alternative within this preferred embodiment of the invention, which is reasonable when r is small: Let $$A^{**} = \begin{bmatrix} A_1 \\ A_2 \end{bmatrix},$$

this is an 2rxn U-matrix. Then apply the U-method to compute the product: A**•x. This in fact calculates both products $y_1 = A_1•x$ and $y_2 = A_2•x$. The process is completed with the summation: $y = y_1 + y_2$.

A variation on the above problem might arise in some applications that include toplitz matrix representations of PN correlators in CDMA. In this setting the matrix may also have zero entries. Accordingly, let: $U'_1 = \{0, 1, -1, j, -j\}$ and $U'_2 = \{0, 1+j, 1-j, -1+j, -1-j\}$. A $U'_1$-vector or $U'_1$-matrix have their entries in $U'_1$. Likewise $U'_2$-vector or $U'_2$-matrix have their entries in $U'_2$. An rxn $U'_2$-matrix A is given and an n-dimensional complex-column input vector x. The goal is to compute the product y=A•x. The case r=1, which is indeed a scalar product, is included.

The phase rotation plus GEM preferred embodiment of the invention will be discussed first. Let $$B = \frac{1}{2}(1+j) \cdot A \text{ and } z = \frac{1}{2}(1+j)y$$

then B is an rxn $U'_1$-matrix and z=B•x. Next the product z=B•x is computed by application of the GEM, or perhaps, when the dimension is low, by more conventional methods. Finally, once z is computed, the output vector y is found by the product: y=(1−j)•z.

According to another preferred embodiment of the invention, A is first represented as a sum. $A=A_1+jA_2$ where $A_1$ and $A_2$ are (0,1,−1)-matrix, possibly Toplitz. Then by the equality: $A•x=A_1•x+jA_2•x$, the product A•x may be computed through the product of the rx2n (0,1,−1)-matrix matrix $A*=[A_2, A_2]$ with the 2n-complex-dimensional column vector:

$$x^* = \begin{bmatrix} x \\ jx \end{bmatrix}.$$

Lastly, the product A*•x* would be computed by the Toplitz or by the more general (0,1-1) aspect of the invention.

Another (optional) preferred embodiment of the invention, reflecting its non-toplitz counterpart, is efficient when r is small: Let $$A^{**} = \begin{bmatrix} A_1 \\ A_2 \end{bmatrix}$$

this is an 2rxn (0,1,−1)-matrix. Then apply the (0,1−1)-aspect of the invention to compute the product: A**•x. This in fact calculates the products $y_1=A_1 \cdot x$ and $y_2=A_2 \cdot x$. Finally, the process is completed with the sum: $y=y_1+j \cdot y_2$.

The complex chapter would now be concluded with a method for computing the product of a general complex rxn matrix $A \in C^{rxn}$ by a real or complex n-dimensional vector x. According to one preferred embodiment of the invention, first represent A as a sum: $A=A_1+jA_2$ where $A_1$ and $A_2$ are real matrix. Next by the equality: $A \cdot x = A_1 \cdot x + jA_2 \cdot x$ it follows that A•x can be computed through the product of the rx2n real matrix $A^*=[A_1, A_2]$ with the 2n-dimensional column vector:

$$x^* = \begin{bmatrix} x \\ jx \end{bmatrix},$$

since A•x=A**•x*. Finally the product A**x* would be computed by the real matrix method.

According to another (optional) preferred embodiment of the invention put $$A^{**} = \begin{bmatrix} A_1 \\ A_2 \end{bmatrix}.$$

This is an 2rxn real matrix. Then apply the real matrix method to compute the produce: A**•x. This calculates the products $y_1=A_1 \cdot x$ and $y_2=A_2 \cdot x$. Finally, the process is completed with the sum: $y=y_1+jy_2$.

Finally a product of a toplitz matrix with $U_2$-coefficients by a vector is done by application of the toplitz technique above.

Examples of Industrial Applications of Toplits-Matrix, (0,1,−1)-Matrix and Complex-Matrix Techniques IS-95 Searcher: The IS-95 CDMA system allows a number of different base stations in a small geographic location to simultaneously use the same segment of spectrum for transmitting data to mobile receivers. The manner in which the data from different bases can be differentiated is by way of the PN sequence which is used to spread the transmitted data. Each base transmits at a different phase of the PN sequence. The task of the searcher mechanism in the mobile receiver is to identify the different pilot signals transmitted by the surrounding bases by aligning with their PN phase. It is also applied to differentiate between several multipath signals (meaning echoes) arriving from the same base. A similar process is applied in the initial synchronization procedure.

A searcher is required to test a number of hypotheses, by partial correlation of the received signal, for each hypothesis, with a locally generated PN sequence. The sequence is then shifted for each hypothesis, and the correlation is performed for a fix number of signal elements (chips). Normally the searcher is required to search all the hypotheses in a given window where at each time the sequence is shifted by 1. A searcher may be implemented in a DS-CDMA system by constructing a matrix A, whose rows are composed of the above mentioned shifted PN subsequences. The search results are then given in the vector y=A•x where x is a vector representing the incoming signal sampled at a single chip periods. According to a preferred embodiment of the invention the above mentioned inventive algorithms for efficient linear transformations are implemented, so as to obtain the vector y with reduced consumption of resources. Numerous applications of the invention may also be useful in the searcher of the suggested standards of the wide band CDMA.

Multi-Product

Another preferred embodiment of the invention relates to a situation where partial sums of the U-matrix by vector product are desired. This may occur in CDMA communication applications when several codes with different rates (spreading factors) are tested simultaneously. Studying this embodiment is more fruitful for readers who have already accomplished substantial command of the previous aspects of the invention. It will be introduced by the following example which gives first idea of this rather involved method without the abundance of details. However no example of reasonable size can describe all the aspects of this embodiment. The reader may also referred to the summary of the invention, item 6.

Example: Consider the following 5×8 U-matrix:

$$A = \begin{bmatrix} 1 & 1 & -1 & 1 & 1 & -1 & -1 & -1 \\ -1 & 1 & -1 & -1 & 1 & 1 & -1 & 1 \\ 1 & -1 & 1 & 1 & 1 & -1 & 1 & -1 \\ 1 & 1 & -1 & 1 & -1 & -1 & 1 & -1 \\ -1 & -1 & 1 & 1 & -1 & 1 & -1 & -1 \end{bmatrix}$$

and an 8-dimensional input vector:

$$x = \begin{bmatrix} x_1 \\ x_2 \\ x_3 \\ x_4 \\ x_5 \\ x_6 \\ x_7 \\ x_8 \end{bmatrix}$$

Suppose that it is said that (within the multi-product terminology) the spreading factor of lines 1 and 2 is 2 and the spreading factor of lines 3 and 4 is 4 and the spreading factor of line 5 is 8. This means that in the first two lines every two successive elements are summed, in the third and the forth lines every four successive elements are summed and in the fifth the entire line is summed. The convention would be that the spreading factor is non decreasing, that is the spreading factor of each lines is equal or more to the spreading factor of the previous line. This terminology will later be precisely defined.

It is implied by the above that the following sums should be computed:

$x_1+x_2$, $-x_3+x_4$, $x_5-x_6$, $-x_7-x_8$ $-x_1+x_2$, $-x_3-x_4$, $x_5+x_6$, $-x_7+x_8$ $$x_1-x_2+x_3+x_4, x_5-x_6+x_7-x_x$$

$$x_1+x_2-x_3+x_4, -x_5-x_6+x_7-x_x$$

$$-x_1-x_2+x_3+x_4-x_5+x_6-x_7-x_8$$

First there is a split to four 4×2 U-matrix where the horizontal dimension reflects the lowest spreading factor. Then the U-method is applied, on an extremely basic level, to demonstrate how additions are saved by this new aspect. Thus, applying the elimination of equivalent lines, only two additions are required to compute the all first sums of each line:

$$x_1+x_2$$

$$-x_1+x_2$$

$$x_1-x_2$$

$$x_1+x_2$$

$$-x_1-x_2$$

Similarly only two additions are required for the second sum of each line:

$$-x_3+x_4$$

$$-x_3-x_4$$

$$x_3+x_4$$

$$-x_3+x_4$$

$$x_3+x_4$$

and so on. Hence, the total of 8 additions is required for this part. Four additional additions are necessary to complete the required sums of lines 3 & 4 and another four additional additions are required to compute the required sum of line 5. Hence total of 16 additions were required by an application of a preferred embodiment of the invention. Prior art, conventional brute-force methods would be required 28 additions for the same task.

The environment of current aspect of the invention includes a U-matrix that might be of large dimensions where at each line sub-sums of equal intervals are required as in the above example. The input vector is real or complex. The matrix may be sub-divided by lines to several sub-matrix wherein each of them is computed by the method used in the above example separately and independently. Into this embodiment a method is integrated that finds near-best subdivision in term of saving additions and hence reducing complexity. The tool for it is an additional processor or apparatus based on dynamic programming, which analyze the various subdivisions by the use of the table, bound and regressive formula of the complexity, s(n,r), of the U-method. Very precise formulation is required for the development of this embodiment. Several new definitions will be needed as preliminary material.

Let $v=(v_1,v_2,\ldots,v_n)$ be a vector and p a positive integer that divides n (in short: p|n). Define v[p] to be the vector of vectors that is formed by subdividing v to sections of length p. Thus:

$$v[p]=((v_1, v_2, \ldots, v_p), (v_{p+1}, v_{p+2}, \ldots, v_{2p}), \ldots, (v_{n-p+1}, v_{n-p+2}, \ldots, v_n)).$$

Denote the sections by:

$$v[p,k]=(v_{(k-1)p+1}, v_2, \ldots, v_{kp}) \text{ for } 1 \leq k \leq n/p.$$

The integer p in the context is called the spreading factor. Observe that multi-vector is a structure akin to the structure of a matrix. The next item, multi-scalar-product of multi-vectors, is a cross between matrix product and the usual scalar product. Take two n-dimensional vectors $v=(v_1, v_2, \ldots, v_n)$ and $w=(w_1,w_2,\ldots,w_n)$, then the p-multi-scalar-product of v and w is defined by:

$$v\bullet w[p]=(v[p,1]\bullet w[p,1], v[p,2]\bullet w[p,2], \ldots, v[p,n/p]\bullet w[p,n/p])$$

where the internal products: $v[p,1]\bullet w[p,1]$, $v[p,2]\bullet w[p,2]$, ... are usual scalar products. Note that the result of this product is a n/p-dimensional vector.

Let A be an r×n matrix with lines $A_1, \ldots, A_r$ and $p=(p_1, p_2, \ldots, p_r)$ a positive integer vector.

It would be said that p divides n if for every $1 \leq i \leq r$ $p_i$ divides n. This is denoted by: p|n.

Assume now that p|n. Take an n-dimensional vector x and define the p-multi-product of A by x, denoted by A•x[p], to be the vector of vectors:

$$A\bullet x[p]=(a_1\bullet x[p_1], A_2\bullet x[p_2], \ldots, A_r\bullet x[p_r])$$

The current embodiment of the invention will improve the computation of such products in a setup that will be described henceforth.

A multi-product system. A multi-product system (or in short MP-system) is a setting that includes as parameters the integers n,r and a positive integer vector $p=(p_1,p_2,\ldots,p_r)$ such that:

$$p_1|p_2, p_2|p_3, p_3|p_4, \ldots, p_{r-1}|p_r \text{ and } p_r|n.$$

The integers $p_1,p_2,\ldots,p_r$ are called the spreading factors of the system. The parameters of the MP-system will be written in the following way:

$$P=(r,n,p)$$

To these parameters attach now an r×n U-matrix A and an n-dimensional real vector, x. The goal is to efficiently compute the product A•x[p]. The entire MP-system will be written in the following way:

$$S=(r,n,p,A,x)$$

When all the integers $p_1,p_2,\ldots,p_r$, n are also powers of 2 then the system is called binary multi-product system, or in short, BMP-system.

The M-1-method This feature of the invention is a straight-forward adaptation of the U-method to an MP-system. It is represented by the above example. In reality it will usually be applied to subsystems of an MP-system after the near-optimal subdivision that will later be described.

Given an MP-system S=(r, n, p, A, x). The method is based on a horizontal division of the matrix to sub-matrix with respect to the smallest spreading factor $p_1$, each sub-matrix is of width $p_1$. It begins by computing the sum of the first $p_1$ real numbers of the vector x with the U-coefficients of the matrix A. This is done simultaneously in all lines by the U-binary method. It then goes to the next $p_1$ columns doing the same process. It continues in this fashion until all the n variables are exhausted. Next it goes to each of the lines where $p_i>p_1$ and completes the summation process in a trivial way.

The first step of the U-method on each sub-matrix is to scan out lines that are a straight or a negative copy of other lines. Hence, for example, if $p_1=2$, then at most two additions are needed at each section, regardless of r. In general no more than $2^{p_1-1}$ lines are considered by the U-binary method in every section. Moreover one application intended by this text is when A is Hadamard. In this case there are no more then $p_1$ non-equivalent lines in each section. Thus another source is inserted that contains the bound on how many non-equivalent lines might appear in each sub-matrix. It will be contained in a function denoted by z (stored as a table) which is a consequence of the type of the matrix at hand. Its parameters are $p_1$ and r and it is written by $z(p_1,r)$. For example when A is Hadamard then $z(4,6)=4$, $z(8,5)=5$, when A is a general U-matrix then $z(4, 40)=8$. It always holds that $z(p_1,r) \leq \min\{2^{p-1}, r\}$ and in the case that A is Hadamard: $z(p_1,r)=\min\{p_1,r\}$.

The computation of the complexity of the M-1-method will be based on the table and the regression formula of s(r) that appear at the description of the U-binary method above. For every positive integer y put $s'(y)=s(y)+y$. Recall also that: $s'(y)<2^{y-1}+2^{y/1+1}$ and this inequality is rather tight. This gives an intuitive view to the magnitude of the complexity in the next formula. The number of additions done by the M-1-method is thus bounded by the following term:

$$C(n, r, p, z) = (n/p_1)(p_1 + s(z(p_1, r))) + (n/p_2)(p_2/p_1 - 1) +$$
$$(n/p_3)(p_3/p_1 - 1) + \ldots + (n/p_r)(p_r/p_1 - 1) =$$
$$n \cdot (1 + (s(z(p_1, r)) + r - 1)/p_1 - (1/p_2 + 1/p_3 + \ldots + 1/p_r)) =$$
$$n \cdot (1 + s'(z(p_1, r))/p_1 - (1/p_1 + 1/p_2 + 1/p_3 + \ldots + 1/p_r))$$

Note some trivial but not insignificant instances of this formula. The first is when the matrix has one line, that is, when r=1, then:

$$C(n,r,p)=n-n/p_1$$

The second is the case of uniform spreading factor, that is when $p_1=p_2=\ldots=p$, then:

$$C(n,r,p,z)=n \cdot (1+s(z(p_1,r))/p_1)$$

Obviously, the M-1-method is by no mean efficient when r is large relative to $p_1$. It is largely a stepping stone for a smarter method will be developed on its foundations. This stronger method works by horizontally subdividing the matrix and applying the M-1-method to each sub-matrix separately. To find with fewer calculations a subdivision structure bearing a smaller total number of additions it will be useful to have the following shorter version of the above formula. So define:

$$C^*(n,r,p,z)=1+s'(z(p_1,r))/p_1$$

Subdivision of multi-systems and the generalized notion of multi-vector. Next, a formulation is made to command that subdivides a matrix on horizontal lines. This command will be represented by a subdividing vector r. The result will be breaking of the original problem to a few sub-problems of the same width –n, each is solved by the above M-1-method. The subdivision will later be attached to an inventive algorithm to maximize efficiency. Take an r-dimensional integer vector, $p=(p_1,p_2,\ldots,p_r)$, of spreading factors, and an rxn U-matrix:

$$A = \begin{bmatrix} a_{11} & a_{12} & \ldots & \ldots & a_{1n} \\ a_{21} & a_{22} & \ldots & \ldots & a_{2n} \\ \cdot & & & & \\ \cdot & & & & \\ \cdot & & & & \\ a_{r1} & & & & a_{rn} \end{bmatrix}$$

and take integers k, n where $1 \leq k \leq m \leq r$. Define first a section of the vector p:

$$p(k,m)=(p_k, \ldots, p_m).$$

It is simply taking the components with indexes k to m. Define a section of the matrix A:

$$A(k, m) = \begin{bmatrix} a_{k1} & a_{k2} & \ldots & \ldots & a_{kn} \\ a_{k+1,1} & a_{k+1,2} & \ldots & \ldots & a_{k+1,n} \\ \cdot & & & & \\ \cdot & & & & \\ \cdot & & & & \\ a_{m1} & & & & a_{mn} \end{bmatrix}$$

Likewise, it means taking the lines with indexes k to m. Next, consider an integer vector: $r=(r(1), \ldots, r(t+1))$ satisfying:

$$k=r(1)<r(2)<\ldots<r(t)<r(t+1)=m+1,$$

which is an instrument to split to sections. First, r is a tool to create a subdivision of p to a vector of vectors p[r], in the following manner:

$$p[r]=((p_{r(1)}, \ldots, p_{r(2)-1}),(p_{r(2)}, \ldots, p_{r(3)-1}), \ldots,$$
$$(p_{r(t)},p_2, \ldots, p_{r(t+1)-1}))$$

The sub-vectors are denoted by, $$p[r;1]=(p_{r(1)}, \ldots, p_{r(2)-1})$$

$$p[r;2]=(p_{r(2)}, \ldots, p_{r(3)-1})$$

$$p[r;t]=(p_{r(t)}, \ldots, p_{r(t+1)-1})$$

The rows of the matrix A are similarly subdivided with accordance to the subdividing vector r in the following manner:

for all integers $1 \leq q \leq t$: $A[r;q]=(a_{ij}: r(q) \leq i < r(q+1),$
$1 \leq j \leq n)$ The M-method for a given subdivision. This section is the main step in the formation of a mechanism that finds a low complexity sub-division, mechanism that is central for this embodiment. Suppose we are given a line-subdivision of the matrix and perform the M-1-method on each sub-matrix separately. The goal would be to estimate the total number of additions so that a subdivision of fewer additions will be found in the next stage. Fix an MP-system $S=(r, n, p=(p_1, p_2, \ldots, p_r), A, x, z)$ and a subdivision vector $r=(r(1), \ldots, r(t))$ where $$1 \leq k=r(1)<r(2)<\ldots<r(t)<r(t+1)=m+1 \leq r+1.$$

For $1 \leq q \leq t$ the $S_q$ MP-sub-system is given by:

$$S_q=(r(q+1)-r(q), n, p[r;q], A[r;q], x, z)$$

The total number of additions of all sub-systems is:

$$C(n,r,r,p,z) = \Sigma_{1 \leq q \leq t} C(n, r(q+1)-r(q), p[r,q]/z) =$$

$$= n \cdot (\Sigma_{1 \leq q \leq t} s'(z(p_{r(q)}), (r(q+1)-r(q)))/p_{r(q)} - (1/p_k + \ldots + 1/p_m) + t)$$

The next goal will be to develop an efficient method that finds the subdivision which minimizes this term. It will be more efficient to do the calculations without computing at each stage the repetitive additive sub-term: $1/p_k + \ldots + 1/p_m$ and the n-factor. Thus we define:

$$C^*(n,r,r,p,z) = \Sigma_{1 \leq q \leq t} s'(z(p_{r(q)}), (r(q+1)-r(q)))/p_{r(q)} + t$$

A near optimal subdivision. At this stage we should study the properties of the subdivision that minimizes the amount of additions given by the term $C(n,r,r,p,z)$ above. First we give an abstract formula to the number of additions where the subdivision has minimal worst case bound on a given subinterval of the original problem Consider than an MP-system $S = (r, n, p = (p_1, p_2, \ldots, p_r), A, x, z)$ and integers $k, m$ where $1 \leq k \leq m \leq n$. Define:

$$h(k,m) = \min\{C(n, m-k+1, r, p(k,m)z): \text{for } r = (r(1), \ldots, r(t+1))$$

where $k = r(1) < r(2) < \ldots < r(t) < r(t+1) = m+1\}$ $$h^*(k,m) = \min\{C^*(n, m-k+1, r, p(k,m),z): \text{for } r = (r(1), \ldots, r(t+1))$$

where $k = r(1) < r(2) < \ldots < r(t) < r(t+1) = m+1\}$

It holds that:

$$h(k,m) = n \cdot (h^*(k,m) + (1/p_k + \ldots + 1/p_m))$$

The following recursive formulas holds:

$$h(k,m) = \min\{C(n, m-k+1, p(k,m), z), \min\{h(k,q-1) + h(q,m): \text{for all } k < q \leq m\}\}$$

where min(empty set)=infinity.

$$h^*(k,m) = \min\{C^*(n, m-k+1, p(k,m),z) \min\{h^*(k,q-1) + h^*(q,m): \text{for all } k < q \leq m\}\}$$

where min(empty set)=infinity.

Now these expressions are used by the following dynamic code where the substructures are the intervals between k and m. To reduce the complexity of this code $h^*$ will replace $h$ on the route to discover the best substructure. This has no effect on the final result. To find the first step in the optimal subdivision we will compute the q that minimizes the expression $h(k,q-1) + h(q,k)$ for every k and m where $1 \leq k \leq m \leq n$, which is the same q that minimizes the expression $h^*(k,q-1) + h^*(q,k)$. Thus define:

$q(k,m) = k$ when $h^*(k,m) = C^*(n,r,p(k,m),z)$ and otherwise:

$q(k,m) =$ smallest $q$, where $k < q \leq m$ and $h^*(k,m) = h^*(k, q-1) + h^*(q,k)$ Now the optimal subdivision code can be formed.

A dynamic programming inventive code that finds the optimal subdivision. The following codes receives as data the parameters of an MP-system $P = (r,n,p,z)$ and produces as output the subdivision r on which the M-method performs optimally. In addition it also returns the complexity of the optimal M-method.

To run it efficiently we need to compute and store beforehand a table of $s'(r)$. This is done by a fast code that calculates this table using the regression formula:

$$s'(r) = 2^{r-1} + s'(r(1)) + s'(r(2))$$

Optimal Subdivision Tables (n,r,p,z)
for b going from 0 to r−1 do
   for k going from 1 to r−b do
      m:=k+b
      h*(k,m)<- - - C*(n, m−k+1, p(k,m),z)
      q(k,m)<- - - k
      for q going from k+1 to m do
         d <- - - h*(k,q−1)+h*(q,m)
         if d<h*(k,m) then
         h*(k,m)<- - - d and
         q(k,m)<- - - q return the tables h* and q.

What is left now is to obtain from the table q(k,m) constructed by this procedure the optimal subdividing vector. This is done by the following code that create the set R which contains the components of the optimal vector r.

Optimal Subdivision Vector (n,r,p)
Set: R:=empty set and k:=1 m:=r
Find Vector (k,m):
if q(k,m)>k then
   put q:=q(k,m)
   add q to the set R
   Find Vector (q,m)
   Find Vector (k,q−1)

Return the set R.

Now that the optimal subdivision r is found the M-method will run on this subdivision.

Implementations

The following preferred embodiments of the invention provide inventive algorithms which are detailed implementations of the above methods. They enable additional reduction in memory and energy resources required to perform the above methods. They have the dual goal of enhancing the above methods and of providing the instructions required to build the apparatus. One underlining assumption regarding these implementations is that the transformation matrix is generic and may be considered as arbitrarily chosen from the set of matrix having a given set of entries. Another is that the number of rows is small enough when compared with the number of columns such that the above mentioned fundamental bound number of rows<log(number of columns)

is satisfied. Hence some of the steps that are suitable in other circumstances such a check for equivalent lines are redundant here.

The mappings described in the text that follows channelize the flow of data from one location to the next. Each location is assigned with a binary address corresponding to a column of the matrix at a given iteration. In the case of U-matrix a (−1)-component of the column, corresponds to 1 in the address, and likewise a 1-component of the column, corresponds to 0 in the address. A similar correspondence is defined for $U_1$-matrix.

The implementations that would be described include a first step where the incoming xj-signals are added to preset destinations determined by their corresponding columns, where each $x_j$ may be multiplied by a sign and/or power of 2. In the proceeding iterations, whenever a column is split with accordance to the invention, the assigned address of each of the two splits is lesser or equal to the address of the given column. This enables every information stored in some location of the memory to be sent to its destination before being processed and lost. In addition, if it holds that one of the split halves of a given column is zero, the address representing this column will be used for the next iteration. These properties are accomplished by a novel construction of the data-flow maps which is set to minimize the movements of data. At each iteration maximal number of addresses remain untouched, including all those whose present content can be used by the next iterations. The mechanism of the following implementations is better understood in view of the above described GEM preferred embodiment of the invention. A finite set of numbers, S, that includes the number 1 is considered, and in this context a matrix of r lines is termed a complete S-r-matrix if it consist of all the possible nonzero configurations of normalized r-dimensional column-vectors whose components belong to the set S, where each configuration appear exactly once and the normalization convention is that the bottom-most non-zero element should be 1.

Observe the following low dimensional examples.

The matrix:

$$\begin{bmatrix} 1 & 0 & 1 \\ 0 & 1 & 1 \end{bmatrix}$$

is a complete {0,1}-2-matrix;

the matrix:

$$\begin{bmatrix} 1 & -1 \\ 1 & 1 \end{bmatrix}$$

is a complete U-2-matrix;

the matrix:

$$\begin{bmatrix} 1 & -1 & 1 & -1 \\ 1 & 1 & -1 & -1 \\ 1 & 1 & 1 & 1 \end{bmatrix}$$

is a complete U-3-matrix;

the matrix:

$$\begin{bmatrix} 1 & 0 & 1 & 0 & 1 & 0 & 1 \\ 0 & 1 & 1 & 0 & 0 & 1 & 1 \\ 0 & 0 & 0 & 1 & 1 & 1 & 1 \end{bmatrix}$$

is a complete {0,1}-3-matrix;

the matrix:

$$\begin{bmatrix} 1 & -1 & j & -j \\ 1 & 1 & 1 & 1 \end{bmatrix}$$

is a complete {1,−1,j,−j}-2-matrix.

The implementations that follow are based on the assumption that the number of rows is small enough with relation to the number of columns so that large proportion of all possible configurations appear in the columns of the transformation matrix. Hence the first iteration made in all the proceeding implementations reduces the computation to the product of a complete S-r-matrix, with a modified vector. Consequently all the more advanced iterations compute the product of a lower dimensional complete S matrix with a respective modified vector.

The ordered manner in which the columns appear in the matrix of the above examples reflect another feature of the address settings of these implementations. That is of an addressing based on a consistent rule of translating the columns to an |S|-base addresses where the MSB is the bottom component of the vector and the LSB is the top.

The fundamental result is that after the first iteration there is a unique uniform complete transformation matrix, with a uniform (and rather obvious) address-numbering. This uniform matrix depends only on S and r and not on the initial transformation matrix. This leads to uniformity in the rest of the process and hence enables the creation of data-flow structures that are universal and independent of the particular transformation matrix after the first stage. This is very useful in hardware implementations and in the construction of apparatuses based on the present invention, which is the main goal of the current chapter. Additional and separate aspect of these implementations is a reduction of the required read and write memory allocation and the number of additions for suitable transformation matrix. Consequently, the energy required for the performance of the process and the cost of the apparatus are reduced. It should be observed that the efficiency of each of the following codes is enhanced when it processes the same initial transformation matrix with several input x-vectors.

Finally, to have a proper perspective, the following implementations should be read with the understanding that they are a few examples out of many possible efficient implementations of the invention.

Example 1

0-1-Binary-Matrix

The following sequence of steps describes an implementation of the 0-1-matrix aspect of the invention. The data consists of an rxn 0-1-matrix $A=(a_{i,j}: 0 \leq i < r, 0 \leq j < n)$ and an input real or complex vector $x=(x_0, \ldots, x_{n-1})$. The columns of the matrix A are denoted by $v_0, \ldots, v_{n-1}$. This sequence of steps computes the product $y=(y_0, \ldots, y_{r-1})^T = A \cdot x$. At every given k-iteration each location contains one real or complex number, depending on the vector x. The allocated read and write memory contains $2^r - 1$ addresses labeled from 1 to $2^r - 1$, representing the columns participating in the process at each iteration. The following definitions are part of the description of the present preferred embodiment of the invention.

Definitions

1) Define for all $k \geq 0$, $j \geq 1$: $l(k,j) = \lceil (j-1) \cdot (r/2^k) \rceil$ 2) Define all $0 \leq m < r$ $Y_m = 2^m$. These addresses will contain at the end of the process the components of the output vector $y=(y_0, \ldots, y_{r-1})^T$ where $Y_0$ would be the address of $y_0$. $Y_1$ would be the address of $y_1$, ezt.

3) For $k \geq 0$ and $j \geq 1$ define as follows the functions $F_{k,j}$, $G_{k,j}$ which control the movements of data from each location to the next. First put: $l=l(k,j)$, $m=l(k+1,2j)$, $h=l(k,j+1)-1$.

Next for each integer $v \geq 0$ define:

$$F_{k,j}(v)=2^m \cdot \lfloor v/2^m \rfloor \qquad \text{[Eq. 100]}$$

$$G_{k,j}(v)=v \bmod 2^m \qquad \text{[Eq. 101]}$$

4) Define For every vector $v=(v_0, \ldots, v_{r-1}) \in \{0,1\}^r$:

$$\sigma(v) = \Sigma_{0 \leq j < r} 2^j v_j.$$

The Code 1. initialization: Put zero is every address from 1 to $2^r-1$
2. first stage: for a j going from 0 to n−1 do
    if $v_j \neq 0$ than add $x_j$ to the address $v=\sigma(v_j)$
3. main part:
for k going from 0 to $\lceil \log(r) \rceil - 1$ do
   for j going from 1 to $2^k$ do
     if $l(k,j+1)-1 > l(k,j)$ then
for p going from 1 to $2^{l(k,j+1)-l(k,j)}-1$ do
put $v=2^{l(k,j)} \cdot p$
   for (source) address v do
     if $F_{k,j}(v) \neq 0$ and $F_{k,j}(v) \neq v$ then add the value residing in the (source) address v to the value in the (destination) address $G_{k,j}(v)$ and also add this value (of source address v) to the value in the (destination) address $F_{k,j}(v)$ 4. obtaining the output: at this stage, every address $Y_i$ contains the value of the output component $y_i$, for all $0 \leq i < r$.

Complexity

An elementary step in the present terminology is reading a number from one location of the memory, called source, and adding it to a number placed in another location of the memory, called destination.

An apparatus based on the above code would require the following number of elementary steps to compute the main part of the above computation of A·x:

$$C^{0,1}_r \equiv 2^{r+1} - 2r - 2.$$

This number depends only on r.

The entire computation of A·x thus requires at most the total of:

$$C^{0,1}_{n,r} \equiv n + C^{0,1}_r$$

elementary steps.

Chart 1: 0-1-Binary-Matrix

FIG. 1 schematically illustrates the operation of updating the contents of a memory employed by an apparatus which performs the main part of the above code, implementing thus in a preferred fashion the 0-1-binary aspect of the invention, with a 0-1-binary matrix comprising 4 rows. A column of each matrix at each iteration is represented by an address in the memory, in a binary way. The bottom (0 or 1) component (the extreme right hand component in a horizontal presentation) is the MSB and the top (0 or 1) component (the extreme left hand component in a horizontal presentation) is the LSB. The addresses $Y_m = 2^m$, 0·m·3, contain at the end of the process the components of the output vector $y=(y_0, \ldots, y_3)^T$ where $Y_0$ would be the address of $y_0$, $Y_1$ would be the address of $y_1$, ect. The arrows signify the act of taking the content of one address and sending it to be added to the content of another address. This is done with accordance to the order of the iterations and the (increasing) order of the addresses participating in each iteration, as indicated by the above code.

Example 2

U-Matrix

The following sequence of steps describes an implementation of the U-matrix aspect of invention. The data consists of an r×n U-matrix $A=(a_{ij}: 0 \leq i < r, 0 \leq j < n)$ and an input real vector $x=(x_0, \ldots, x_{n-1})$. The columns of the matrix A would be denoted by $w_0, \ldots, w_{n-1}$. This sequence of steps computes the product $y=(y_0, \ldots, y_{r-1})^T = A \cdot x$. At every given iteration each location contains one real or complex number, depending on the vector x. The allocated read and write memory contains $2^{r-1}+r-1$ addresses labeled from 0 to $2^{r-1}+r-2$. The following definitions and those of the previous example are required for the description of the present preferred embodiment of the invention.

Definitions

1) For each r-dimensional U-vector, $u=(u_0, \ldots, u_{r-1})$ define:

$$\text{Sign}(u) = u_{r-1}$$

$$h(u) = (u_0 \cdot r_{r-1}, \ldots, u_{r-1} \cdot u_{r-1}).$$

2) Define a correspondence between the bi-polar binary set, $U = \{1, -1\}$ and the logic-bits binary set $B = \{0, 1\}$, by:

$$(-1)^1 = 1$$

$$1^1 = 0$$

Accordingly for an r-dimensional U-vector, $u=(u_0, \ldots, u_{r-1})$, define:

$$\pi(u) = \Sigma_{0 \leq j < r} 2^j u'_j.$$

3) Define $Y_0 = 0$, and for all $1 \leq m \leq r-1$: $Y_m = 2^{r-1} + m - 1$. These addresses will contain at the end of the process the components of the output vector $y = (y_0, \ldots, y_{r-1})^T$ where $Y_0$ would be the address of $y_0$, $Y_1$ would be the address of $y_1$, ezt.

4) For all $k \geq 0$, $j \geq 1$ the maps $F_{k,j}$, $G_{k,j}$, $\text{Sign}_{k,j}$ are defined as follows. Let $l = l(k,j)$, $m = l(k+1, 2j)$, $h = l(k, j+1) - 1$. For every integer $v \geq 0$ define:

$$\text{Sign}_{k,j}(v) = 1 - 2 \cdot \lfloor (v \bmod 2^m)/2^{m-1} \rfloor$$

$$F_{k,j}(v) = 2^m \cdot \lfloor v/2^m \rfloor$$

$$G_{k,j}(v) = \begin{cases} v \bmod 2^m & \text{if } \text{Sign}_{k,j}(v) = 1 \\ 2^m - 2^l - (v \bmod 2^m) & \text{if } \text{Sign}_{k,j}(v) = -1 \end{cases}$$

The Code 1. initialization: Put zero in every address from 0 to $2^{r-1}+r-2$.
2. first stage: for j going from 0 to n−1 do add $\text{Sign}(w_j) \cdot x_j$ to the address $\pi(h(w_j))$ 3. main part:
for k going from 0 to $\lceil \log(r) \rceil - 1$ do
   for j going from 1 to $2^k$ do if $l(k,j+1) - 1 > l(k,j)$ then 1) add the value residing in the (source) address $Y_{l(k,j)}$ to the value in the (destination) address $$Y_{l(k+1,2j)}$$

2) for p going from 1 to $2^{l(k,j+1)-l(k,j)-1}-1$ do put $u-2^{l(k,j)} \cdot p$ and for source address u do if $G_{k,j}(u)=u$ then add the value residing in the source-address u to the value in the destination address $Y_{l(k+1,2j)}$ else if $F_{k,j}(u)=u$ then add the value residing in the (source) address u to the value in the (destination) address $Y_{l(k,j)}$ else if $G_{k,j}(u)=0$ add the value residing in the (source) address u multiplied by (−1) to the value in the (destination) address $Y_{l(k,j)}$ and also add this value (of address u) to the value in the address $F_{k,j}(u)$.

else add the value residing in the source-address u multiplied by $Sign_{k,j}(u)$ to the value in the destination-address $G_{k,j}(u)$ and also add this value (of address u) to the value in the address $F_{k,j}(u)$.

4. obtaining the output: every address $Y_i$ contains now the value of $y_i$, for all $0 \leq i < r$.

Complexity i) An elementary step in the U-setting with the above implementation is reading a number from one location of the memory, called source, multiplying it by a sign which is 1 or −1 and then adding the result to a number placed in another location of the memory, called destination.

ii) The complexity is formulated with the following terms. For $0 \leq k \leq \lceil \log(r) \rceil - 1$ and for $1 \leq j \leq 2^k$ let:

$$u_{k,j}=2^{l(k,j+1)-l(k,j)-1}$$

$$u_k=\Sigma_{1 \leq j \leq 2^k} u_{k,j}=\Sigma_{1 \leq j \leq 2^k} 2^{l(k,j+1)-l(k,j)-1}.$$

For $k=\lceil \log(r) \rceil$ and for $1 \leq j \leq 2^k$ let:

$$u_{k,j}=\lfloor 2^{l(k,j+1)-l(k,j)-1} \rfloor,$$

then:

$$u_k=\Sigma_{1 \leq j \leq 2^k} u_{k,j}=r.$$

iii) An apparatus based on the above code would require the following number of elementary steps to fulfil the computation of $A \cdot x$.

(1) For the first stage n elementary steps are required.

(2) For all $0 \leq k \leq \lceil \log(r) \rceil - 1$ and $1 \leq j \leq 2^k$ $$2 \cdot u_{k,j} - u_{k+1,2j} - u_{k+1,2j-1} + 1$$

elementary steps are done in the (k,j) step.

(3) Therefore for all $0 \leq k \leq \lceil \log(r) \rceil - 1$ the k-iteration of the main part requires the following number of elementary steps:

$$2^k + 2 \cdot u_k - u_{k+1}$$

(4) The main part of the above computation of $A \cdot x$ thus requires the following number of elementary steps:

$$C_r^u \equiv 2u_0 + u_1 + u_2 + \ldots + u_{\lceil \log(r) \rceil - 1} + 2^{\lceil \log(r) \rceil} - 1 - r.$$

This number depends only on r.

(5) The entire computation of $A \cdot x$ thus requires the total of:

$$C_{n,r}^u \equiv n + C_r^u$$

elementary steps.

Chart 2: U-Matrix

Figure 2:
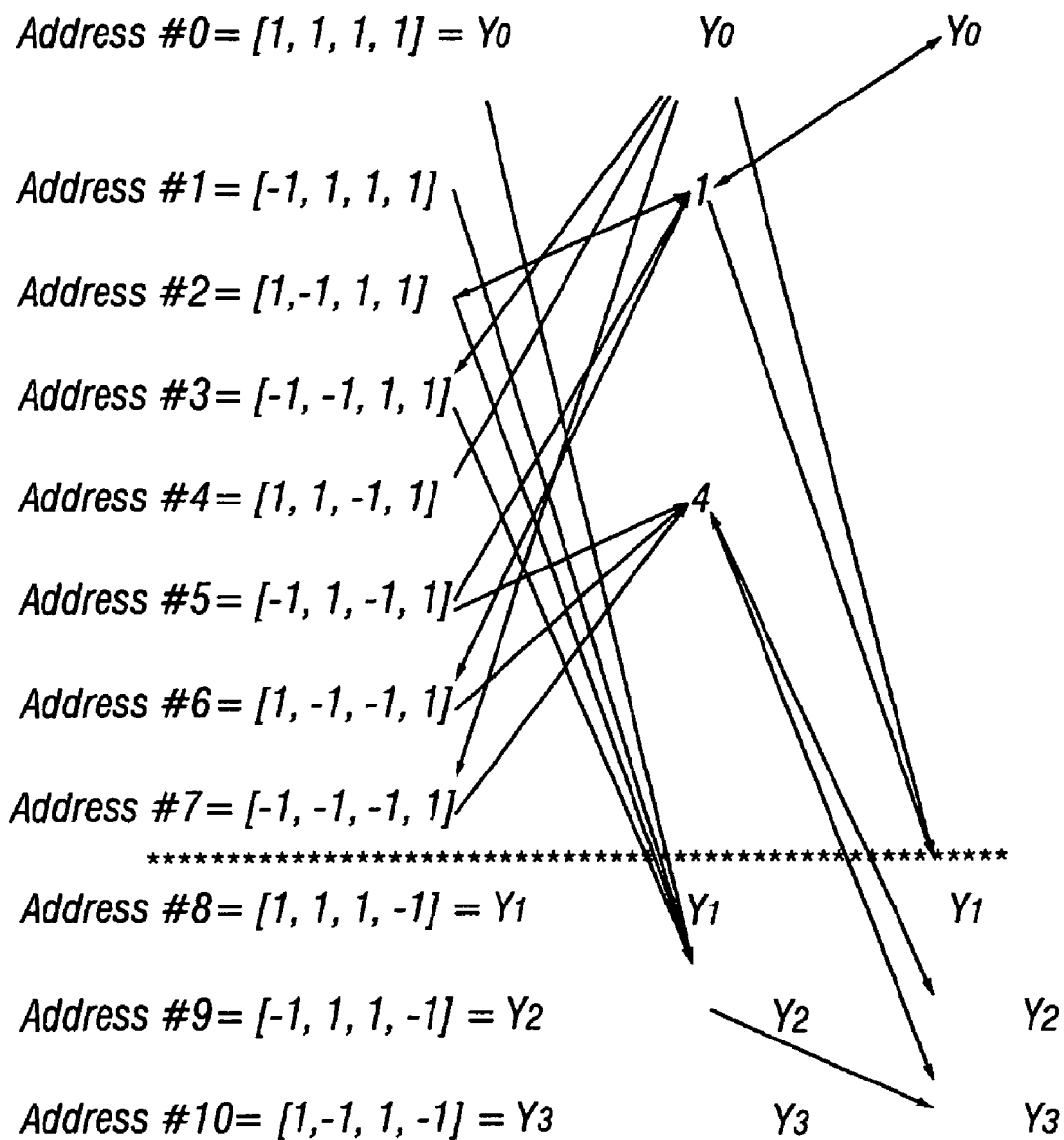
FIG. 2 schematically illustrates the operation of updating the contents of a memory employed by an apparatus which performs the transformation using the U-transformation matrix, according to a preferred embodiment of the invention.

FIG. 2 schematically illustrates the operation of updating the contents of a memory employed by an apparatus which performs the main part of the above code, implementing thus in a preferred fashion, the U-binary aspect of the invention, with a U-binary matrix comprising 4 rows. A column of each matrix at each iteration is represented by a binary address in the memory where (−1)-component of the column, corresponds to 1 in the address, and a 1-component of the column, corresponds to 0 in the address. A binary interpretation is applied, where the bottom component (the extreme right hand component in a horizontal presentation) is the MSB and the top component (the extreme left hand component in a horizontal presentation) is the LSB. The special addresses $Y_0=0$, $Y_1=8$, $Y_2=9$, $Y_2=10$, contain at the end of the process the components of the output vector $y=(y_0, \ldots, y_3)^T$ where $Y_0$ would be the address of $y_0$, $Y_1$ would be the address of $y_1$, ect. The arrows signify the act of taking the content of one address multiplying it by sign which is 1 or −1 and sending the result to be added to the content of another address. One spear arrow signifies that the sign is 1 and double spear arrow signify that the sign is −1. This is done with accordance to the order of the iterations and the (increasing) order of the addresses participating in each iteration.

Example 3

$U_1$-Matrix

The following sequence of steps describes an implementation of the GEM method in the case where the entries of the transformation matrix belong to the set $U_1 \equiv \{1, -1, j, -j\}$. This one of the subcases of the GEM which appear often in applications. The data consists of an rxn $U_1$-matrix $A=(a_{ij}: 0 \leq i < r, 0 \leq j < n)$ and an input complex vector $x=(x_0, \ldots, x_{n-1})$. The columns of the matrix are denoted by $w_0, \ldots, w_{n-1}$. This sequence of steps computes the product $y=(y_0, \ldots, y_{r-1})^T=A \cdot x$. At every given iteration each location contains one real or complex number, depending on the vector x. The allocated read and write memory contains $4^{r-1}+r-1$ addresses labeled from 0 to $4^{4-1}+r-2$. This example uses the definitions set in the previous examples, as well as the following definitions:

Definitions

1) Define a correspondence (and inverse correspondence) between the set $U_1$ and the set $\{0,1,2,3\}$ given by:

$$1'=0, 0^*=1$$

$$(-1)'=1, 1^*=-1,$$

$$j'=2, 2^*=j,$$

$$(-j)'=3, 3^*=-j$$

Accordingly for a r-dimensional $U_1$-vector, $u=(u_0, \ldots, u_{r-1})$, define:

$$a(u)=\Sigma_{0 \leq j < r} u_j' j.$$

2) For each r-dimensional $U_1$-vector, $u=(u_0, \ldots, u_{r-1})$ define:

$$Sign(u)=u_{r-1}$$

$$g(u)=(u_0 \cdot (u_{r-1})^{-1}, \ldots, u_{r-1} \cdot (u_{r-1})^{-1}).$$

3) Define $Y_0=0$, and for all $1 \leq m < r$: $Y_n = 4^{r-1} + m - 1$. These would be the addresses of the components of the output vector.

4) For all $k \geq 0$, $j \geq 1$ the maps $F_{k,j}$, $G_{k,j}$ are defined as follows. Let $l=l(k,j)$, $m=l(k+1,2j)$, $h=l(k,j+1)-1$. Take an integer $v \geq 1 0$, represented in the 4-basis by: $v = \Sigma_{0 \leq j \cdot r - 2} 4^j \cdot v_j$ and define:

$$\text{Sign}_{k,j}(v) = (v_{m-j})^* = (\lfloor (v \bmod 4^m)/4^{m-1} \rfloor)^*$$

$$F_{k,j}(v) = 4^m \cdot \lfloor v/4^m \rfloor$$

$$G_{k,j}(v) = \Sigma_{l \leq j \cdot m - 1} 4^j \cdot ((v_j)^* \cdot ((v_{m-1})^*)^{-1})'$$

The Code 1. initialization: Put zero in every address from 0 to $4^{r-1} + r - 2$.

2. first state: for j going from 0 to n−1 add $\text{Sign}(w_j) \cdot x_j$ to the address $\alpha(g(w_j))$ 3. main part:
for k going from 0 to $\lceil \log(r) \rceil - 1$ do
  for j going from 1 to $2^k$ do
    if $l(k,j+1)-1 > l(k,j)$ then:

1) add the value residing in the address $Y_{l(k,j)}$ to the value in the address $Y_{l(k+1,2j)}$ 2) for p going from 1 to $4^{l(k,j+1)-l(k,j)-1} - 1$ do put $u = 4^{l(k,j)} \cdot p$ and for source address u do:

if $G_{k,j}(u) = u$ then add the value residing in the (source) address u to the value in the (destination) address $Y_{l(k+1,2j)}$ else if $F_{k,j}(u) = u$ then add the value residing in the (source) address u to the value in the (destination) address $Y_{l(k,j)}$ else if $G_{k,j}(u) = 0$ add the value residing in the (source) address u multiplied by $\text{Sign}_{k,j}(u)$ to the value in the (destination) address $Y_{l(k,j)}$ and also add this value (of address u) to the value in the address $F_{k,j}(u)$.

else add the value residing in the (source) address u multiplied by $\text{Sign}_{k,j}(u)$ to the value in the (destination) address $G_{k,j}(u)$ and also add this value (of address u) to the value in the address $F_{k,j}(u)$:

4) obtaining the output: every address $Y_i$ contains now the value of $y_i$, for all $0 \leq i < r$.

Complexity i) An elementary step in the $U_1$-setting with the above implementation means reading a complex number from one location of the memory, called source, multiplying it by a complex sign which is 1 or −1 or j or −j and adding the result to a complex number placed in another location of the memory, called destination.

ii) The complexity is formed by the following terms. For $0 \leq k \leq \lceil \log(r) \rceil - 1$ and for $1 \leq j \leq 2^k$ let:

$$w_{k,j} = 4^{l(k,j+1)-l(k,j)-1}$$

$$w_k = \Sigma_{1 \leq j \leq 2^k} w_{k,j} = \Sigma_{1 \leq j \leq 2^k} 4^{l(k,j+1)-l(k,j)-1}$$

For $k = \lceil \log(r) \rceil$ and for $1 \leq j \leq 2^k$ let:

$$w_{k,j} = \lfloor 4^{l(k,j+1)-l(k,j)-1} \rfloor$$

$$w_k = \Sigma_{1 \leq j \leq 2^k} w_{k,j} = r.$$

ii) An apparatus based on the above code would require the following number of elementary steps to fulfil the computation of $A \cdot x$.

(1) For the first stage n elementary steps are required.

(2) For all $0 \leq k \leq \lceil \log(r) \rceil - 1$ and $1 \leq j \leq 2^k$ the total of $$2 \cdot w_{k,j} - w_{k+1,2j} - w_{k+1,2j-1} + 1$$

elementary steps are done in the (k,j) step.

(3) There for all $0 \leq k \leq \lceil \log(r) \rceil - 1$ the k-iteration of the main part requires the following number of elementary steps:

$$2^k + 2 \cdot w_k - w_{k+1}$$

(4) The main part of the above computation of $A \cdot x$ thus requires the following number of elementary steps:

$$C^{U_1}_r \equiv +2w_0 + w_1 + w_2 + \ldots + w_{\lceil \log(r) \rceil - 1} + 2^{\lceil \log(r) \rceil} - 1 - r.$$

A number that depends only on r.

(5) The entire computation of $A \cdot x$ thus requires the total of:

$$C^{U_1}_{n,r} \equiv n + C^{U_1}_r$$

elementary steps.

Example 4

Topiltz U-Matrix

The following sequence of steps describes an implementation of the Toplitz matrix aspect of the invention with U-coefficients. The data consists of a U-sequence $t_0, \ldots, t_{n-1}$ and an input real or complex vector $x = (x_0, \ldots, x_{n+r-2})$. From the U-sequence an $r \times (n+r-1)$ Toplitz-matrix $A \equiv (a_{ij} \equiv t_{i-j}: 0 \leq i < r, 0 \leq j \leq n+r-2)$, is formed, where $t_k \equiv 0$ for all $k < 0$ or $k \geq n$. These steps computes the product $y = (y_0, \ldots, y_{n-1}) = A \cdot x$. Only the first stage differs from that of the U-matrix example, therefore it is necessary to introduce only this stage. All the definitions listed in former examples of implementations are applicable here.

The Code 1. initialization: Put zero in every address from 0 to $2^{r-1} + r - 2$ 2. first stage:

1) for j going from 0 to r−2 add $(\frac{1}{2}) \cdot t_{n-r+j+1} \cdot x_j$ to the address $$\pi(h(t_j, t_{j-1}, \ldots, t_1, t_0, t_{n-1}, t_{n-1}, \ldots, t_{n-r+j+1}))$$

and also add $-(\frac{1}{2}) \cdot t_{n-r+j+1} \cdot x_j$ to the address $$\pi(h(t_j, t_{j-1}, \ldots, t_1, t_0, -t_{n-1}, -t_{n-2}, \ldots, -t_{n-r+j+1}))$$

3) for j going from n to n+r−2 add $(\frac{1}{2}) \cdot t_{j-r+1} \cdot x_j$ to the address $$\pi(h(t_{j-n}, t_{j-n-1}, \ldots, t_1, t_0, t_{-1}, t_{n-2}, \ldots, t_{j-r+1}))$$

and also add $(\frac{1}{2}) \cdot t_{j-r+1} \cdot x_j$ to the address $$\pi(h(t_{j-n}, t_{j-n-b}, \ldots, t_1, -t_0, -t_{n-1}, -t_{n-2}, \ldots, -t_{j-r+1}))$$

3. main part: The algorithm proceeds now as in the U-matrix implementing algorithm's main part, and the output is stored in the same addresses.

Complexity i) An elementary step in the above Toplitz implementation is the same as in the U-implementation, that is, reading a number from one location of the memory, called source, multiplying it by a sign which is 1 or −1 and then adding the result to a number placed in another location of the memory, called destination.

ii) An apparatus based on the above code would require the following number of elementary steps to fulfil the computation of A·x.

(1) For the first stage $$2\cdot(r-1)+n-r+1+2\cdot(r-1)=n+3r-3$$

elementary steps are required.

(2) The main part of the Toplitz computation of A·x is done by an implementation of the main part of the U-code with r lines. Thus it requires $C^u_r$ elementary steps.

(3) The entire Toplitz computation of A·x thus requires the total of:

$$C^T_{n,r} \equiv n+3r-3+C^u_r$$

elementary steps.

Chart 3: Toplitz-Matrix

Figure 3:
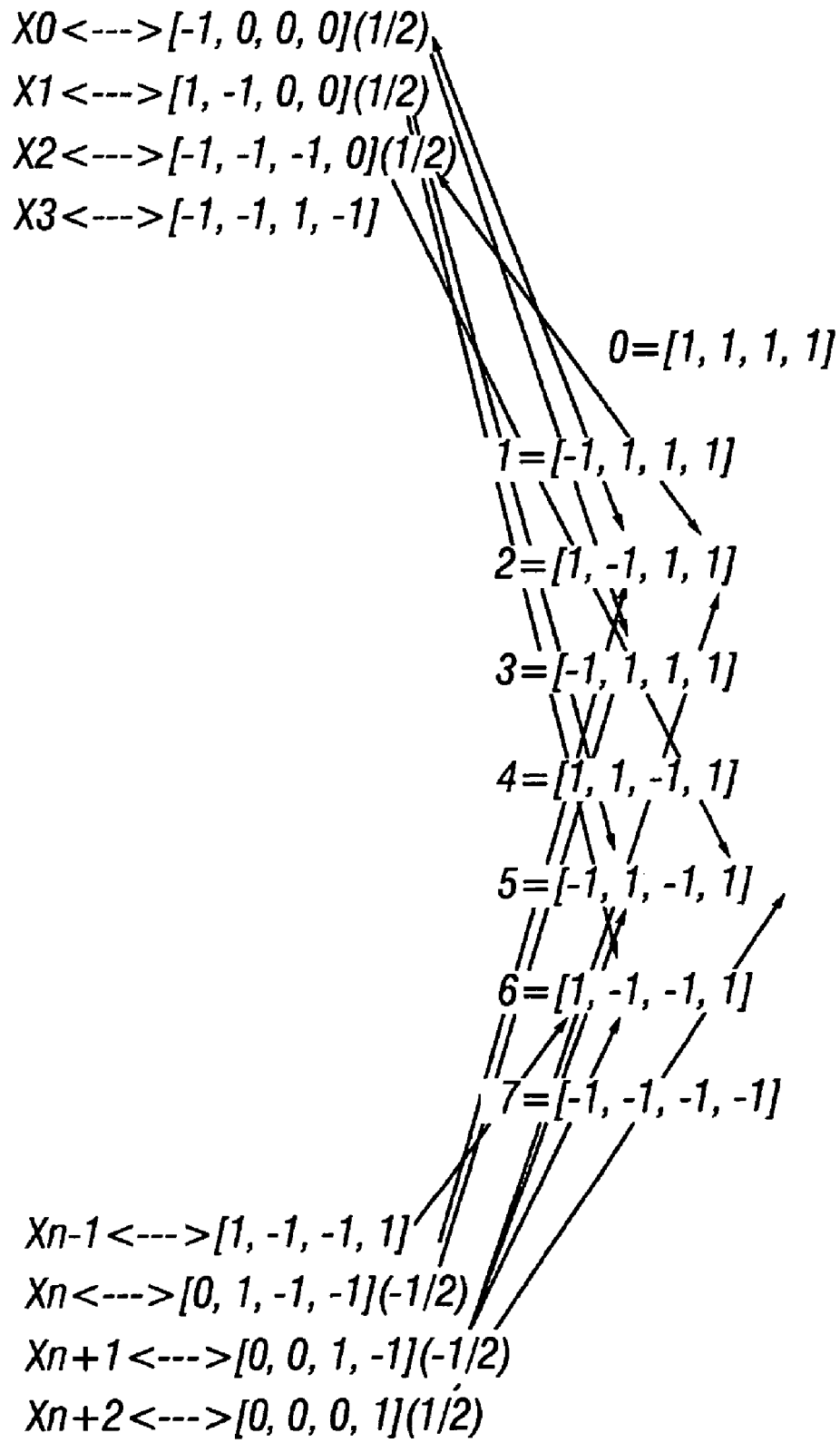
FIG. 3 schematically illustrates the operation of updating the contents of a memory employed by an apparatus which performs the transformation using the Toplitz transformation matrix, according to a preferred embodiment of the invention.

FIG. 3 schematically illustrates the operation of sending the incoming data to appropriate memory locations, employed by an apparatus which performs the initial part of the above code, with a Toplitz matrix comprising 4 rows. Except for this initial part every other aspect is identical to that of the U-matrix implementation and apparatus, and the description there is applicable here. Here too one spear arrow signify that the sign is 1 and double spear arrow signify that the sign is −1.

Example 5

Topiltz $U_1$-Matrix

The following preferred embodiment of the invention is an implementation of the Toplitz matrix aspect of the invention with $U_1$-coefficients. The data consists of a $U_1$-sequence $t_0, \ldots, t_{n-1}$ and an input complex vector $x=(x_0, \ldots, x_{n+r-2})$. From the $U_1$-sequence an rx(n+r−1) Toplitz-matrix $A \equiv (a_{ij} \equiv t_{i-j}: 0 \leq i < r, 0 \leq j \leq n+r-2)$, is formed, where $t_k \equiv 0$ for all k<0 or k≧n. The sequence of steps listed below computes the product $y=(y_0, \ldots, y_{n-1})=A\cdot x$. Only the first stage differs from that of the $U_1$-matrix example, therefore only this stage needs to be described. All the definitions listed in previous examples are applicable here.

The Code 1. initialization: Put zero in every address from 0 to $4^{r-1}+r-2$ 2. first stage:

1) for j going from 0 to r−2 add $(\frac{1}{2})\cdot t_{n-r+j+1}\cdot x_j$ to the address $a(g(t_j,t_{j-1},\ldots t_1,t_0,t_{n-1},t_{n-2},\ldots,t_{n-r+j+1}))$ and also add $-(\frac{1}{2})\cdot t_{n-r+j+1}\cdot x_j$ to the address $a(g(t_j,t_{j-1},\ldots t_1,t_0,-t_{n-1},-t_{n-2},\ldots,-t_{n-r+j+1}))$ 2) for j going from r−1 to n−1 add $t_{j-r+1}\cdot x_j$ to the address $a(g(t_j,t_{j-1},\ldots,t_{j-r+1}))$ 3) for j going from n to n+r−2 add $(\frac{1}{2})\cdot t_{j-r+1} x_j$ to the address $a(g(t_{j-n},t_{j-n-1},\ldots t_1,t_0,t_{n-1},t_{n-2},\ldots,t_{j-r+1}))$ and also add $(\frac{1}{2})\cdot t_{j-r+1} x_j$ to the address $a(g(t_{j-n},t_{j-n-1},\ldots,t_1,-t_0,-t_{n-1},-t_{n-2},\ldots,-t_{j-r+1}))$ and also add $-(\frac{1}{2})\cdot t_j x_j$ to the address $a(g(t_{j-n},t_{j-n-1},\ldots,t_1,-t_0,-t_{n-1},\ldots,-t_{n-r+2}))$ 3. main part: proceed as in the $U_1$-matrix algorithm's main part and the data is received in the same way.

Complexity i) An elementary step in the above Toplitz implementation is the same as in the $U_1$-implementation, that is, reading a complex number from one location of the memory, called source, multiplying it by a complex sign which is 1 or −1 or j or −j and then adding the result to a complex number placed in another location of the memory, called destination.

ii) An apparatus based on the above code would require the following number of elementary steps to fulfil the computation of A·x.

(1) For the first stage $$2\cdot(r-1)+n-r+1+2\cdot(r-1)=n+3r-3$$

elementary steps are required.

(2) The main part of the Toplitz computation of A·x is done by an implementation of the main part of the $U_1$-code with r lines. Thus it requires $C^U_r$ elementary steps.

(3) The entire Toplitz computation of A·x thus requires the total of:

$$C^{T1}_{n,r} \equiv n+3r-3+C^{U1}_r$$

elementary steps.

Example 6

Real Matrix, Binary 0-1 Representation

The following preferred embodiment of the invention is an implementation of the real matrix aspect of the invention with binary 0-1-representation of the matrix-entries. The data consists of an rxn real-matrix $A=(a_{ij}: 0 \leq i < r, 0 \leq j < n)$ with nonnegative entries and an input real or complex vector $x=(x_0, \ldots, x_{n-1})$. The algorithm computes $y=(y_0, \ldots, y_{n-1})=A\cdot x$. It is assumed that the entries of the matrix are given by the following 0-1-binary representation, for all $0 \leq i < r, 0 \leq j < n$:

$$a_{ij} = \Sigma_{-m_2 \leq k \leq m_1} t_{ijk} \cdot 2^k$$

where: $t_{ijk} \in \{0,1\}$ for all $-m_2 \leq k \leq m_1$

Only the first stage differs from that of the 0-1-matrix implementation, therefore only this stage needs to be described. All the definitions listed in the 0-1-matrix implementation section are applicable here. In addition define the following r-dimensional $\{0,1\}$-vectors for all $0 \leq j < n, -m_2 \leq k \leq m_1$:

$$v_{jk} = (t_{1jk}, t_{2jk}, \ldots, t_{rjk})$$

1. initialization: Put zero in every address from 0 to $2^r-1$ 2. first stage:

for a counter j going from 0 to n−1 do
  for k going from $-m_2$ to $m_2$ do
    add $2^k \cdot x_j$ to the value in address $\sigma(v_{jk})$ 3. main part: It is proceed as in the $\{0,1\}$-matrix implementation algorithm's main part for r rows and the output is stored in the same addresses at the end of the computational process.

Complexity i) An elementary step in the above implementation is the same as in the 0-1-binary implementation, that is, reading a number from one location of the memory, called source, and adding it to a number placed in another location of the memory, called destination.

ii) An apparatus based on the above code would require the following number of elementary steps to fulfil the computation of A·x.

(1) For the first stage $$(m_1+m_2+1)\cdot n$$

elementary steps are required.

(2) The main part of the of the code is done by the main part of the above implementation 0-1-binary-code with r lines. Thus it requires $C^{0,1}_r$ elementary steps.

(3) The entire computation of A·x thus requires the total of:

$$C^{Re-0-1} \equiv (m_1+m_2+1) \cdot n + C^{0,1}_r$$

elementary steps.

Example 7

Real Matrix, binary U-Representation

The following preferred embodiment of the invention is an implementation of the real matrix aspect of the invention with binary U-representation of the matrix-entries. The data consists of an rxn real-matrix $A=(a_{ij}: 0 \leq i < r, 0 \leq j < n)$ and an input real or complex vector $x=(x_0, \ldots, x_{n-1})$. The algorithm computes $y=(y_0, \ldots, y_{n-1})=A \cdot x$.

It is assumed that the entries of the matrix are given by the following U-representation, for all $0 \leq i < r$, $0 \leq j < n$:

$$a_{ij} = \Sigma_{-m_2-1 \leq k \leq m_1-1} t_{ijk} \cdot 2^k + t_{ijm_1} \cdot (2^{m_1} - 2^{-m_2-1})$$

where: $t_{ijk} \in U$ for all $-m_2-1 \leq k \leq m_1$

The existence of this representation is already mentioned in the real matrix aspect of the invention. Only the first stage differs from that of the U-matrix implementation, therefore only this stage needs to be described. All the definitions listed in the U-matrix implementation section are applicable here. In addition define the following r-dimensional U-vectors for all $0 \leq j < n$, $-m_2-1 \leq k \leq m_1$:

$$u_{jk} = (t_{1jk}, t_{2jk}, \ldots, t_{rjk})$$

1. initialization: Put zero in every address from 0 to $2^r + r - 1$ 2. first stage:
for j going from 0 to n−1 do
  for k going from $-m_2-1$ to $m_1-1$ do
    add $2^k \cdot \text{Sign}(u_{jk}) \cdot x_j$ to the address $\pi(h(u_{jk}))$
  for $k=m_1$ do
    add $(2^{m_1} - 2^{-m_2-1}) \cdot \text{Sign}(u_{jk}) \cdot x_j$ to the address $\pi(h(u_{jk}))$ 3. main part: It is proceed as in the u-matrix implementation algorithm's main part for r rows and the output is stored in the same addresses at the end of the computational process.

Complexity i) An elementary step in the above implementation is the same as in the above U-implementation, that is, reading a number from one location of the memory, called source, multiplying it by a sign which is 1 or −1 and then adding the result to a number placed in another location of the memory, called destination.

ii) An apparatus based on the above code would require the following number of elementary steps to fulfil the computation of A·x.

(1) For the first stage $$(m_1+m_2+2) \cdot n$$

elementary steps are required.

(2) The main part of the code is done by the main part of the above implementation of the U-code with r lines. Thus it requires $C^u_r$ elementary steps.

(3) The entire computation of A·x thus requires the total of:

$$C^{Re-U} \equiv (m_1+m_2+1) \cdot n + C^u_r$$

elementary steps.

Figure 4:
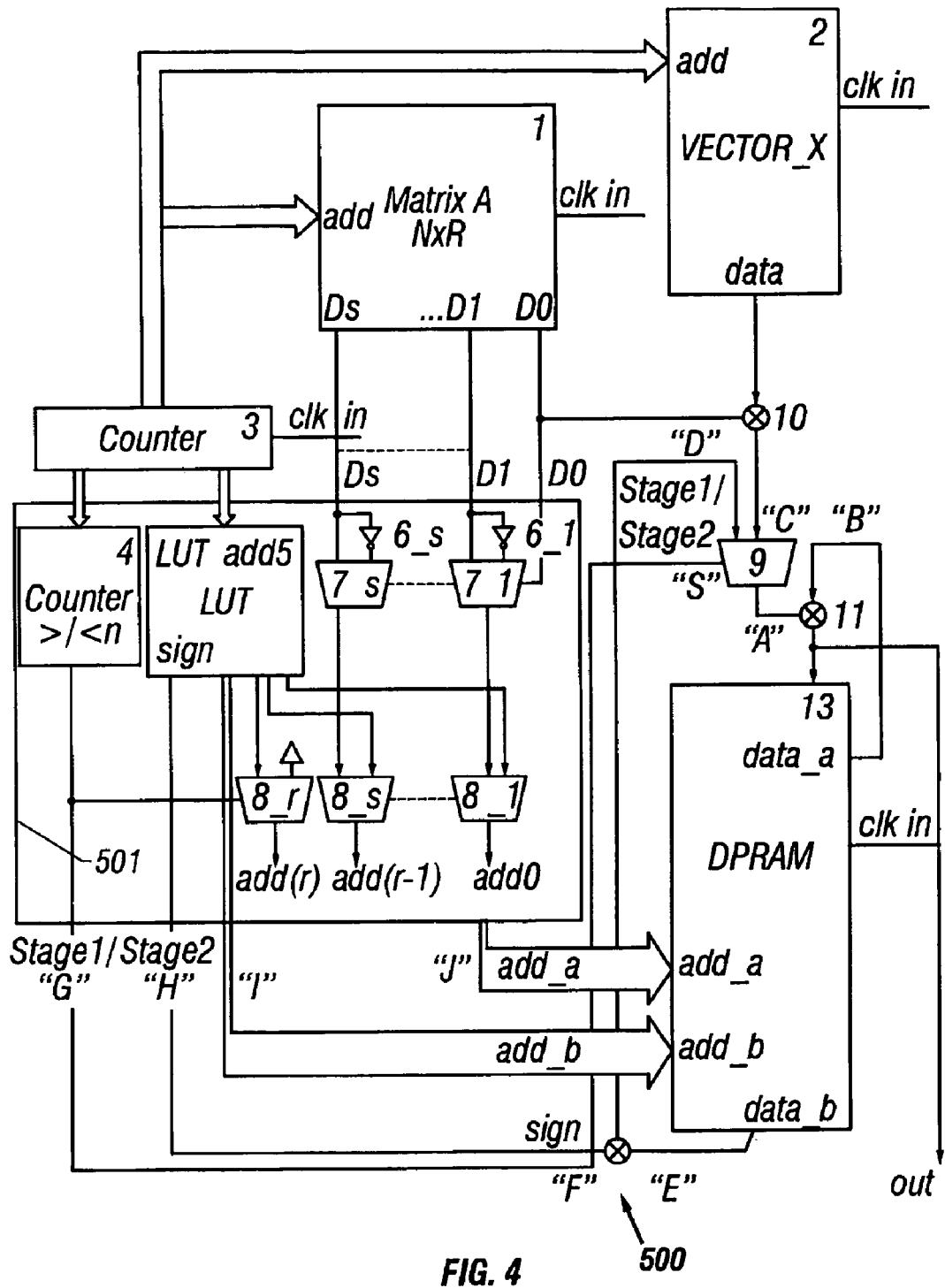
FIG. 4 is a block diagram of an exemplary apparatus for performing a linear transformation with a reduced number of additions, according to a preferred embodiment of the invention.

FIG. 4 is a block diagram of an exemplary apparatus for performing a linear transformation with a reduced number of additions, according to a preferred embodiment of the invention. The apparatus 500 consists of a multiplexer 10 with two inputs and one output, a multiplexer (MUX) 9 for selecting one of its inputs to be transferred to its output, an adder 11 with two inputs and one output, followed by a Dual Port Random Access Memory (DPRAM) 13, having two address bus lines, "add_a" and "add_b" and two outputs, "data_a" and "data_b". The MUX activity is controlled by an address generator 501, which also enables the access to memory addresses in the DPRAM 13. The address generator activity is controlled by a counter 3.

The output of the multiplier 10 is connected to one input, "C", of the MUX 9. The output of the MUX 9 is connected to one input "A" of the adder 11. The output of the adder 11 is connected to the input of the DPRAM 13. One output, "data_a", of the DPRAM 13 is connected to the input "B" of the adder 11. The other output, "data_b", of the DPRAM 13 is connected to the input "E" of a multiplier 12. The other input "F" of the multiplier 12 is connected to the output "sign" of the address generator 501. The output of the multiplier 12 is connected to the other input "D" of the MUX 9. The counter 3 is connected to two inputs of the address generator 501. The output "H" of the generator 501 is connected to the "sign" input of the multiplier 12. The output "G" of the generator 501 is connected to the control input "S" of the MUX 9. The output "J" of the generator 501 is connected to the first address input "add_a" of the DPRAM 13. The other output "I" of the generator 501 is connected to the second address input "add_b" of the DPRAM 13. The transformation matrix may be stored in an optional RAM/ROM 1, which feeds the address generator 501 with the series of codes (a row of bits in the matrix), $D_0, D_1, \ldots, D_s$, and the multiplier 10, with the most significant bit $D_0$. The input vector may be stored in another optional RAM/ROM 2, which feeds the multiplier 10 with samples of the input signal. Alternatively, the storage memories 1 and 2 can be eliminated if elements of the input vector and their corresponding elements in the transformation matrix are provides in synchronization into the apparatus 500. For example, these elements may be provided by an ADC or a sequence generator. All the components of apparatus 500, are controlled by a common clock via "clock_in" inputs.

Using the same input set, $[X_1 \ X_2 \ \ldots \ X_n]$ the same U matrix, (that comprises n rows) representing the same different codes, $D_0, D_1, \ldots, D_s$, the operation of the apparatus is explained below. The operation of the apparatus 500 may be divided into two stages: the first stage, indicated as "Stage 1", during which the input data (i.e., the samples $[X_1 \ X_2 \ \ldots \ X_n]$ (is received and the products of each component and its corresponding element of the transformation matrix is calculated and stored in the DPRAM 13; and the second stage, indicated as "Stage 2", during which the received data is processed, while blocking further input data from entering the adder 9. The counter 3 counts the accumulated number of operations and the count (the output of the counter) is used to distinguish between the two stages. The number of operations of "Stage 1" is the length n of the input vector. Operations beyond this number are associated with "Stage 2".

According to a preferred embodiment of the invention, the address generator 501 comprises a comparator 4, which is linked to the output of the counter 3. The comparator reads the current.

output of the counter 3, compares it with the length n of the input vector, and provides a corresponding signal, indicating whether the current operation is carried out in "Stage 1" or in "Stage 2". This signal is used to control the input "S" of the MUX 9, so as to switch between the inputs "C" and "D".

The address generator 501 also comprises an asynchronous memory 5 (e.g., a ROM), which stores preprogrammed values, and is used as a Look-Up-Table (LUT), for determining addresses in the DPRAM 13 via the input addresses "add_a" and "add_b", for processing their contents. The Size of the LUT is (C−n)×(1+2r), and its contents comprises three fields, a "Source" field, a "Sign" field and a "Destination" field. For each operation (i.e., each clock cycle, counted by the counter 3), there are three corresponding source sign and destination values. The source field comprises information related to each column of the transformation matrix that has been split (divided), as well as an indication related to normalizing of the two parts of that specific column. The source field determines the value of the input "add_b" on the DPRAM 13. The sign field represents the lower component in each split column or sub-column. The destination field determines the value of the input "add_a" on the DPRAM 13, according to which the content of the corresponding address is selected for processing.

The address generator also comprises a set of s (s=r−1) inverters, $6_1, 6_2 \ldots, 6_s$, each of which comprises an input connected to the series of bits $D_1, \ldots, D_s$, respectively. The output of each inverter is connected to one input of a corresponding MUX from a set of s multiplexers, $7_1, 7_2 \ldots, 7_s$. The series of bits $D_1, \ldots, D_s$ are also fed into the other input of a corresponding MUX from a set of s multiplexers, $7_1, 7_2 \ldots, 7_s$. The output of each MUX from the set $7_1, 7_2 \ldots, 7_s$ is controlled by the value of the most significant bit $D_0$, so as to enable the transfer of the set $D_1, \ldots, D_s$ unchanged, or inverted (i.e., $D'_1, \ldots, D'_s$) to the input "address_a" of the DPRAM 13. The set $D_1, \ldots, D_s$ (or $D'_1, \ldots, D'_s$) is input into one input of a corresponding set, $8_1, 8_2 \ldots, 8_s$ multiplexers, with an additional multiplexer $8_r$ which is fed by the MSB (the r-th bit) of "add_a" arriving from the LUT. The output of the comparator 4 enables the selection of "add_a" to arrive from the set $7_1, 7_2 \ldots, 7_s$ or from the LUT. The input "add_a" (i.e., the destination) controls the first output "data_a" of the DPRAM 13, which is fed into input "B" of the adder 11. The input "add_b", taken from the LUT (i.e., the source) controls the second output "data_b" of the DPRAM 13, which is fed into input "E" of the multiplier 12, which multiplies each value of "data_b" by a corresponding "sign" value, extracted from the LUT and feeds the product into the input "D" of the multiplier 12. The "write" operation in the DPRAM 13 is synchronous, i.e., the contents of each cell is overwritten according to the clock rate (e.g., when the clock signal rises). On the other hand, the "read" operation in the DPRAM 13 is asynchronous, i.e., each output is changed at the moment when the address input is changed, regardless the clock.

Operation at Stage 1

At this stage, the counter 3 starts to count the first symbol time (n clock cycles), during which stage 1 is performed. During stage 1, the MUX 9 enables data flow from its input "C" to flow to its output and into input "A" of the adder 11, while blocking input "D". The input symbol $[X_1 X_2 \ldots X_n]$ is provided into one input of the multiplier 10. The MSB $D_0$ of the code, is provided into the other input of the multiplier 10. At this stage, the destination (output "data_a") that is determined by the inputs "add_a", is extracted from DPRAM 13 and added to the components $[X_1 X_2 \ldots X_n]$ of the input vector, multiplied by the MSB $D_0$. The counter 3, which has been counted the current symbol time, provides an indication to the address generator comparator 4 and to the ROM 5 that the current symbol time has been terminated, and the comparator 4 switches the input selection of the MUX 9 from input "C" to the other input "D". Similarly, the comparator 4 drives multiplexer $8_1, 8_2 \ldots, 8_x$ to select data from the LUT, rather from the RAM 1.

Operation at Stage 2

At this stage, the counter 3 starts to count the next symbol time, during which stage 2 is performed. During stage 2, the MUX 9 enables data flow from its input "D" to flow to its output and into input "A" of the adder 11, while blocking input "C". At this stage, at each clock cycle, a selected address in the DPRAM 13 is accessed via "add_b" which represents the source. The source data is fed from the second output "data_b" of the DPRAM 13 into the input "E" of the multiplier 12, in which it is multiplied by the corresponding "sign" value, extracted from the LUT. This product is fed into the input "D" of the MUX 9, thereby appearing in the input "A" of the adder 11. A same time, the content of the current destination value appears in the input "B" of the adder 11. The two values are added by the adder 11, and the result is stored at the same address in the DPRAM 13 (which corresponds to the previous destination vaue). At the end of this summation process, the corresponding r transformation points ($y_i$'s) are stored in the DPRAM 13 at addresses #0 and #$2^{r-1}$ to ($2^{r-1}$+r−2). This process is continued consequently, until the clock provides an indication that stage 2 is terminated (according to a predetermined count) after all the transformation points ($y_i$'s) have been calculated and stored in different addresses in the DPRAM 13. At that moment, the current symbol time has also been terminated, and the comparator 4 switches the input selection of the MUX 9 back from input "D" to the other input "C", and drives multiplexers $8_1, 8_2 \ldots, 8_s$ to select data from RAM 1, rather from the LUT, thereby driving the apparatus 500 back to operate again at stage 1.

Figure 5:
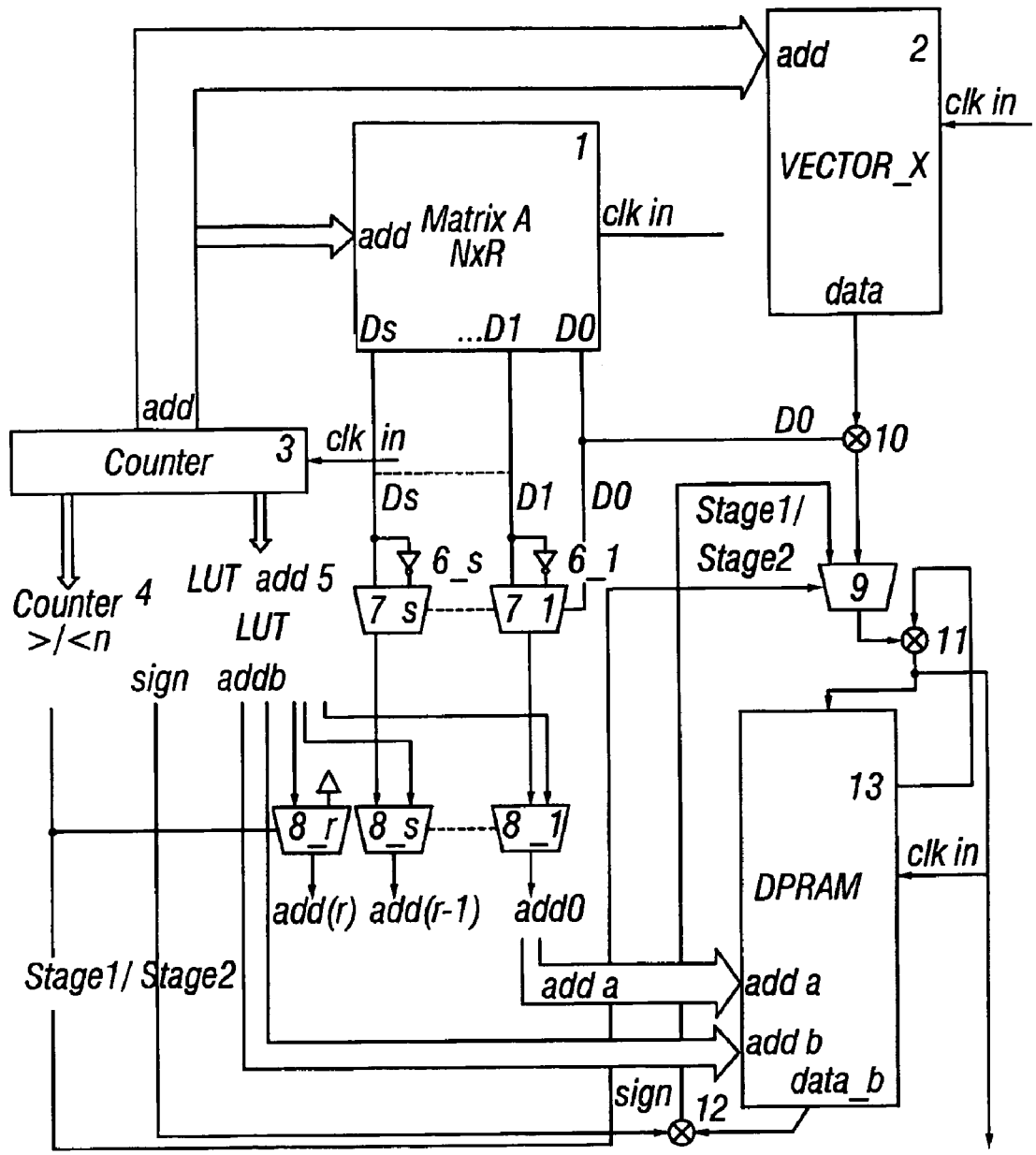
FIG. 5 illustrates an example implementation of a product of an rxn U-matrix A by an n-dimensional vector X according to one embodiment of the present invention.

One embodiment of the apparatus used to implement the above method is seen in FIG. 5. FIG. 5 illustrates an implementation of a product of an rxn U-matrix A by an n-dimensional vector X. The representation of the matrix contain 0 or 1 where 0 corresponds to 1, and 1 corresponds to −1.

In this example the vector is real and v bits are dedicated to each component. In the subsequent construction the matrix A is stored in element 1 (RAM or ROM) and the vector X is stored in element 2 (RAM or ROM). The matrix and the vector may be generated from any internal or external device such as memory device or synchronized source, like ADC or some sequences generators, etc.

A clock that control modules 1, 2, 3, 13 synchronizes the whole system. Module 3 is a counter that counts from 0 to C, where C is defined as follows:

$$C = n + 2u_0 + u_1 + u_2 + \ldots + u_{[log(r)]-1} - r.$$

$$u_k = \Sigma_{1, j \cdot 1^k} 2^{h(k,j) - 1(k,j)}.$$

$$l(k,j) = [(j-1) \cdot (r/2^k)]$$

$$h(k,j) = [j \cdot (r/2^k)] - 1$$

In stage 1 the incoming signals from elements 1 & 2 are inserted into element 13 with accordance to addresses that are coming from element 3, where each address contains the $\log_2 n$ list significant bits.

In addition, the counter is used as an address generator of an asynchronous ROM (element 5) of the size of $(C-n) \times (1+r+r)$. All the bits of the counter go into element 4 which is a comparator that check if the current count is greater then n. Element 5 encompasses three fields: Sign, Source, Destination. The order of the line at the ROM should be such that the first operation of stage 2 is induced by the counter after n cycles.

For syntax purpose we will define $s=r-1$. The data buses go from element 1 bits-D1-Ds into elements 6_1-6_s (which are inverters) respectively. Elements 71-7s select between D1-Ds and the output of 61-6s according to the state of D0. (D0=0=>7_1-7_s=D1-Ds, D0=1=>71-7s=61-6s).

Elements 8_1-8_s selects between 7_1-7_s and the $\log_2(n)$ LSB's outputs of element 5 (add_a=Destination) according to the state of the output of the comparator in element 4 (stage 1_2n). Stage 1_2n=0=>8_1-8_s=add_a, Stage 1_2n=1=>8_1-8_s=7_1-7_s.

Element 8_r select between "0" to the r bit (add_a MSB) of element 5. Stage 1_2n=0=>8_r=add_a MSB, Stage 1_2n=1=>8_r=0. The output from 8_1-8_r used as the first address bus of element 13, which is a dual port RAM at size of $(2^{r-1}+r-1) \times (V+\log_2 n)$. This address defines data_a bus which is an output from element 13 and also the destination of the data_in bus which is an input to element 13.

Add_b (which is output of element 5 (the Source field)) is the second address bus of element 13 (This address controls data_b bus which is an output from element 13).

Sign is a single bit output from element 13 which multiply data_b at element 12 (which is a multiplier).

The data_in bus which is an input with respect to element 13 arrived from element 11, which is an adder that sums together data_a and the output of element 9. The data_in goes to add_a destination in a synchronous way, while the read operation of data_a and data_b is asynchronous.

Prior to the action of element 13 it is initiated by insertion of zeros. Element 9 selects between the outputs of element 10, and element 12. Element 10 multiplies the data bus from element 2 with the LSB of element 1. After C cycles the resulting vector is stored at element 13 at address 0 and addresses $2^{r-1}$ to $(2^{r-1}+r-2)$.

Prior to the action of element 13, it is initiated by insertion of zeros. Element 9 selects between the outputs of element 10, and element 12. Element 10 multiplies the data bus from element 2 with the LSB of element 1. After C cycles the resulting vector is stored at element 13 at address 0 and addresses $2^{r-1}$ to $(2^{r-1}+r-2)$.

Figure 6:
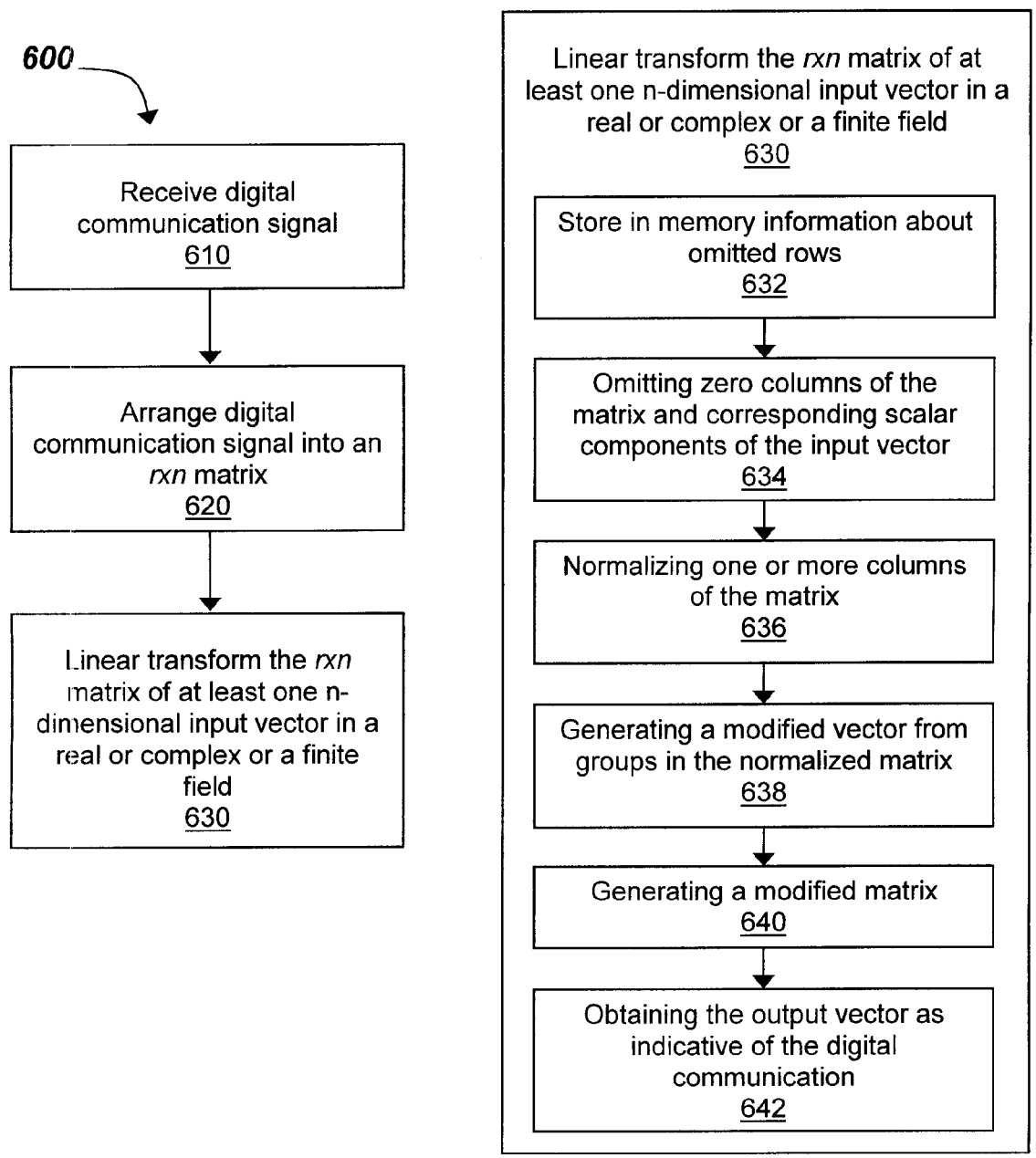
FIG. 6 is a flowchart describing a linear transformation process.
Figure 7A:
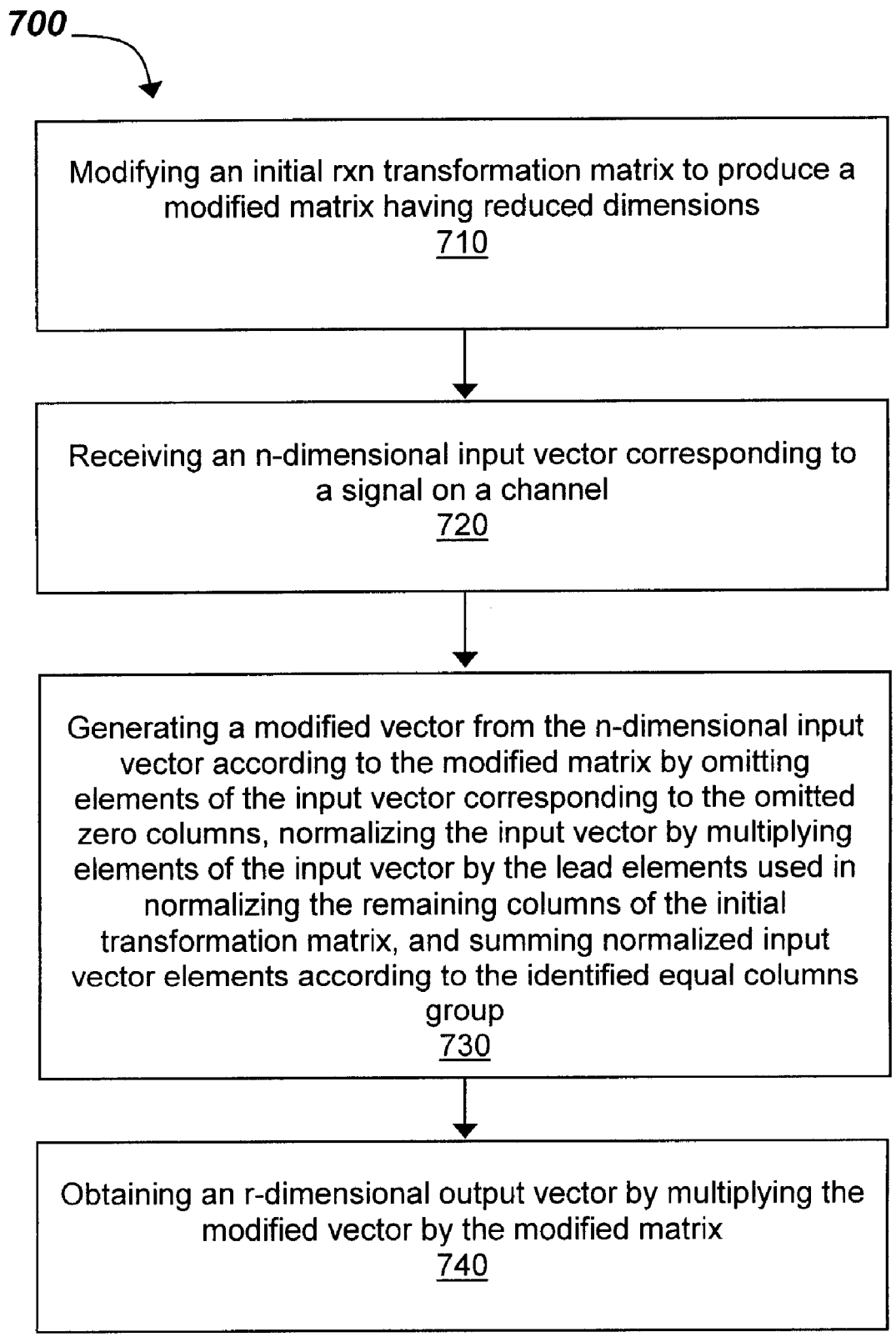
FIG. 7A is a flowchart describing a machine implemented process for performing a linear transformation.
Figure 7C:
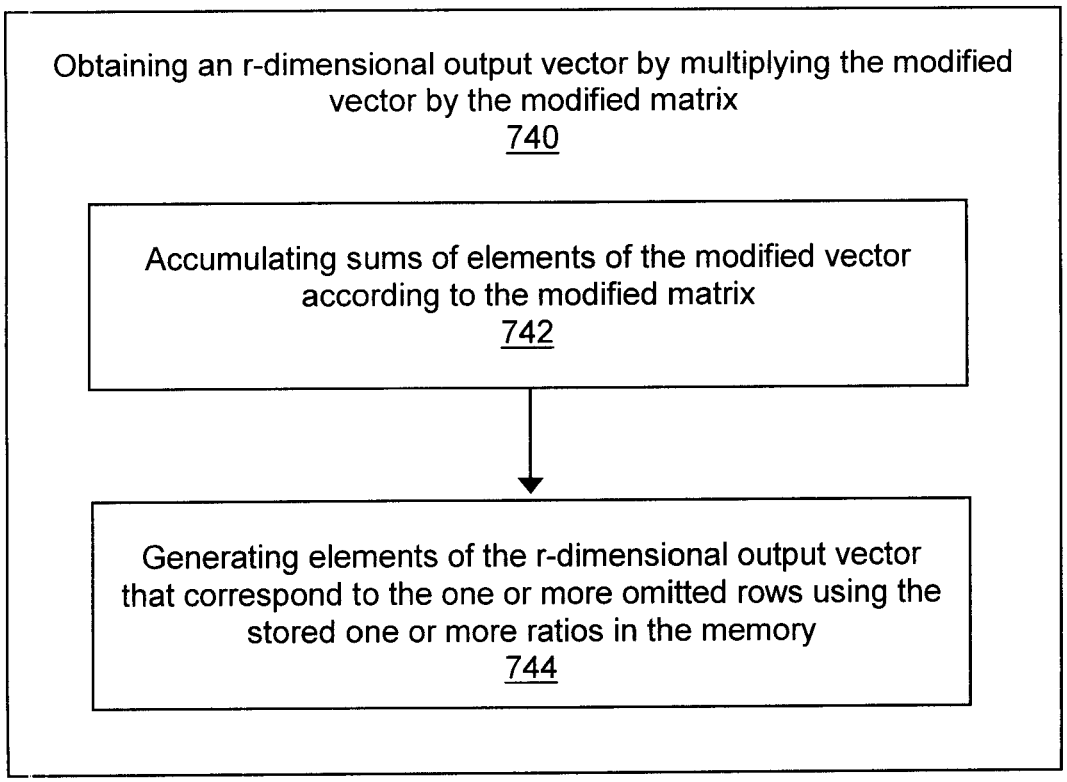
FIG. 7C is a flowchart showing another detailed view of a machine implemented process for performing a linear transformation.

FIG. 6 is a flowchart describing a linear transformation process. FIG. 7A is a flowchart describing a machine implemented process for performing a linear transformation. FIG. 7B is a flowchart showing a detailed view of a machine implemented process for performing a linear transformation. FIG. 7C is a flowchart showing another detailed view of a machine implemented process for performing a linear transformation.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method comprising:
   receiving a digital communication signal; and
   reducing consumption of resources when processing the received digital communication signal, wherein consumption of resources is reduced by performing operations including
   arranging said digital communication signal into an rxn matrix;
   linear transforming the rxn matrix of at least one n-dimensional input vector in a real or complex or a finite field by:
   storing in memory information about omitted rows, with respect to a selected row, in the matrix that are equivalent to one or more other rows in the matrix, including the selected row;
   omitting zero columns of said matrix and corresponding scalar components of the input vector;
   normalizing one or more columns of said matrix by multiplying the one or more columns by one or more lead element inverses of the one or more columns;
   generating a modified vector from groups in the normalized matrix;
   generating a modified matrix based at least on the omitting and normalizing; and
   obtaining an r-dimensional output vector by multiplying the modified vector by the modified matrix, said obtaining comprising
   accumulating sums of elements of the modified vector according to the modified matrix, and
   generating elements of the r-dimensional output vector that correspond to the one or more omitted rows using the stored information about the omitted rows.

2. The method of claim 1, further comprising splitting the transformation matrix into several sub-matrices and obtaining the output vector by unifying the output vectors resulting from the products of each sub-matrix.

3. The method of claim 2, wherein the modified matrix encompasses a subset of rows of said transformation matrix.

4. The method of claim 3, further comprising splitting the input vector into several sub-vectors such that each sub-vector corresponds to a sub-matrix and wherein the output vector is obtained by adding the output vectors resulting from the products of each sub-matrix.

5. The method of claim 1, further comprising splitting a modified matrix into several sub-matrices, wherein an output vector is obtained by adding the output vectors resulting from the products of each sub-matrix, by the respective sub-vector.

6. The method of claim 1, further comprising normalizing each column of said matrix by multiplying the column by the inverse of a lead element.

7. The method of claim 1, wherein the output vector is a product of the matrix and the input vector.

8. The method of claim 1, further comprising identifying groups of equal columns in the normalized matrix and attaching a unique location to each identified group.

9. A machine-implemented method comprising:
   receiving a digital communication signal arranged in an rxn transformation matrix; and reducing consumption of resources when processing the received digital communication signal, wherein consumption of resources is reduced by performing operations including
   modifying the rxn transformation matrix to produce a modified matrix having reduced dimensions, said modifying comprising
      identifying a group of equivalent rows if present, selecting a row from the equivalent rows group to retain, omitting one or more equivalent rows in the equivalent rows group, and storing in memory a ratio between each omitted row and the selected row,
      omitting zero columns of said transformation matrix,
      normalizing remaining columns of said transformation matrix by multiplying the remaining columns by inverses of their lead elements, respectively, to produce a normalized matrix, and
      identifying a group of equal columns in the normalized matrix, selecting a column from the equal columns group to retain, and omitting one or more equal columns in the equal columns group;
   receiving an n-dimensional input vector corresponding to a signal on a channel;
   generating a modified vector from the n-dimensional input vector according to the modified matrix by omitting elements of the input vector corresponding to the omitted zero columns, normalizing the input vector by multiplying elements of the input vector by the lead elements used in normalizing the remaining columns of the transformation matrix, and summing normalized input vector elements according to the identified equal columns group; and
   obtaining an r-dimensional output vector by multiplying the modified vector by the modified matrix, said obtaining comprising
      accumulating sums of elements of the modified vector according to the modified matrix, and
      generating elements of the r-dimensional output vector that correspond to the one or more omitted rows using the stored one or more ratios in the memory.

10. The method of claim 9, wherein modifying the rxn transformation matrix further comprises splitting the transformation matrix into several sub-matrices and obtaining the r-dimensional output vector further comprises unifying multiple output vectors resulting from products of each sub-matrix.

11. The method of claim 10, wherein the modified matrix encompasses a subset of rows of said transformation matrix.

12. The method of claim 11, further comprising splitting the input vector into several sub-vectors such that each sub-vector corresponds to a sub-matrix and wherein the output vector is obtained by adding the output vectors resulting from the products of each sub-matrix.

13. The method of claim 9, further comprising splitting the modified matrix into several sub-matrices, wherein an output vector is obtained by adding output vectors resulting from products of each sub-matrix by respective corresponding sub-vectors.

* * * * *